(12) United States Patent
Kojo

(10) Patent No.: US 7,787,028 B2
(45) Date of Patent: Aug. 31, 2010

(54) COMPOSITE IMAGE OUTPUT APPARATUS AND COMPOSITE IMAGE DELIVERY APPARATUS

(75) Inventor: Takashi Kojo, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 1058 days.

(21) Appl. No.: 10/514,958

(22) PCT Filed: May 28, 2003

(86) PCT No.: PCT/JP03/06696

§ 371 (c)(1),
(2), (4) Date: Nov. 18, 2004

(87) PCT Pub. No.: WO03/100703

PCT Pub. Date: Dec. 4, 2003

(65) Prior Publication Data

US 2005/0225566 A1    Oct. 13, 2005

(30) Foreign Application Priority Data

May 28, 2002  (JP)  .............................. 2002-154511
May 28, 2002  (JP)  .............................. 2002-154512

(51) Int. Cl.
*H04N 5/262* (2006.01)
*G09G 5/00* (2006.01)
(52) U.S. Cl. ...................................... 348/239; 345/629
(58) Field of Classification Search .................. 348/239, 348/208.99, 208.12; 345/632, 473, 629
See application file for complete search history.

(56) References Cited

U.S. PATENT DOCUMENTS

| 5,347,306 | A | * | 9/1994 | Nitta | ......................... 348/14.1 |
| 5,566,251 | A | * | 10/1996 | Hanna et al. | ................. 382/284 |
| 5,923,791 | A | | 7/1999 | Hanna et al. | |
| 7,262,798 | B2 | * | 8/2007 | Stavely et al. | ............... 348/255 |

(Continued)

FOREIGN PATENT DOCUMENTS

JP          09-326040 A     12/1997

(Continued)

*Primary Examiner*—Jason Chan
*Assistant Examiner*—Joel Fosselman
(74) *Attorney, Agent, or Firm*—Frishauf, Holtz, Goodman & Chick, P.C.

(57) ABSTRACT

A composite image output/delivery apparatus for (10) adding to a picked-up scene image a corresponding animation image and outputting/delivering a resulting composite image without adding a fixed animation image simply to the picked-up scene image. When an object image is extracted from the picked-up scene image received via an image input unit (17), any specified type of character image corresponding to the scene image is selected from an appropriate one of a character 1 "memory (12)e, a character 3 "cat" pose image memory (12f). The selected type of character image replaces the object image in the picked-up scene image or adds to the scene image to thereby provide and display a resulting composite image. That is, by replacing the object image with an animation image similar in pose to the object image or by adding the animation image to the scene image, a very delightful picked-up image with an animation is easily created without adding a fixed animation image simply to an image pickup framera-bbit" pose image memory (12d), a character 2 "bear" pose image.

17 Claims, 39 Drawing Sheets

U.S. PATENT DOCUMENTS

2001/0013869 A1 * 8/2001 Nozawa ............... 345/473

FOREIGN PATENT DOCUMENTS

| | | |
|---|---|---|
| JP | 10-126687 A | 5/1998 |
| JP | 11-167674 A | 6/1999 |
| JP | 2000-000216 A | 1/2000 |
| JP | 2000-022937 A | 1/2000 |
| JP | 2001-230972 A | 8/2001 |
| JP | 2001-274972 A | 10/2001 |
| JP | 2001-292305 A | 10/2001 |
| JP | 2002-132999 A | 5/2002 |
| JP | 2002-150317 A | 5/2002 |
| KR | 0271384 B1 | 11/2000 |
| WO | WO 93/06691 A1 | 4/1993 |
| WO | WO 96/08791 A1 | 3/1996 |

* cited by examiner

Fig. 2

CHARACTER'S POSE (1)

| POSE NO. | ① SAY CHEESE (CLOSE-UP) | ② SAY CHEESE (FULL-LENGTH) | ③ WALK 1 (FORWARD) | ④ WALK 2 (SIDE) | ⑤ WALK 3 (BACK) | ⑥ WALK HAND IN HAND 1 | ⑥ WALK HAND IN HAND 2 |
|---|---|---|---|---|---|---|---|
| RABBIT (12d) | | | | | | | |
| BEAR (12e) | | | | | | | |
| CAT (12f) | | | | | | | |

Fig. 3
| CHARACTER'S POSE (2) | | | | | | | |
|---|---|---|---|---|---|---|---|
| POSE NO. | ⑧ HOLDING A CHILD'S HAND 1 | ⑨ HOLDING A CHILD'S HAND 2 | ⑩ "BANZAI" | ⑪ GOODBYE | ⑫ HI | ⑬ REALLY ? | ⑭ BINOCULARS, CAMERA |
| RABBIT (12d) |  |  | 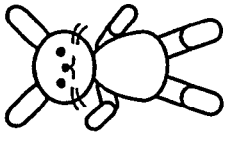 | 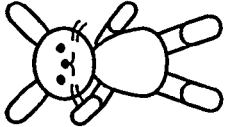 | 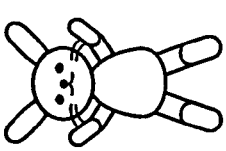 |  |  |
| BEAR (12e) | 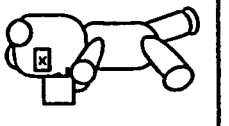 | 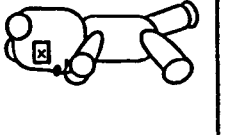 | 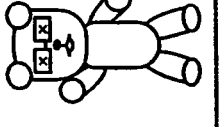 | 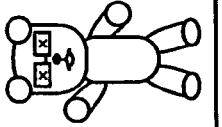 | 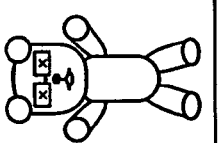 | 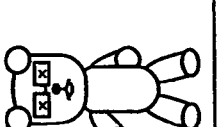 |  |
| CAT (12f) | 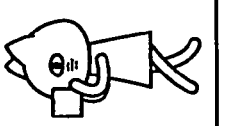 | 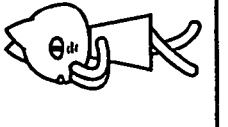 | 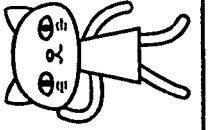 | 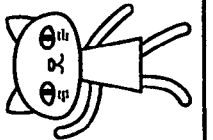 | 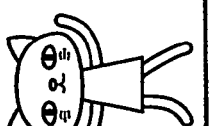 | 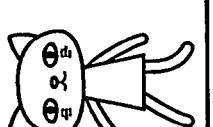 |  |

Fig. 4

| CHARACTER'S POSE (3) | | | | | | |
|---|---|---|---|---|---|---|
| POSE NO. | ⑮ DISH | ⑯ DRINK 1 | ⑰ DRINK 2 | ⑱ EAT A CONE, HOLDING IT | ⑲ DANCE | ⑳ KISS |
| RABBIT (12d) | | | | | | |
| BEAR (12e) | | ... | ... | ... | | |
| CAT (12f) | | ... | ... | ... | | |

Fig. 5

| POSE NO. | ① SAY CHEESE (CLOSE-UP) | ② SAY CHEESE (FULL-LENGTH) | ③ WALK 1 (FORWARD) | ④ WALK 2 (SIDE) | ⑤ WALK 3 (BACK) | ⑥ WALK HAND IN HAND 1 | ⑥ WALK HAND IN HAND 2 |
|---|---|---|---|---|---|---|---|
| A | 👤 | 👤 | 👤 | 👤 | 👤 | 👤 | 👤 |
| B | 👤 | 👤 | 👤 | 👤 | 👤 | 👤 | 👤 |
| C | | | 👤 | 👤 | | | |

| POSE NO. | ⑮ DISH | ⑯ DRINK 1 | ⑰ DRINK 2 | ⑱ EAT A CONE, HOLDING IT | ⑲ DANCE | ⑳ KISS |
|---|---|---|---|---|---|---|
| A | | | | | | |
| B | | ... | ... | ... | ... | ... |
| C | | ... | ... | ... | ... | ... |

MODEL'S POSE (3) 12b

Fig. 39
CHARACTER'S POSE (FOR ANIMATION), RABBIT (12dM)
| POSE NO. | ④ WALK 2 (SIDE) | | ⑪ GOODBYE | |
|---|---|---|---|---|
| a |  | ... |  | ... |
| b | | ... | | ... |
| c | | ... | | ... |
| d | | ... |  | ... |

US 7,787,028 B2

COMPOSITE IMAGE OUTPUT APPARATUS AND COMPOSITE IMAGE DELIVERY APPARATUS

This application is a U.S. National Phase Application under 35 USC 371 of International Application PCT/JP03/06696 filed May 28, 2003.

TECHNICAL FIELD

The present invention relates to a composite image output apparatus for combining a picked-up scene image with another and outputting a resulting composite image, and also relates to a composite image delivery apparatus for delivering a composite image based upon a picked-up scene image.

BACKGROUND ART

Some types of conventional still cameras or video cameras have the function of combining an image picked-up thereby with other images, and displaying a resulting composite image.

For instance, such a camera now in practical use outputs a composite image formed by combining a picked-up scene image with an animation image of a flower or a popular character prepared at a fixed or desired position in a pickup frame.

An image picked up by a digital camera can be displayed on a display screen of a personal computer, combined with a different image and edited. In this case, the different image, for example, can be selectively cut out from another picture file and pasted at a desired position in a picked-up image.

However, the problem with such a conventional image processing apparatus is that a prepared image is simply combined at a fixed or desired position with a picked-up scene image and then outputted, and therefore the composite picture excluding the picked-up image tends to be always flat and tiresome.

DISCLOSURE OF INVENTION

The present invention has been made in view of the above-mentioned problem. It is an object of the present invention to provide an image output apparatus, an image output processing program, and an image output method which makes it possible to not only combine a fixed animation image with a picked-up scene image to thereby output a resulting composite image, but also combine an animation image corresponding to the picked-up scene image with the picked-up scene image.

It is another object of the present invention to provide an image delivery server, an image delivery program, and an image delivery method which makes it possible to not only deliver a fixed image, but also deliver an image.

In order to achieve the above objects, according to one aspect of the present invention, there is provided a composite image output apparatus comprising:

a picked-up scene image acquiring unit (means) which acquires a picked-up scene image representing a scene containing at least one object;

a target image extracting unit (means) which extracts a target image representing any particular one of the at least one object from the picked-up scene image acquired by the acquiring unit;

a corresponding-image obtaining unit (means) which obtains an image corresponding to the target image extracted by the extracting unit; and an image outputting unit (means) which adds the image obtained by the obtaining unit to the picked-up scene image acquired by the picked-up scene image acquiring unit and outputs a resulting composite image.

In this composite image output apparatus, when a target image representing any particular one of the at least one object is extracted by the target image extracting means from the picked-up scene image acquired by the acquiring means, an image corresponding to the extracted target image is obtained by the corresponding-image obtaining means. Thereupon, the image obtained by the obtaining means is added to the picked-up scene image acquired by the picked-up scene image acquiring means to thereby output a resulting composite image. That is, the user can enjoy creating a delightful composite image.

According to another aspect of the present invention, there is also provided a composite image output apparatus comprising:

a picked-up scene image acquiring unit (means) which acquires a plurality of picked-up scene images, each representing a scene containing at least one object;

a target image extracting unit (means) which extracts a target image representing any particular one of the at least one object from any selected one of the plurality of picked-up scene images acquired by said picked-up scene image acquiring unit;

a corresponding-image obtaining unit (means) which obtains an image corresponding to the target image extracted by said extracting unit; and an image outputting unit (means) which replaces in the picked-up scene image the extracted target image with the image obtained by the corresponding-image obtaining unit, for adding the corresponding-image to a selected one of the others of the plurality of picked-up scene images from which no target images are extracted by the target image extracting unit, and for outputting a resulting composite image.

In this composite image output apparatus, when a target image representing any particular one of the at least one object is extracted by the target image extracting means from any one of the plurality of picked-up scene images acquired by the picked-up scene image acquiring means, an image corresponding to the extracted target image is obtained by the corresponding-image obtaining means. Thereupon, by the image outputting means the target image extracted by the target image extracting means is replaced with the image obtained by the corresponding-image obtaining means. Also, by the image outputting means, the corresponding-image is then added to a selected one of the others of the plurality of picked-up scene images from which no target images are extracted by the target image extracting means to output a resulting composite image. That is, the user can enjoy creating a delightful image.

According to still another aspect of the present invention, there is also provided a composite image delivery apparatus comprising:

a picked-up scene image receiver (receiving means) which receives from a terminal a picked-up scene image representing a scene containing an object;

a target image extractor (extracting means) which extracts a target image representing the object from the picked-up scene image received by the picked-up scene image receiving unit;

a corresponding-image obtainer (obtaining means) which obtains an image corresponding to the target image extracted by the target image extractor unit;

an image adder (adding means) which adds the corresponding-image obtained by the corresponding-image obtainer to the picked-up scene image to thereby provide a resulting composite image; and an image deliverer (deliver means) which delivers the composite image provided by the image adder to the terminal.

In the composite image delivery apparatus, when a picked-up scene image representing a scene containing at least one object is received from a terminal, a target image representing the object is extracted from the received picked-up scene image by the target image extracting means. An image corresponding to the extracted target image is obtained by the corresponding-image obtaining means. Thereupon, the obtained image is added by the image adding means to the picked-up scene image to thereby provide a resulting composite image, which is then delivered by the image delivering means to the terminal. That is, the user can enjoy creating a delightful image.

According to a further aspect of the present invention, there is also provided a composite image delivery apparatus that communicates with a terminal, the apparatus extracting a target image contained in a picked-up scene image, sending the terminal pose information on the extracted target image, receiving an image corresponding to the pose information that the terminal sent in response to the sending of the pose information by the composite image delivery apparatus, adding the corresponding image to the picked-up scene image to thereby output a resulting composite image, the apparatus comprising:

a pose information receiver (receiving means) which receives from the terminal the pose information for the target image contained in the picked-up scene image;

a corresponding-image storing memory (storing means) having stored a plurality of images, each corresponding to a respective one of different items of pose information; and an image deliverer (deliver means) which reads from the corresponding-image storing memory an image corresponding to the pose information received by the pose information receiver, and delivers the read image to the terminal.

In this composite image delivery apparatus, when the terminal extracts the target image contained in the picked-up scene image and sends pose information for the target image to the composite image delivery apparatus, the composite image delivery apparatus receives the pose information in the pose information receiving means thereof. Thereupon, an image corresponding to the received pose information is read by the image delivering means from the corresponding-image storing means, and delivered to the terminal. That is, the terminal can receive from the image delivery apparatus the image corresponding to the target image extracted from the picked-up scene image and add the image to the picked-up scene image to thereby output a resulting interesting composite image. Thus, the user can enjoy creating a delightful image.

BRIEF DESCRIPTION OF DRAWINGS

FIG. 2 shows images of "rabbit", "bear" and "cat" characters taking various poses (part 1) stored in a character 1 "rabbit" pose image memory 12d, a character 2 "bear" pose image memory 12e, and a character 3 "cat" pose image memory 12f, respectively, in the image output apparatus 10.

FIG. 3 shows further images of "rabbit", "bear" and "cat" characters taking various poses (part 2) stored in the character 1 "rabbit" pose image memory 12d, character 2 "bear" pose image memory 12e, and character 3 "cat" pose image memory 12f, respectively, in the image output apparatus 10.

FIG. 4 shows still further images of "rabbit", "bear" and "cat" characters taking various poses (part 3) stored in the character 1 "rabbit" pose image memory 12d, character 2 "bear" pose image memory 12e, and character 3 "cat" pose image memory 12f, respectively, in the image output apparatus 10.

FIG. 5 shows images of various poses of a model (part 1) stored in a model pose memory 12b in the image output apparatus 10.

FIG. 7 shows images of still further various poses of the model (part 3) stored in the model pose memory 12b in the image output apparatus 10.

FIG. 39 is shows images of animation "rabbit" characters striking various poses stored in a moving-picture "rabbit" character pose image memory 12dM in the image delivery server 110 as posing character images to be used for moving pictures in the image delivery server 110 according to the third embodiment.

FIG. 41 is a flowchart showing a user's original character image registration process in the image delivery system according to the fourth embodiment, in which

BEST MODE FOR CARRYING OUT THE INVENTION

Preferred embodiments of the present invention will be described with reference to the accompanying drawings.

First Embodiment

Figure 1:
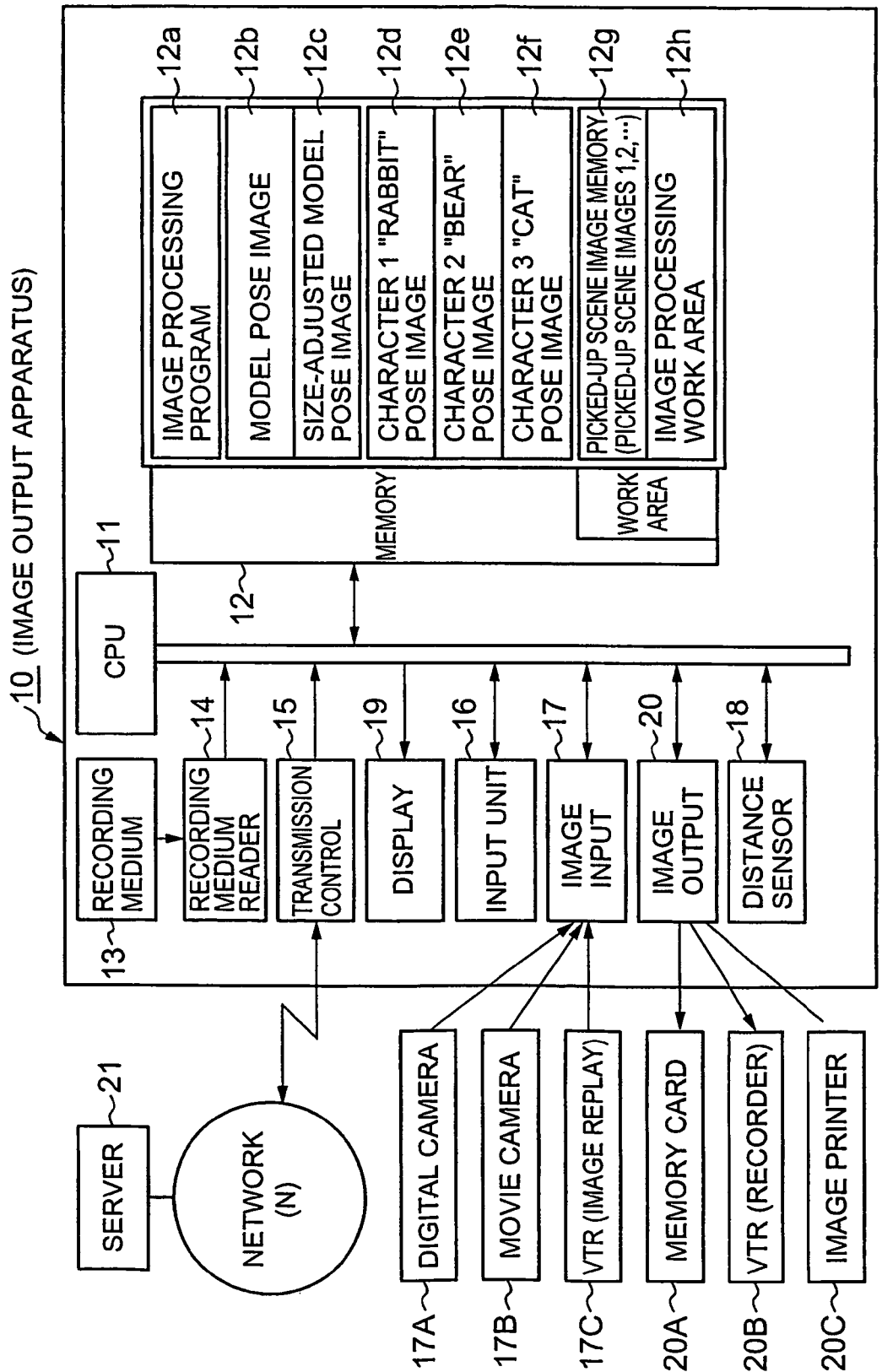
FIG. 1 is a block diagram showing a structure of an electronic circuit of an image output apparatus 10 according to a first embodiment of the present invention.

FIG. 1 is a block diagram showing a structure of an electronic circuit of an image output apparatus 10 according to the first embodiment of the present invention.

This image output apparatus 10 includes a computer, which reads a program recorded on any of various kinds of recording media or a program received externally and controls its own operation in accordance with the program. The electronic circuit of the computer includes a CPU (central processing unit) 11.

The CPU 11 controls the operation of the components of the circuit in accordance with an apparatus control program previously stored in memory 12, an apparatus control program read into the memory 12 through a recording medium reader 14 from an external recording medium 13 such as a CD-ROM, or an apparatus control program read into the memory 12 through an electric transmission controller 15 from a Web server 21 (in this case, a program server) on the Internet N. The apparatus control program stored in the memory 12 is started up by an input signal issued in response to a user's operation of an input unit 16 having keys or a touch panel, or by an image signal input through an image input unit 17, or by a communication signal used to communicate with each Web server 21 on the Internet N, which is connected through the electric transmission controller 15 to the image output apparatus 10.

Besides the memory 12, the recording medium reader 14, the electric transmission controller 15, the input unit 16 and the image input unit 17, the CPU 11 is connected to a distance sensor 18, a display unit 19 including an LED, and an image output unit 20.

The image input unit 17 selectively obtains picked-up scene image data from a digital camera 17A, a digital video movie camera 17B, or a VTR (video player) 17C.

The distance sensor 18 detects a distance between the distance sensor 18 and an object in a scene whose object image is input to the image input unit 17.

The image output unit 20 outputs image data processed by this apparatus based upon the picked-up scene image received through the image input unit 17. The output image data is selectively output to a memory card 20A, a VTR (video recorder) 20B or an image printer 20C to store, record or print the image.

The memory 12 has stored a system program in charge of control of the whole operation of the image output apparatus 10 and a communication program to exchange data with each web server 21 on the Internet N through the electric transmission controller 15. The memory 12 also has stored an image processing program 12a to perform a combining/outputting process for an image corresponding to a target image in the picked-up scene image by the image output apparatus 10 through the image input unit 17 and the image output unit 20.

Again, the memory 12 has prepared a model pose image memory 12b, a size-adjusted model pose image memory 12c, a character 1 "rabbit" pose image memory 12d, a character 2 "bear" pose image memory 12e and a character 3 "cat" pose image memory 12f. Furthermore, it has prepared a picked-up scene image memory 12g and an image processing work area 12h in the work area thereof.

FIG. 2 shows "rabbit", "bear" and "cat" character images striking various poses (part 1) stored in the character 1 "rabbit" pose image memory 12d, the character 2 "bear" pose image memory 12e, and the character 3 "cat" pose image memory 12f, respectively, of the image output apparatus 10.

FIG. 3 shows further "rabbit", "bear" and "cat" character images striking various poses (part 2) stored in the character 1 "rabbit" pose image memory 12d, the character 2 "bear" pose image memory 12e, and the character 3 "cat" pose image memory 12f, respectively, of the image output apparatus 10.

FIG. 4 shows still further "rabbit", "bear" and "cat" character images striking various poses (part 3) stored in the character 1 "rabbit" pose image memory 12d, the character 2 "bear" pose image memory 12e, and the character 3 "cat" pose image memory 12f, respectively, of the image output apparatus 10.

Each of the different types of character images striking various poses stored in the character "rabbit", "bear" and "cat" pose image memories 12d, 12e and 12f is used as one imitating a pose of a respective one of the objects (target) images in a picked-up scene image input from the image input unit 17. Different pose numbers are stored with different poses in corresponding relationship.

FIG. 5 shows images of a model corresponding to various model poses (part 1) stored in the model pose memory 12b in the image output apparatus 10.

Figure 6:
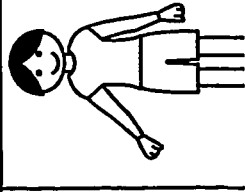
FIG. 6 shows images of further various poses of the model (part 2) stored in the model pose memory 12b in the image output apparatus 10.

FIG. 6 shows further images of the model corresponding to various model poses (part 2) stored in the model pose memory 12b in the image output apparatus 10.

FIG. 7 shows still further images of the model corresponding to various model poses (part 3) stored in the model pose memory 12b in the image output apparatus 10.

Each of the model images striking various poses stored in the model pose image memory 12b is used to obtain a model image similar in pose to an object (target) image in a picked-up scene image input from the image input unit 17. Different poses are stored with different pose numbers in corresponding relationship and model images of three variations A, B and C are stored for each pose number.

The respective "rabbit", "bear" and "cat" character images stored in the character 1 "rabbit" pose image memory 12d, the character 2 "bear" pose image memory 12e, and the character 3 "cat" pose image memory 12f corresponds to the model images striking the poses indicated by all poses numbers (Nos. 1A, 1B, 1C, 2A, 2B, 2C, . . . nA, nB, nC) stored in the model pose image memory 12b.

Figure 8:
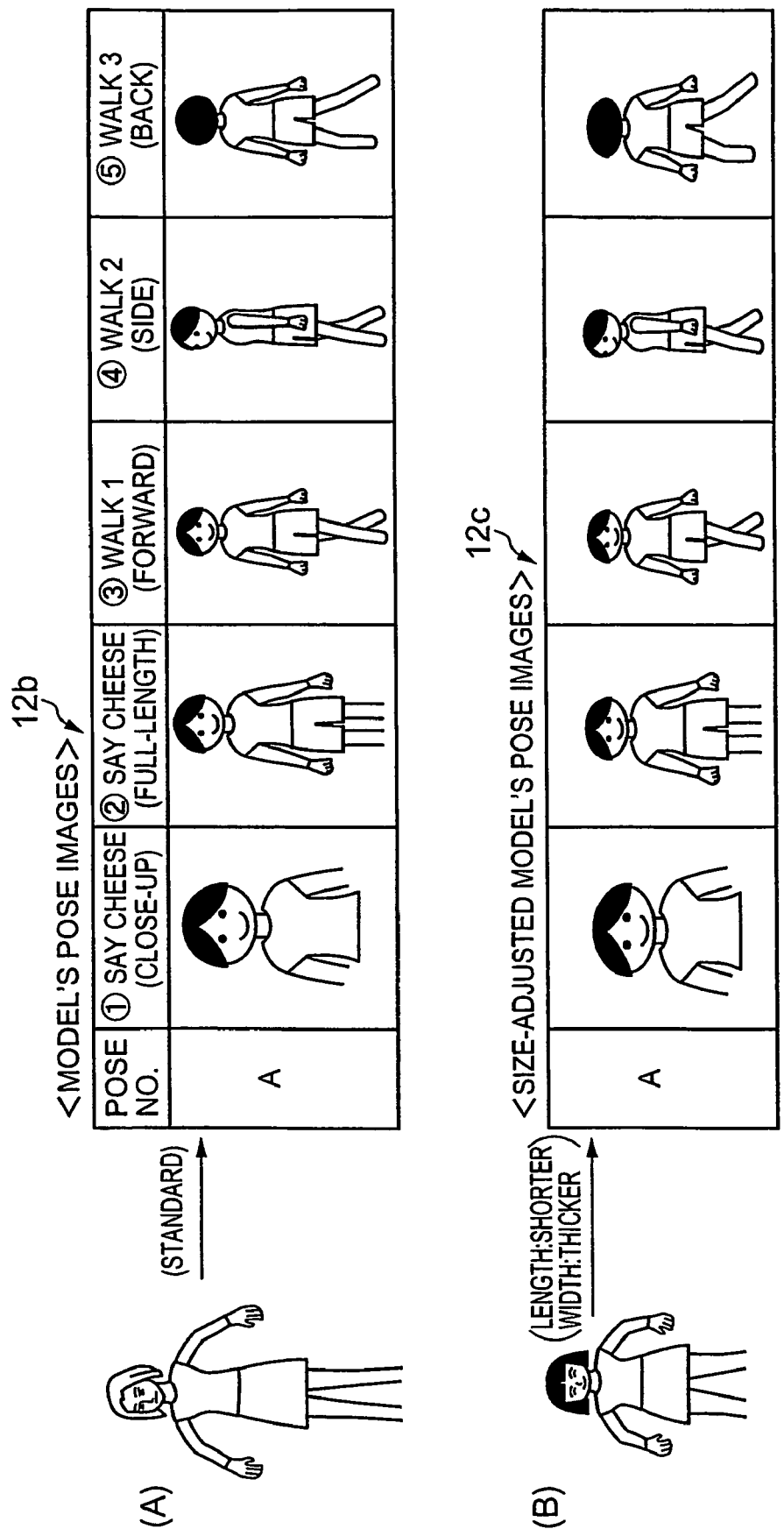
FIG. 8(A) shows, as an example, model images (pose Nos. 1A to 5A) produced based upon a standard body-shaped object image (target image) and stored in a size-adjusted model pose image memory 12c in the image output apparatus 10.
FIG. 8(B) shows, as another example, model images (pose Nos. 1A to 5A) size-adjusted to a nonstandard body-shaped object image (target image) of FIG. 8(B) and stored in the memory 2C.

FIG. 8 shows size-adjusted pose images stored in a size-adjusted model pose image memory 12c of the image output apparatus, in which FIG. 8(A) shows, as an example, model pose images (with pose Nos. 1A to 5A) produced to a standard body-shaped object (target) image shown at the left end of FIG. 8(A) and stored in the memory 12c. FIG. 8(B) shows, as an example, size-adjusted model pose images (with pose Nos. 1A to 5A) obtained by adjusting the size of the respective standard body-shaped model pose images of FIG. 8(A) lengthwise and widthwise to a nonstandard body-shaped object (target) image and stored in the memory 12c.

A size-adjusted model image to be stored in the size-adjusted-model pose image memory 12c is obtained as follows. A standard body-shaped posing model image of a full-length shown by a pose No. 2A in FIG. 8(A) is adjusted in size (lengthwise and widthwise) to a nonstandard body-shaped object image shown in FIG. 8(B) to become a size-adjusted image corresponding to the pose No. 2A. In accordance with a size-adjust ratio (balance) of the size-adjusted model image for the pose No. 2A, all other standard body-shaped model images for the other poses are size adjusted to non-standard body-shaped ones, and then stored in the size-adjusted model pose image memory 12c.

The picked-up scene image memory 12g receives picked-up scene image data from the image input unit 17 and stores the picked-up scene image data in units of a picked-up scene image.

The image processing work area 12h temporarily stores image data to be processed in accordance with the image process program 12a when the image data is processed.

Operation of the image output apparatus 10, structured as described above, will now be outlined.

Figure 9:
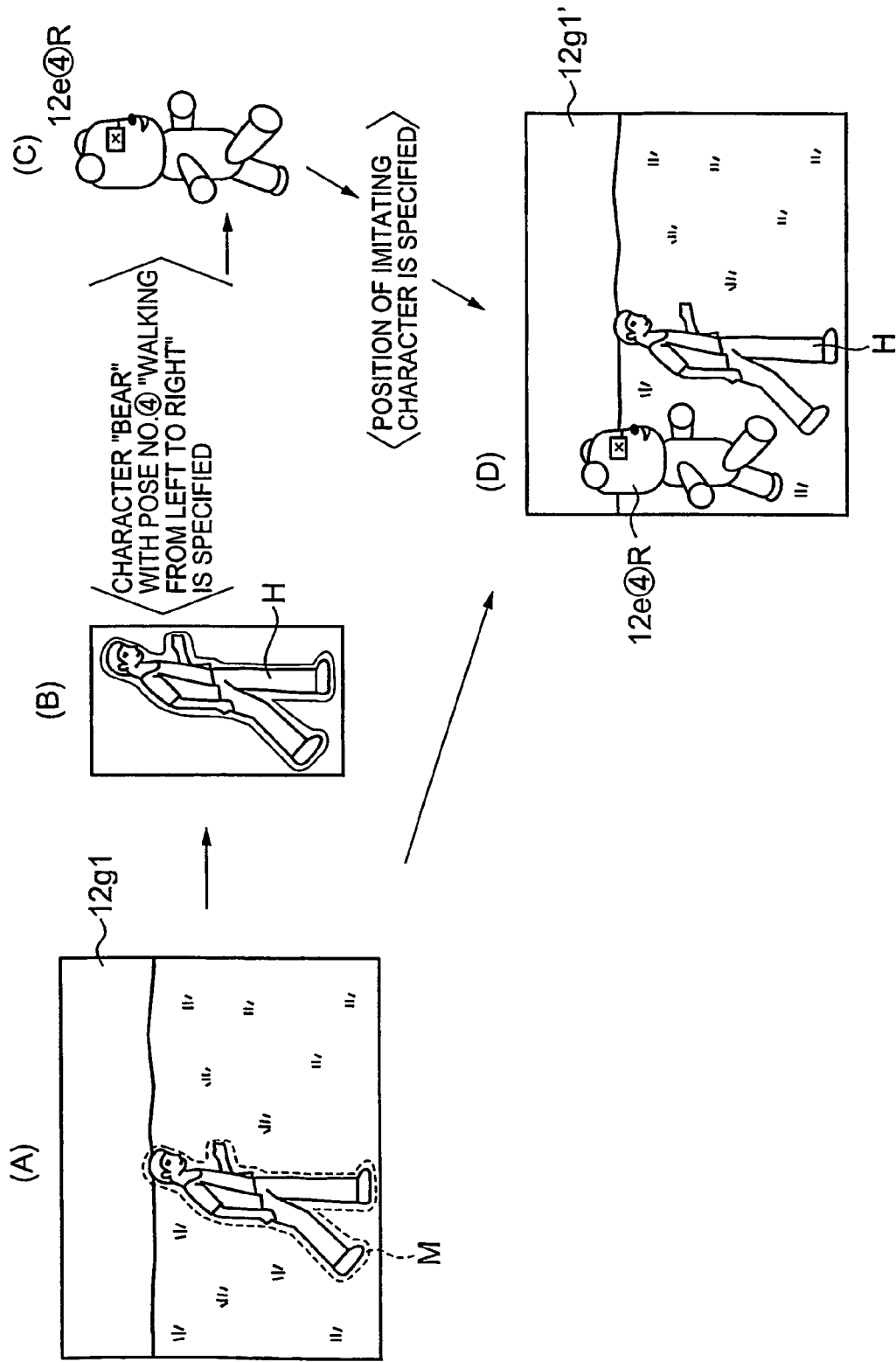
FIG. 9 is a diagram showing addition of a "bear" character image as a follower to a picked-up scene image when a follower add mode is specified by the image output apparatus 10.

FIG. 9 illustrates addition of a "bear" character image as a follower when a follower add mode is specified by the image output apparatus 10.

When an object (target) image H is extracted, as shown in FIG. 9(B), from a picked-up scene image 12g1 of FIG. 9(A) and a "bear" character image is specified as a follower, a "walking" character image "bear" of pose No. 4 (side view) similar in pose to the object image H as shown in FIG. 9(C) is read from the character 2 "bear" pose image memory 12e. Thereupon, a position in a picked-up scene image 12g1 where the object image H was present a certain period of time ago is recognized from the positions of presence of the object image H on the series of picked-up scene images 12g1. The "walking bear" character image (side view) of the pose No. 4 read from the character 2 "bear" pose image memory 12e is added in the picked-up scene image to the position where the object image H existed the certain period of time ago, as shown in FIG. 9(D).

That is, the "walking bear" character image similar in pose to the object image H in the picked-up scene image 12g1 is added to the position in the picked-up image where the "bear" character image follows the object image H.

Figure 10:
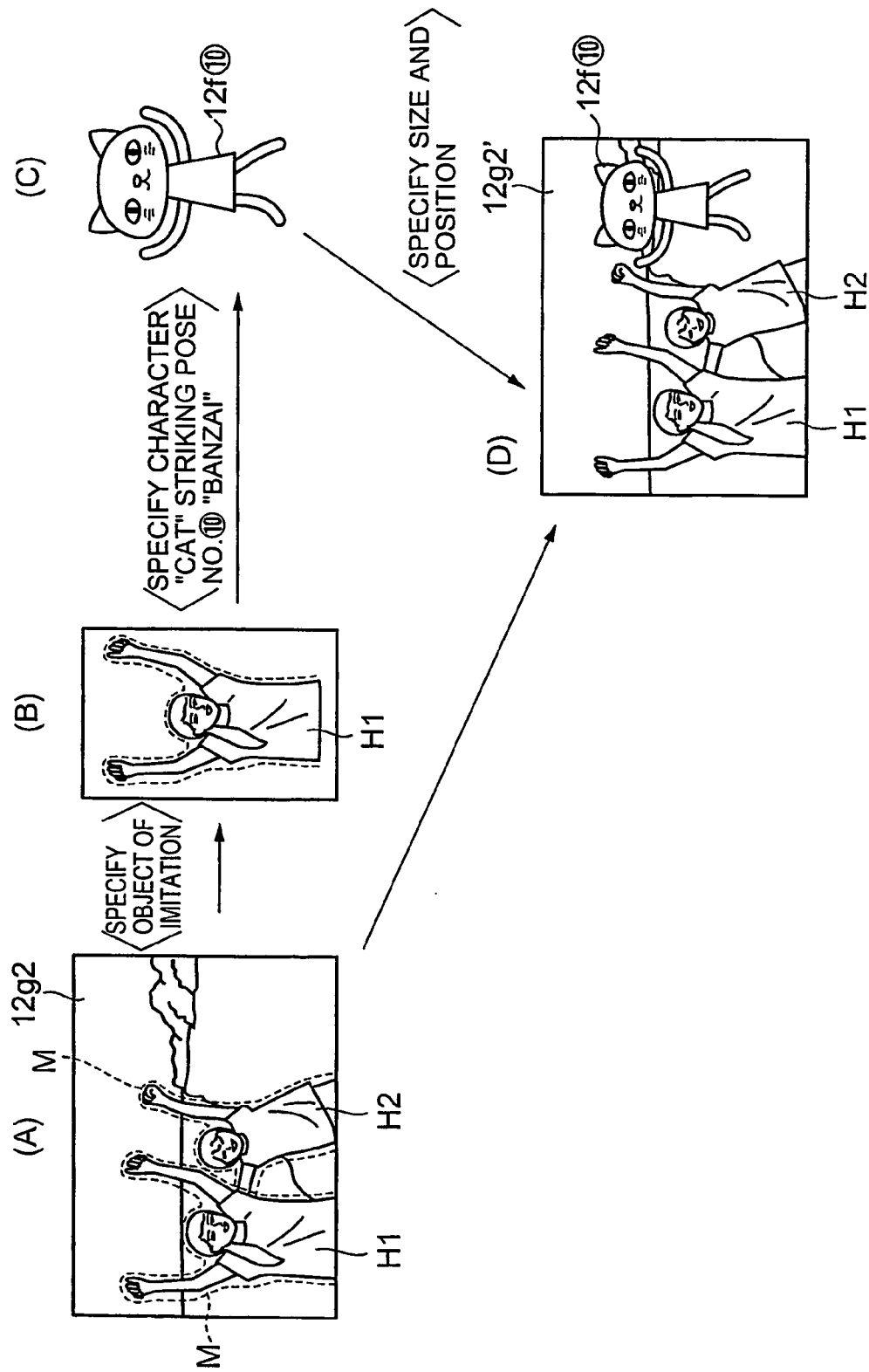
FIG. 10 is a diagram showing addition of a "cat" character image in a space area of a picked-up scene image when a space-area character image add mode is specified by the image output apparatus 10.

FIG. 10 illustrates addition of a "cat" character image in a space area by the image output apparatus 10 when a space-area character image add mode is specified.

If an object (target) image H1 of imitation is specified and extracted from a picked-up scene image 12g2 of FIG. 10(A), as shown in FIG. 10(B) and a "cat" character image is specified as being added in a space area, a "cat" character image of a pose No. 10 ("banzai") similar in pose to the object (target) image H1 is read from the character 3 "cat" pose image memory 12*f* as shown in FIG. 10(C). Then, this read "cat" character image of the pose No. 10 ("banzai") is added to any random position in the space area in the picked-up scene image 12*g*2 where none of the objects (target) images H1 and H2 exists, as shown in FIG. 10(D).

That is, the "cat" character image imitating the pose of the specified object image in the picked-up scene image 12*g*2 is added to any random position in the space area of the picked-up scene image 12*g*2.

Figure 11:
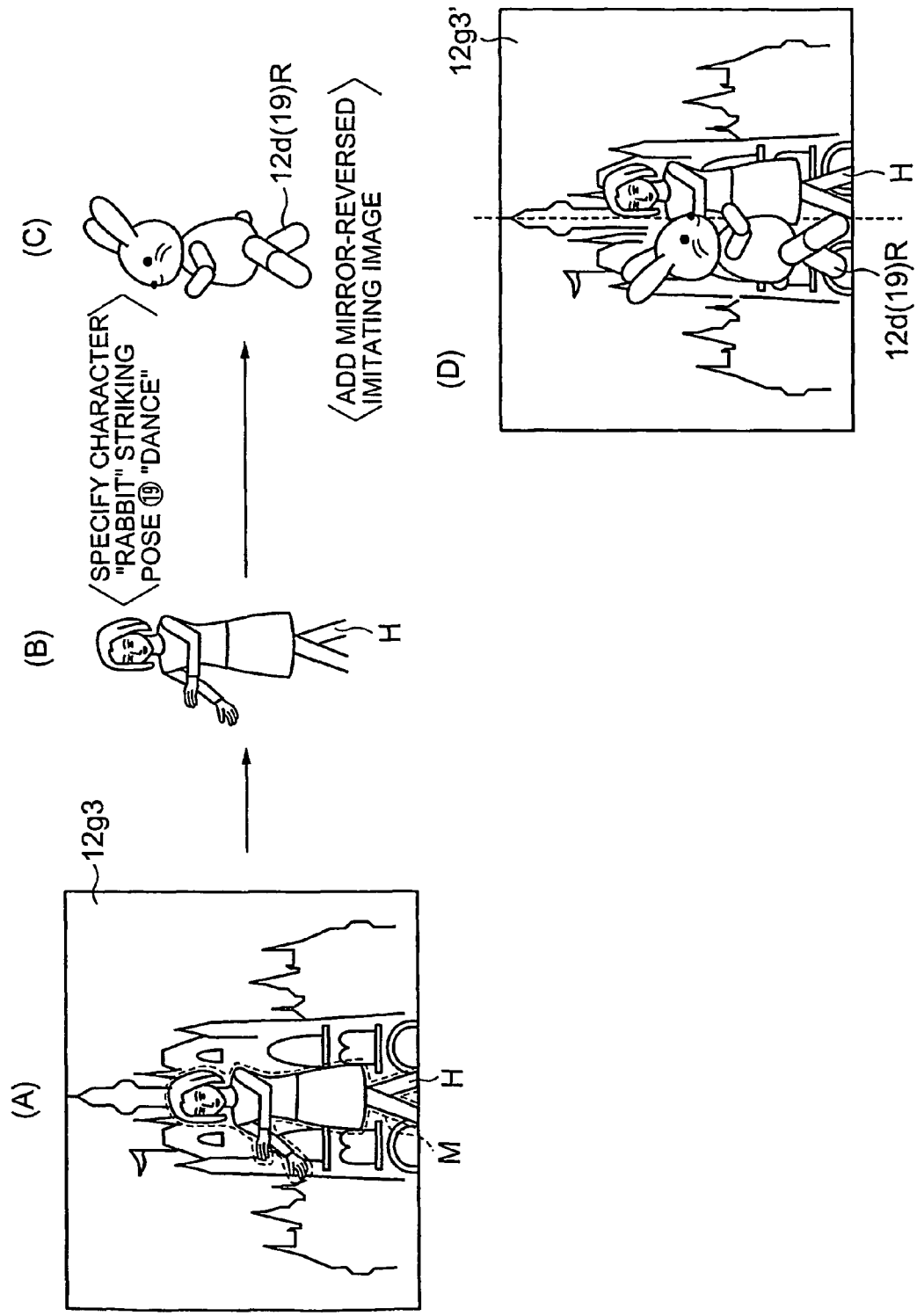
FIG. 11 is a diagram showing addition of a mirror-reversed "rabbit" character image in a picked-up scene image when a mirror-reversed character image add mode is specified by the image output apparatus 10.

FIG. 11 illustrates addition of a mirror-reversed "rabbit" character image when a mirror-reversed image add mode is specified by the image output apparatus 10.

If an object (target) image H is extracted, as shown in FIG. 11(B), from a picked-up scene image 12*g*3 including the object (target) image H conscious of dancing with a partner (not shown), for example, as shown in FIG. 11(A), and a "rabbit" character image is specified as being added as a dance partner character image, a "rabbit" character image of a pose No. 19 ("dance") similar in pose to the object (target) image H is read from the character 1 "rabbit" pose image memory 12*d*, as shown in FIG. 11(C). Thereupon, the read "rabbit" character image is mirror reversed and added as a dance partner to a position in the picked-up scene image 12*g*3 where the mirror-reversed "rabbit" image links with the object (target) image H for dancing purposes, as shown in FIG. 11(D).

That is, the "rabbit" character image imitating the dancing pose of the object image H in the picked-up scene image 12*g*3 is mirror reversed and added as a dance partner to a position in the picked-up scene image where the mirror-reversed "rabbit" links with object image H.

Figure 12:
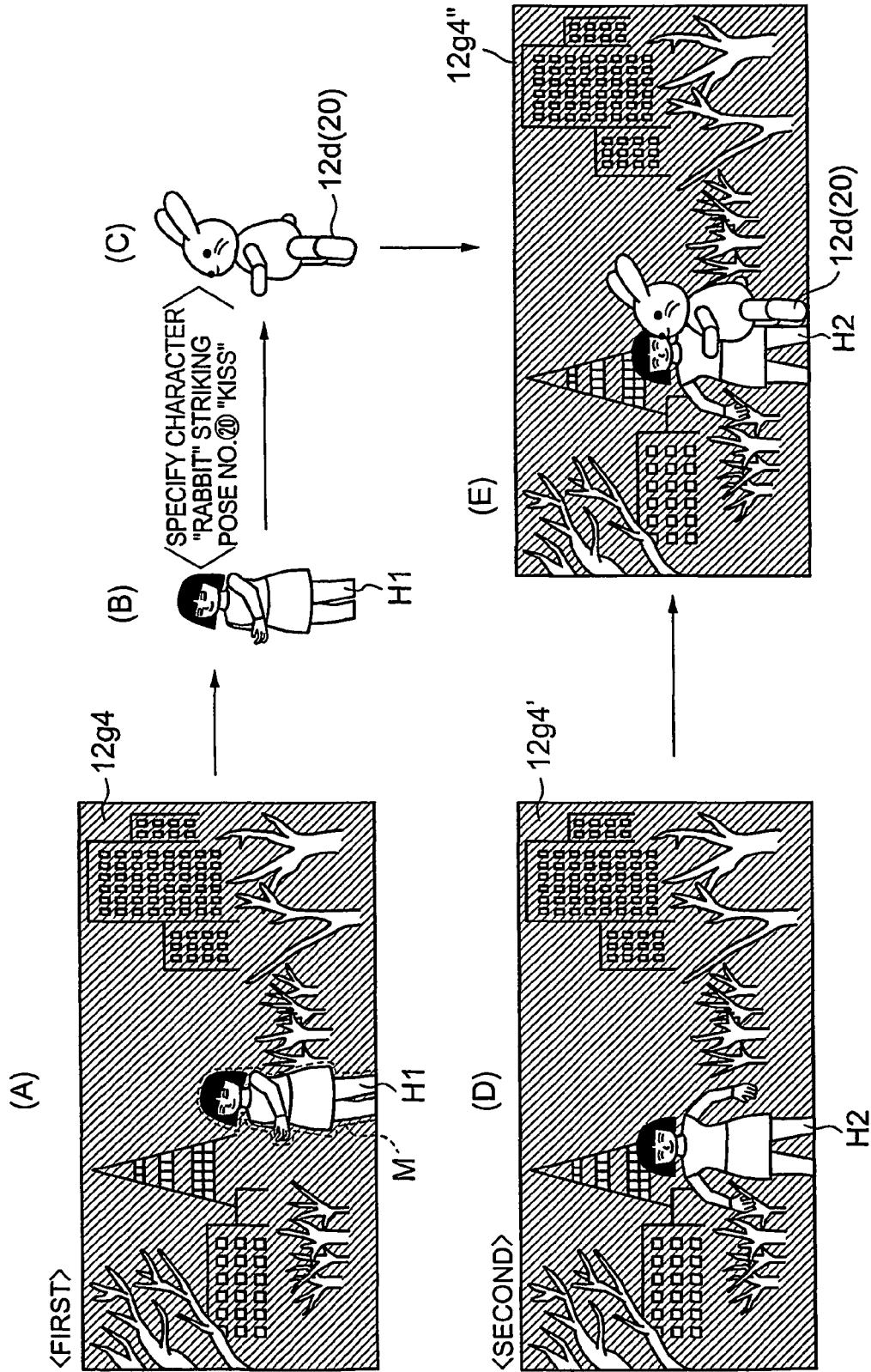
FIG. 12 is a diagram showing replacement of an object image with a "rabbit" character image when a multiple image pickup/replace mode is specified by the image output, apparatus 10.

FIG. 12 illustrates replacement of an object image by a "rabbit" character image when a multiple image pickup/replace mode is specified by the image output apparatus 10.

For example, when the user wishes to produce an scene image in which a "rabbit" character as a replacement image gives a kiss to the user, an object (target) image H1 that is desired to strike a kissing pose is extracted, as shown in FIG. 12(B), from a first picked-up scene image 12*g*4 of FIG. 12(A) containing the object image H1 striking the kissing pose. When a "rabbit" character image is specified as a replacing character image, a "rabbit" character image with pose No. 20 ("kiss") similar in pose to the object (target) image H1, as shown in FIG. 12(C). is read from the character 1 "rabbit" pose image memory 12*d*.

Then, as shown in FIG. 12(D), a "rabbit" character image with pose No. 20 ("kiss") similar in pose to the first object image H1 read from the character 1 "rabbit" pose image memory 12*d* is added to a second picked-up scene image 12*g*4' containing an object image H2 different in pose from the object (target) image H in the first picked-up image, as shown in FIG. 12(E).

That is, the "rabbit" character image imitating the object image H1 in the first picked-up scene image 12*g*4 is combined with the object image H2 in the second picked-up scene image 12*g*4'.

Figure 13:
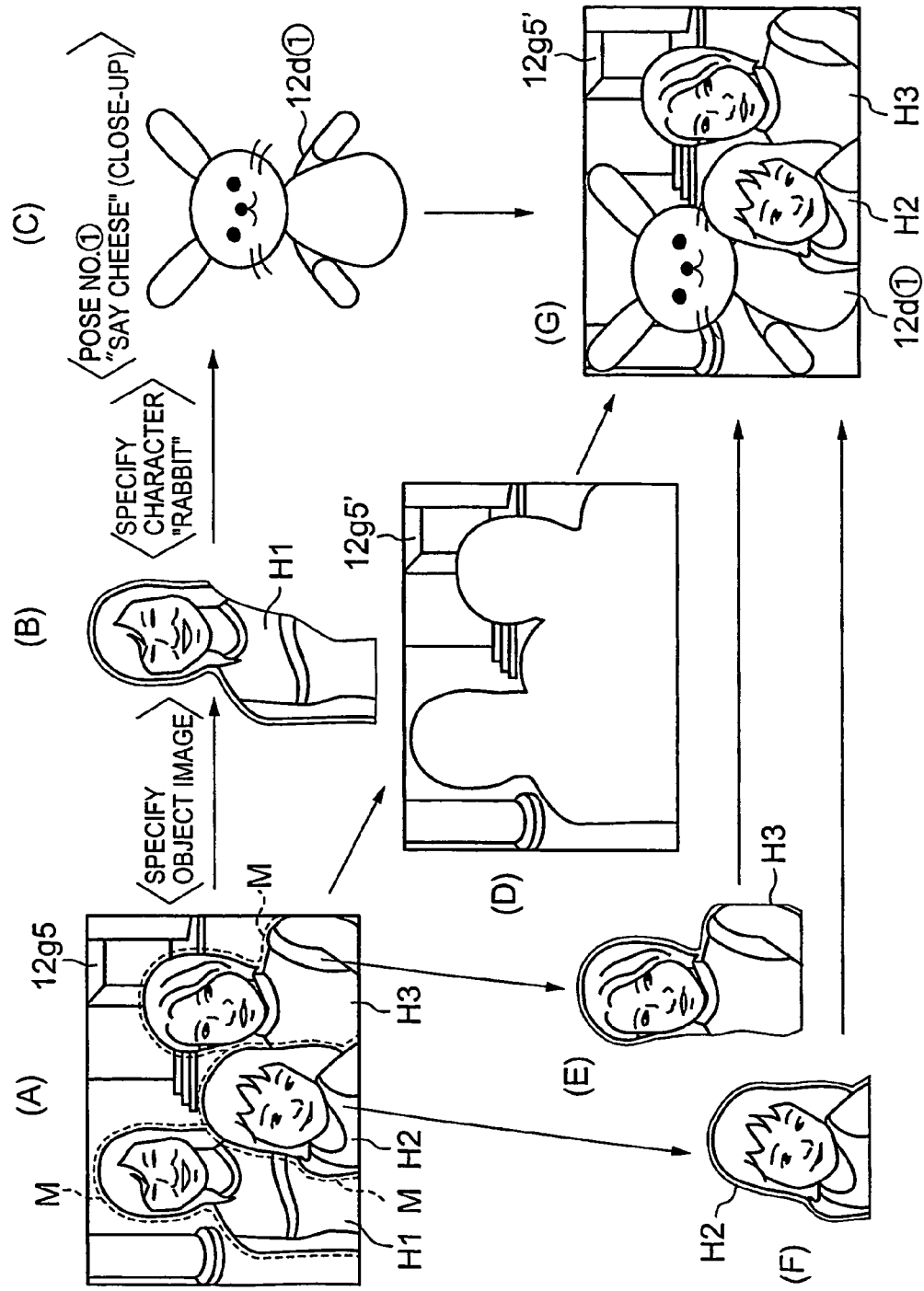
FIG. 13 is a diagram showing replacement of an object image with a "rabbit" character image when an object select/replace mode is specified by the image output apparatus 10.

FIG. 13 illustrates replacement of an object image by a character "rabbit" image when an object select/replace mode is selected by the image output apparatus 10.

If an object image H1 is specified and extracted as one to be replaced, as shown in FIG. 13(B), from a picked-up scene image 12*g*5 containing three object images H1 to H3, for example, as shown as in FIG. 13(A), and a "rabbit" image is specified as a replacing object image, a "rabbit" character image with pose No. 1 (Say cheese (close-up)) similar in pose to the object image H1 is read from the character 1 "rabbit" pose image memory 12*d*, as shown in FIG. 13(C).

On the other hand, the specified object image H1 and other object images H2, H3 are cut out from the picked-up scene image 12*g*5, and a background image 12*g*5' is produced as illustrated by FIGS. 13(B), 13(F), 13(E) and 13(D), respectively.

Thereupon, as shown in FIG. 13(G), the "rabbit" character image similar in pose to the specified object image H1 read from the character 1 "rabbit" pose image memory 12*d*, and the object images H2, H3 cut out of the picked-up scene image 12*g*5 are combined with the background image 12*g*5' at respective proper positions in decreasing order of the image pickup distances to the respective objects whose images were picked up.

That is, the "rabbit" character image imitating the pose of the specified object image H1 in the picked-up scene image 12*g*5 replaces the specified object image H1 to thereby provide a resulting composite image.

Then, the image process which will be performed by the image output apparatus 10 will be described next in more detail.

Figure 14:
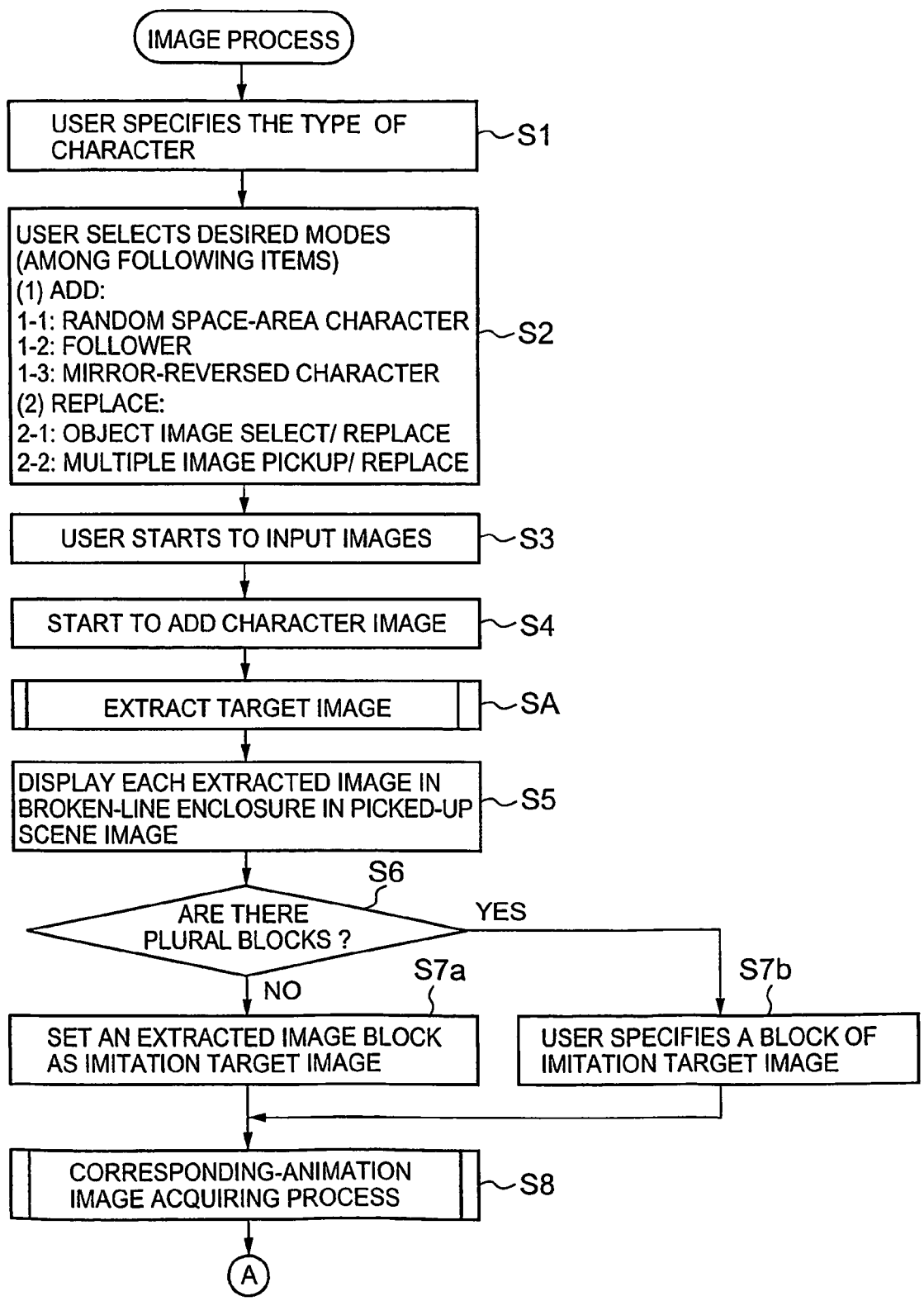
FIG. 14 is a flowchart showing an image process (part 1) to be performed by the image output apparatus 10.

FIG. 14 is a flowchart showing an image process (part 1) to be performed by the image output apparatus 10.

Figure 15:
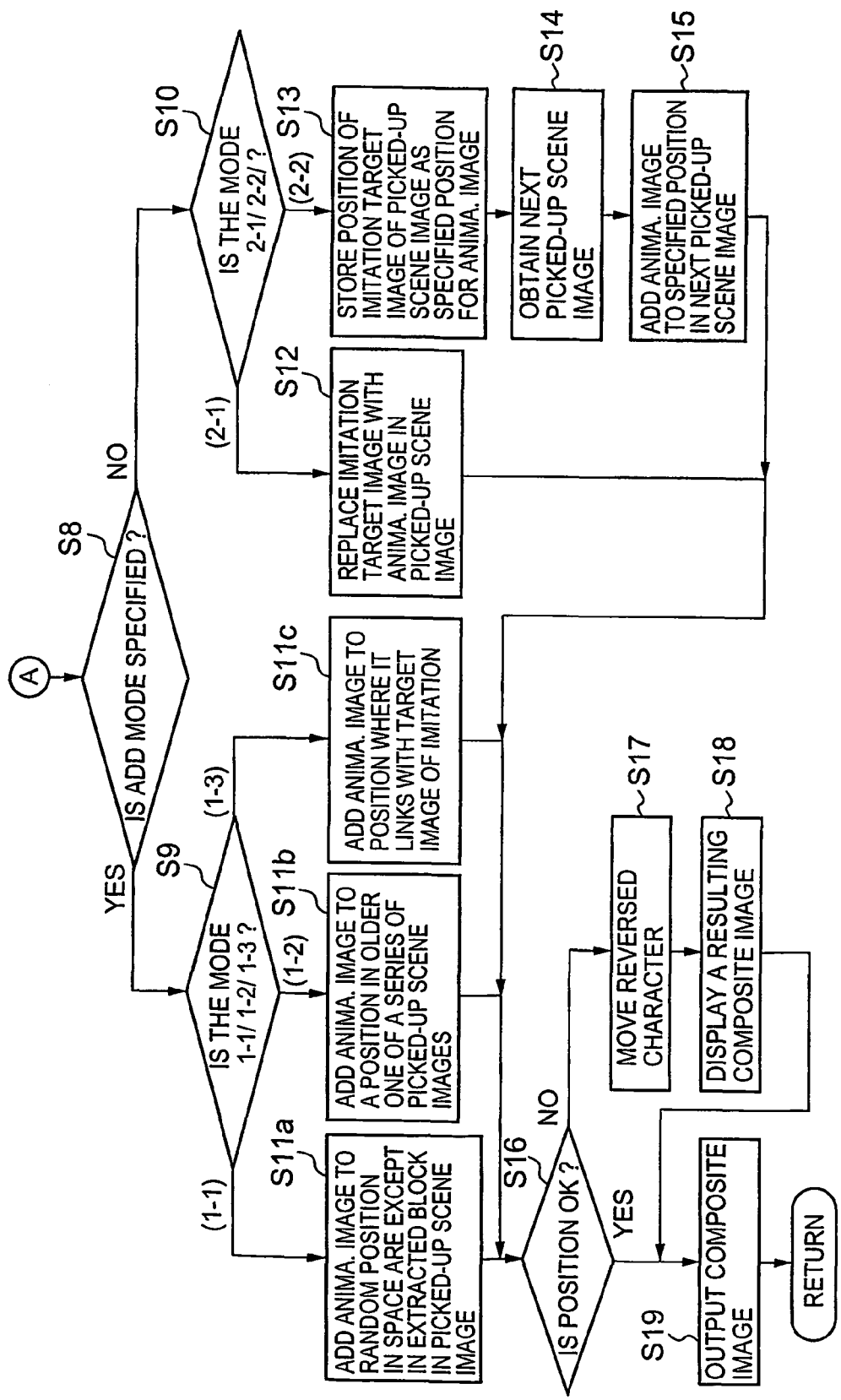
FIG. 15 is a flowchart showing an image process (part 2) continued from the image process (part 1) of FIG. 14 to be performed by the image output apparatus 10.

FIG. 15 is a flowchart showing an image process (part 2) to be performed by the image output apparatus 10, continued from the image process (part 1) of FIG. 14.

The type of a character ("rabbit", "bear" or "cat") to be used as an added character or as a replacement in a picked-up scene image 12*g* is specified by manipulation of the input unit 16 (step S1).

An add/compose mode or a replace/compose mode is selected and specified from among a "1-1: random space-area character image add mode", a "1-2: follower add mode", a "1-3: mirror-reversed character image add mode", and a "2-1: object image select/replace mode", and a "2-2: multiple image pickup/replace mode. (step S2).

When a scene image 12*gn* picked up by a digital camera 17A, a digital video movie camera 17B or a VTR (player) 17C begins to be input to the image output apparatus 12*gn* (step S3) and a start operation is executed to add the specified character image to the scene image 12*gn* (step S4), the process proceeds to extracting the object image in FIG. 16 (step SA).

Figure 16A:
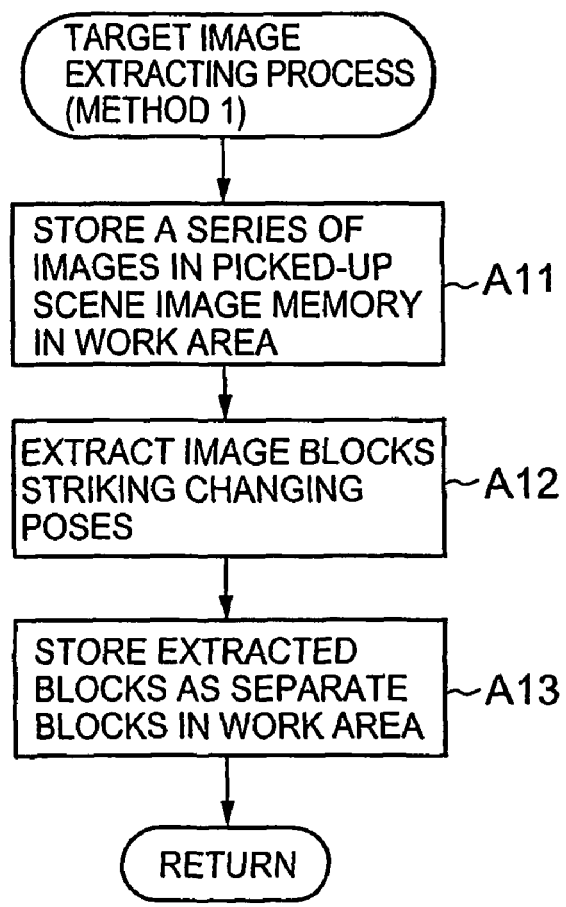
FIGS. 16(A) and (B) show flowcharts showing target image extracting processes (methods 1 and 2), respectively, included in an image process to be performed in the image output apparatus 10.
Figure 16B:
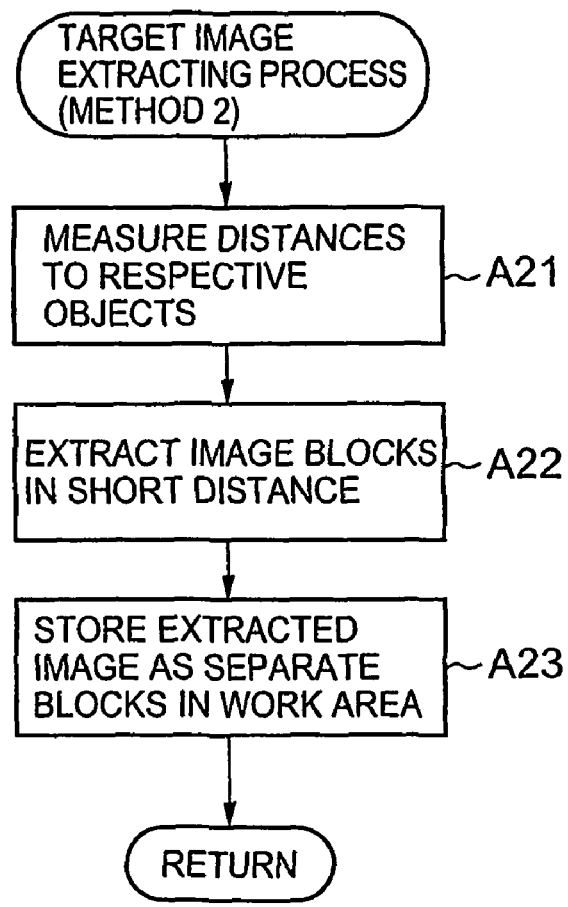

FIGS. 16(A) and 16(B) are flowcharts of target image extracting processes (methods 1 and 2), respectively, included in the image process in the image output apparatus 10.

In the target image extracting process (method 1) of FIG. 16(A), a series of picked-up scene images 12*gn*, input sequentially at predetermined timings through the image input unit 17 to the image output apparatus 10, are stored in the picked-up scene image memory 12*g* in the work area (step A11).

Thereupon, object images Hn striking different poses corresponding to the moves of each object are extracted as respective blocks from each of the series of picked-up scene images 12*gn* stored in the picked-up scene image memory 12*g* (step A12), and are sorted in the image processing work area 12*h* (step A13).

In the target image extracting process (method 2) in FIG. 16(B), a distance between the distance sensor 18 and each of the objects in a scene whose image is picked up is measured by the distance sensor 18 (step A21). The image Hn of each object determined as being present in a short-distance depending upon the distance between the background and the object is extracted as a separate block (step A22).

Each extracted object image Hn is then stored as a separate block in the image processing work area 12*h* (step A23).

When each of the object images Hn included in the picked-up scene image 12gn is extracted as a block from the picked-up scene image 12gn and stored in the image processing work area 12h (step SA), the picked-up scene image 12gn with each extracted object image Hn in a broken-lined enclosure M is displayed on the display 19, for example, as shown in FIG. 9(A), 11(A), 12(A) or 13(A) (step S5).

Then, it is determined whether or not there are a plurality of blocks of object image Hn in the picked-up scene image 12gn displayed on the display 19 (step S6).

If it is determined that there are not a plurality of blocks of object image Hn in the picked-up scene image 12gn, the only one object image Hn extracted from the picked-up scene image 12gn is set as an object image of imitation (step S6→S7a).

If it is determined that there are a plurality of blocks of object image Hn in the picked-up scene image 12gn, a target image of imitation is specified from among the plurality of blocks of object image by the user's manipulation of the input unit 16 (step S6→S7b).

When the object image Hn is specified as the target image of imitation, the process proceeds to a corresponding-animation image acquiring process in FIG. 17 (step SB).

Figure 17B:
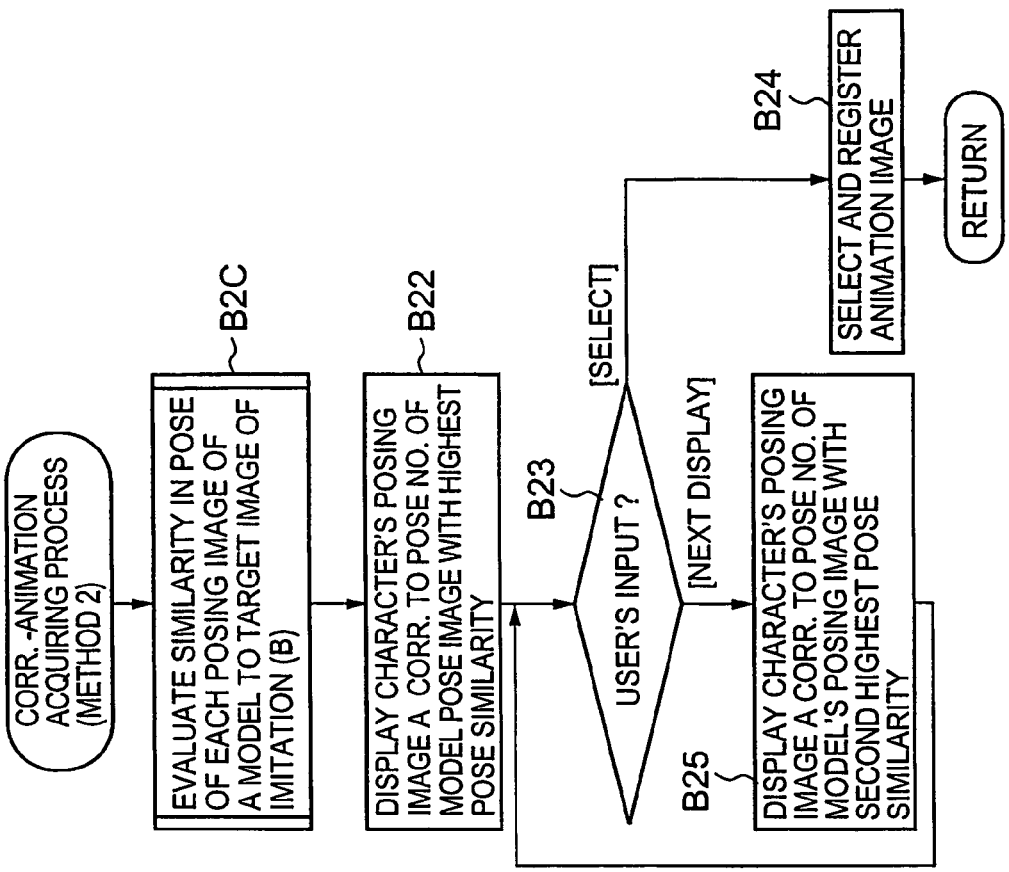
FIGS. 17(A) and 17(B) are flowcharts showing corresponding-animation image acquiring processes (method 1 and 2), respectively, included in the image process to be performed in the image output apparatus 10.
Figure 17A:
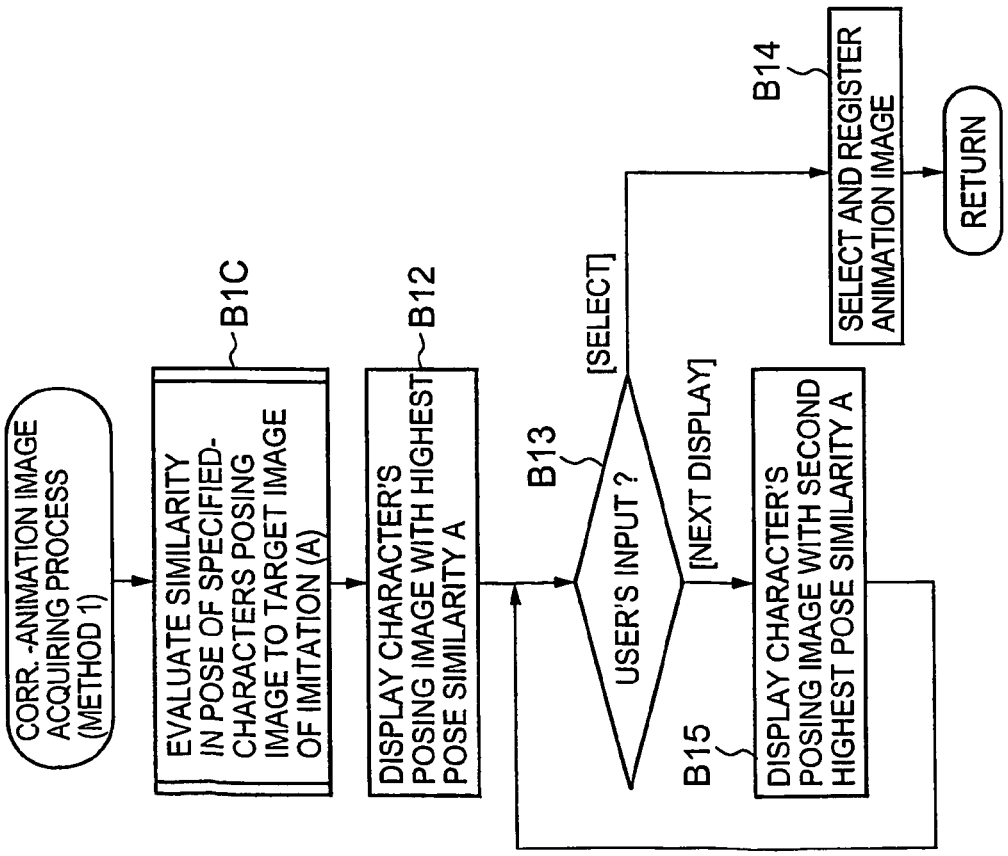

FIGS. 17(A) and 17(B) are different flowcharts showing corresponding-animation image acquiring processes (methods 1 and 2), respectively, included in the image process to be performed in the image output apparatus 10.

In the corresponding-animation image acquiring process (method 1) of FIG. 17(A), a pose similarity of each of the posing images of the specified character to the object image Hn extracted from the picked-up scene image 12gn and set as the target image of imitation is evaluated (step B1C), and a posing character image bearing the highest pose similarity is shown on the display 19 (step B12).

Here, when a posing character image is selected which bears the highest pose similarity to the target image of imitation displayed on the display 19 by the user's manipulation of the input unit 16, the specified character image (with its pose No.) is registered as an animation image corresponding to the target image of imitation. As long as there are posing character images with different pose similarities, a posing character bearing a next highest pose similarity is displayed each time "next display" is clicked (step B13→B14).

On the other hand, if (or each time) the "next display" is clicked by the user's manipulation of the input unit 16 in a state where the character image bearing the highest pose similarity to the target image of imitation is displayed on the display 19, a character images bearing a second highest pose similarity will appear (step B13→B15).

When a character image bearing a desired pose similarity is displayed and selected by the user's manipulation of the input unit 16, the selected character image (specified by its pose No.) is registered as an animation image corresponding to the target image of imitation (step B13→B14).

That is, in the corresponding-animation image acquiring process (method 1), a similarity in pose of the respective posing images of the specified character to the object image Hn as the target image of imitation, which has been extracted from the picked-up scene image 12gn and set as the target image, is directly evaluated. On the basis of this evaluation, a specified character image is determined, which is used as an added character image or as a replacement striking a pose imitating that of the object image Hn.

In the corresponding animation image acquiring process (method 2) in FIG. 17(B), a similarity in pose of each of the posing images of a specified model stored in the model pose image memory 12b to the object image Hn extracted from the picked-up scene image 12gn and set as the target image of imitation is evaluated (step B2C). A specified character image corresponding to the pose No. of a model image bearing the highest pose similarity is shown on the display 19 (step B22).

When a character image is selected which corresponds to a posing model image bearing the highest pose similarity to the target image of imitation displayed on the display 19, by the user's manipulation of the input unit 16, the character image (specified by its pose No.) is registered as an animation image corresponding to the target image of imitation (step B23→B24).

On the other hand, if (or each time) "next display" is clicked by the user's manipulation of the input unit 16 in a state where a character image is displayed on the display 19, which image corresponding to the pose No. of the model image bearing the highest pose similarity to the target image of imitation, a specified character image is displayed corresponding to the pose No. of the model image bearing a second highest pose. As long as there are still posing character images with different pose similarities, a posing character bearing a next highest pose similarity is displayed each time "next display" is clicked (step B23→B25).

Then, when a character image is selected and displayed which corresponds to a model pose image bearing a desired pose similarity and then selected by the user's manipulation of the input unit 16, the specified character image (specified by its pose No.) is registered as an animation image corresponding to the target image of imitation (step B23→B24).

As just described above, in the corresponding-animation image acquiring process (method 2), a similarity in pose of each of the different posing images of a basic model of a human figure to the object image Hn as the target image of imitation extracted from the picked-up scene image 12gn and set as such is evaluated. Then, on the basis of this evaluation, a specified character image is determined, which imitates the pose of the object image Hn, and is used as an added character or as a replacement.

In this case, compared with the corresponding-animation image acquiring process (method 1), in which a similarity in pose of each of the various posing images of a specified character to the object image Hn as the target image of imitation is directly evaluated to thereby determine a character image to be used as an added character or as a replacement, the corresponding-animation image acquiring process (method 2), in which a similarity in pose of the different posing images of the specified model to the object image Hn extracted from a picked-up scene image 12gn and set as a target image of imitation is evaluated, and a character image for use as an added character or as a replacement is determined from a model pose No. selected based upon this evaluation is advantageous in that the use of a human-figure model makes it easy to obtain a model image bearing a higher pose similarity to the object image and obtain a character image bearing a higher pose similarity (imitation).

Figure 18:
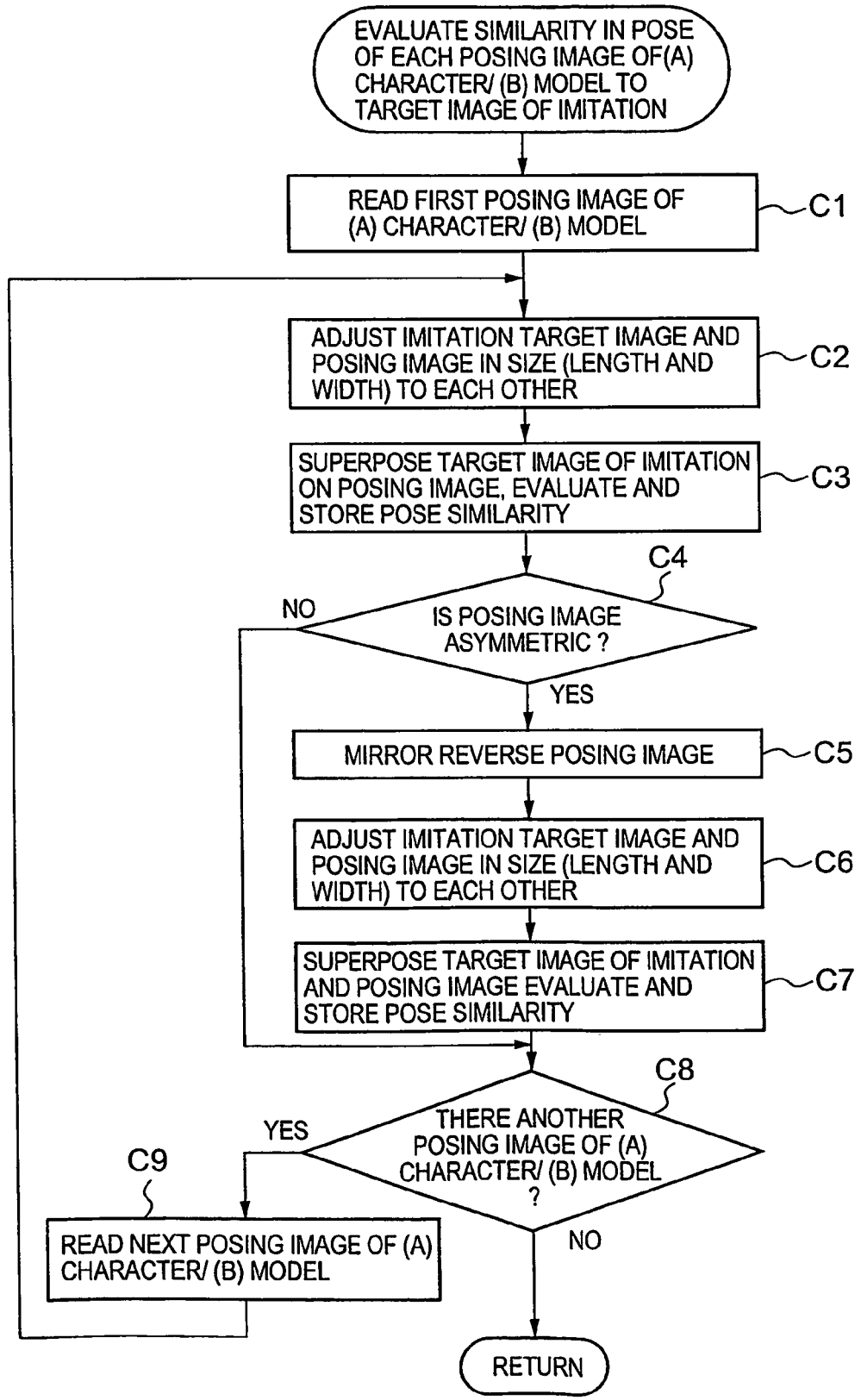
FIG. 18 is a flowchart showing a process for evaluation of a similarity in pose of a character/model image to an target image of imitation included in the corresponding-animation image acquiring process (method 1)/(method 2) of FIG. 17(A)/17(B).

FIG. 18 is a flowchart showing evaluation of a similarity in pose of a character/model image to a target image of imitation in the corresponding-animation image acquiring processes (methods 1 and 2) of FIG. 17 included in the image process to be performed in the image output apparatus 10.

When pose similarity evaluation is executed in the corresponding-animation image acquiring process (method 1), a similarity in pose of each of the various posing images of a specified character to the target image of imitation is evaluated. When pose similarity evaluation is executed in the corresponding-animation of imitation image acquiring process (method 2), a similarity in pose of each of the various posing images of a specified model to a target image of imitation is evaluated.

Figure 19:
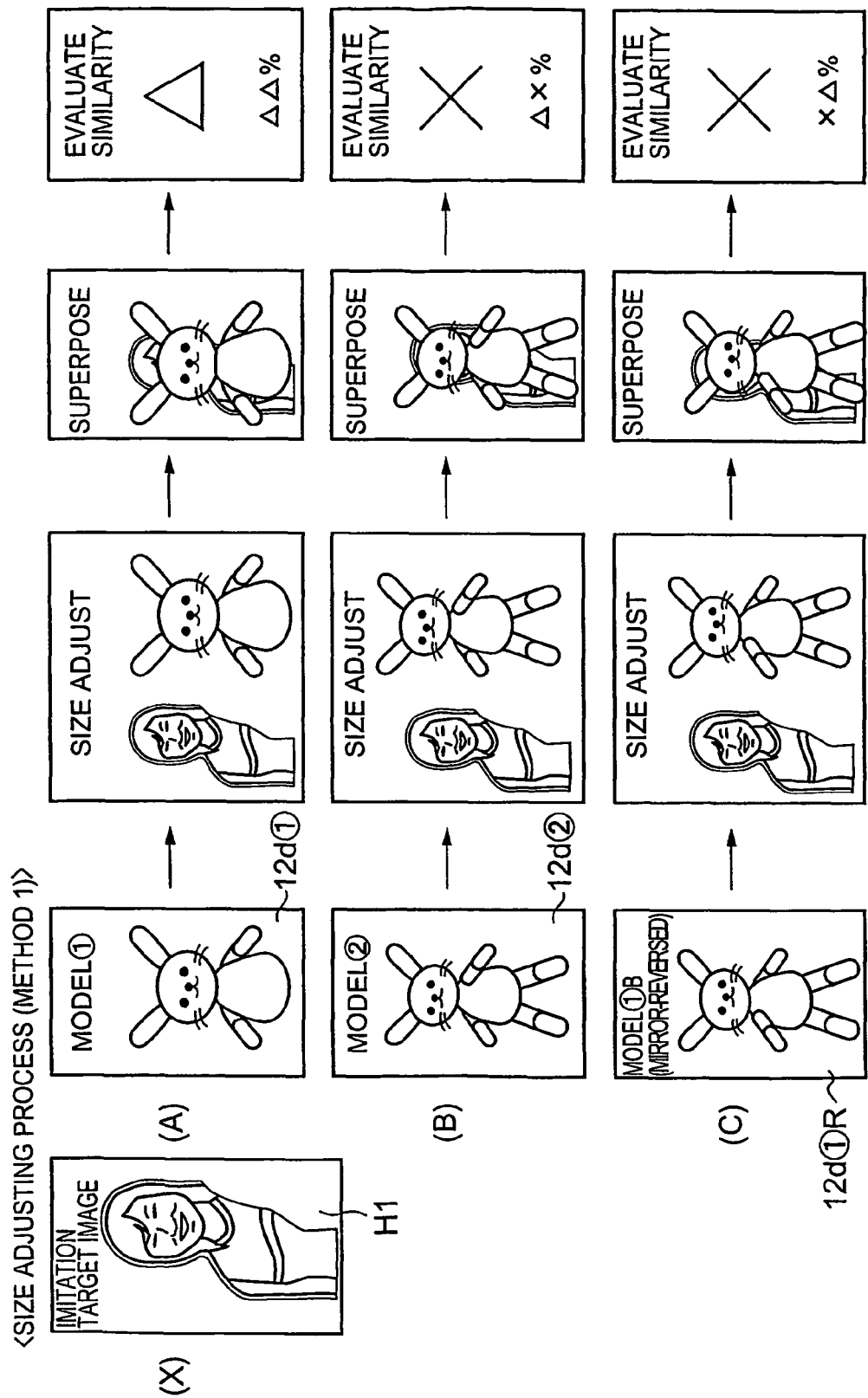
FIG. 19 is a diagram showing a specific example of evaluation of a similarity in pose of a specified character image to a target image in a pose similarity estimating process included in the corresponding-animation image acquiring process (method 1) of FIG. 17(A).

FIG. 19 is a diagram showing an example of evaluation of a similarity in pose of a specified-character image to a target image of imitation included in the pose similarity evaluating process of the corresponding-animation image acquiring process (method 1) to be performed in the image output apparatus 10.

Figure 20:
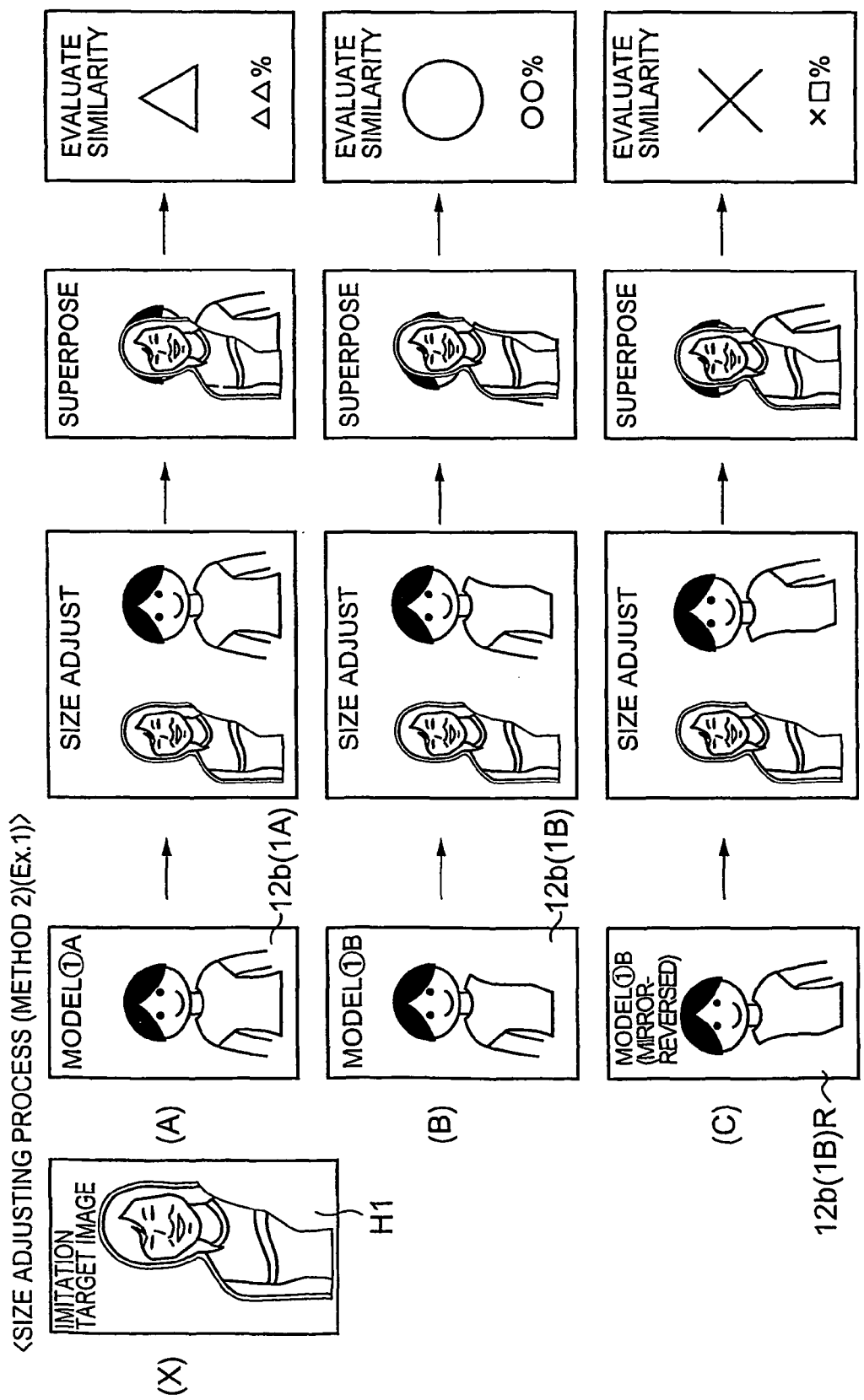
FIG. 20 is a diagram showing a specific example of evaluation of a similarity in pose of a model image to a target image in a pose similarity estimating process included in the corresponding-animation image acquiring process (method 2) of FIG. 17(B).

FIG. 20 is a diagram showing an example of evaluation of a similarity in pose (part 1) of a model image to a target image of imitation included in the pose similarity evaluate process of the corresponding-animation image acquiring process (method 2) to be performed in the image output apparatus 10.

Figure 21:
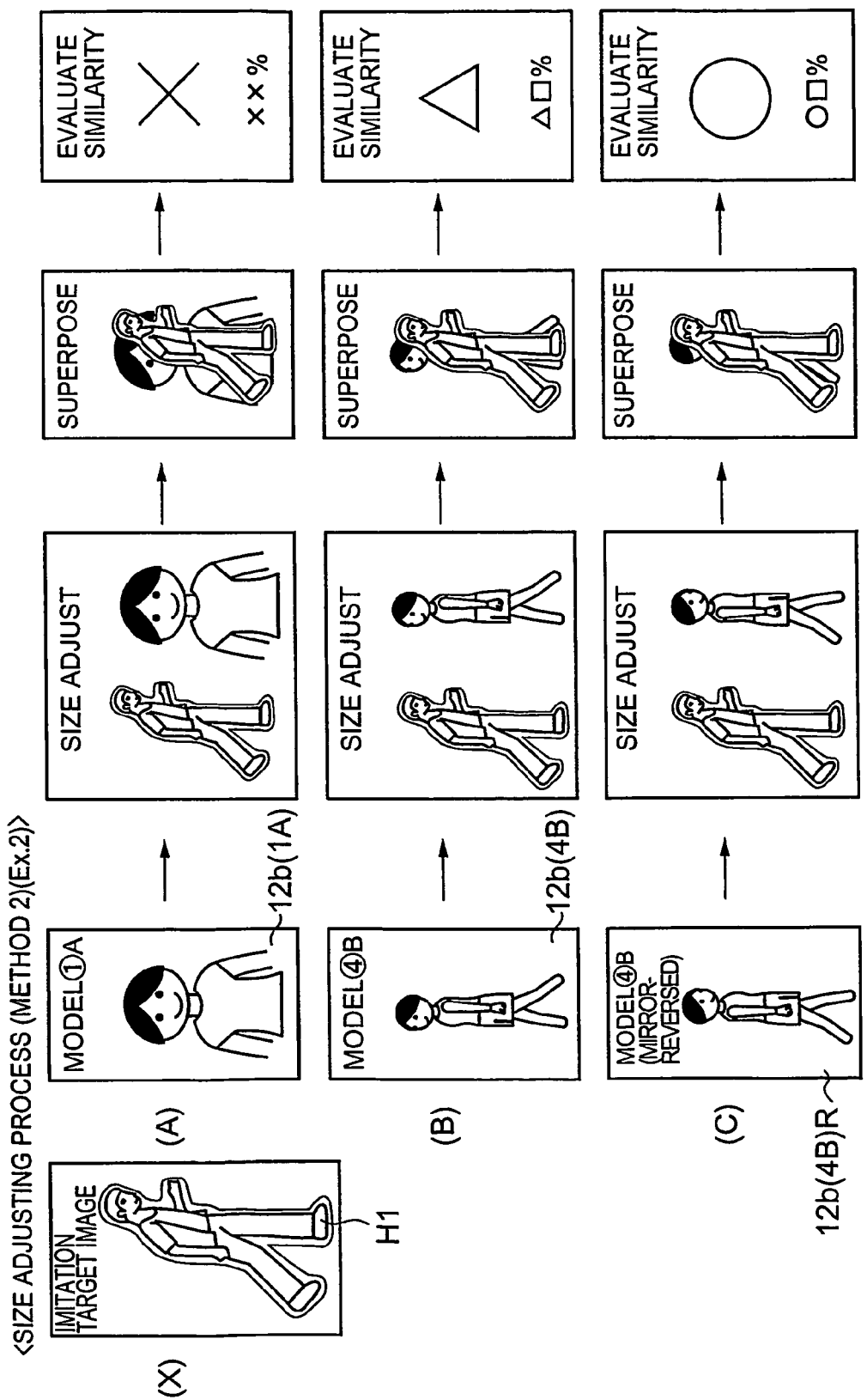
FIG. 21 is a diagram showing another specific example of evaluation of a similarity in pose (part 2) of a model image to a target image in a pose similarity estimating process included in the corresponding-animation image acquiring process (method 2) of FIG. 17(B).

FIG. 21 is a diagram showing an example of evaluation of a similarity in pose (part 2) of a model image to a target image of imitation included in the pose similarity evaluating process of the corresponding-animation image acquiring process (method 2).

First of all, in the similarity evaluation process (method 1), a specified-character image with a first pose No. is read (step C1), for example, as shown in FIG. 19(A) and the specified-character image and the target image of imitation H1 are adjusted so as to coincide in size (lengthwise and widthwise), as shown in FIG. 19(X) (step C2).

Thereupon, the adjusted character image and the target image of imitation H1 are superposed on each other and then a similarity in pose (%) between them is evaluated, and stored as a similarity in pose of the character image to the target image of imitation (step C3).

Here, it is then determined whether the character image (with the first pose No.) as the target of similarity evaluation is asymmetric (step C4). If it is determined that the character image is not asymmetric (step C4, "No"), size adjustment and superposition-similarity evaluation between the target image of imitation and each of the posing images of the specified character having respective successive pose Nos. are sequentially performed, and their similarities are stored, as shown in FIGS. 19(B) and 19(C), for example (step C8→C9→C2-C4).

On the other hand, if it is determined that the character image with the pose No. as the target of similarity evaluation is asymmetric, the character image is mirror reversed (step C4→C5), and the reversed character image and the target image of imitation are adjusted to coincide in size (lengthwise and widthwise) (step C6).

Thereupon, the target image of imitation and the reversed character image are superposed on each other, and a similarity in pose (%) between them is evaluated and stored as the similarity in pose of the reversed image to the target image of imitation (step C7).

Then, if there are still further other posing images of the specified character having successive pose Nos. (step C8), they are sequentially read (step C9), and as described above, a similarity evaluation process is performed repeatedly between the respective posing images of the specified character having the successive pose Nos. and the target image of imitation (steps C2-C7).

For example, as shown in FIG. 19, when a similarity in pose of the "rabbit" character image to the object image (target image) H1 is evaluated, a "rabbit" character image 12d①A with pose No. 1A is evaluated as bearing the highest pose.

Then, when the similarity evaluation process (method 2) is performed, as shown, for example, in FIG. 20(A) or 21(A), a model image of a first pose No. ①A is read (step C1), and adjusted in size (lengthwise and widthwise) to the target image of imitation H1 or H, as shown in FIG. 20(X) or FIG. 21(X) (step C2).

Then, the target image of imitation H1 or H and the adjusted model image are superposed and a similarity in pose (%) between them is evaluated and stored as the similarity in pose of the model image to the target image of imitation (step C3).

Now, it is then determined whether or not the model image as the target of similarity evaluation is asymmetric (step 4). If it is determined that the model posing image 12b(1A) is not asymmetric, for example, as shown in FIG. 20(A) or 21(A) (step C4, "No"), a model image with a next pose No. is read (step C8→C9), and in the same manner as described above, a pose similarity evaluation process is repeated between the target image of imitation H1 or H and the model image of the next pose (steps C2-C4).

On the other hand, as shown, for example, in FIG. 20(B) or 21(B) if it is determined that a model image 12b(1B) or 12b(4B) with pose No. 1B or 4B as the target of similarity evaluation in this instance is asymmetric, the model image with pose No. ①B or ④B is mirror reversed (step C4 to C5), and as shown in FIG. 20(C) or 21(C), this reversed model image 12b(1B)R or 12b(4B)R is adjusted in size (lengthwise and widthwise) to the target image of imitation H1 or H (step C6).

Then, the target image of imitation H1 or H and the reversed and size-adjusted model image 12b(1B)R or 12b(4B)R are superposed on each other, and a similarity in pose (%) between them is evaluated stored as the similarity in pose of the posing reversed model image 12b(1B)R or 12b(4B)R to the target image of imitation (step C7).

Then, if there are further model images with successive pose Nos. (step C8), these model images are sequentially read (step C9), and in the same manner as described, the pose similarity evaluation process is repeated between the target image of imitation and the respective model images (steps C2-C7).

Consequently, as shown, for example, in FIG. 20, if a pose similarity evaluation is performed between the object image (target image) H1 and the respective posing model images, a model image 12b(1B) with pose No. 1B is evaluated as one bearing the highest pose similarity. As shown in FIG. 21 for example, if pose similarity evaluation is carried out between the object image (target image) H and the respective model images, a model image 12b(4B)R with pose No. ④BR is evaluated as one bearing the highest pose similarity.

As described, when a specified character image imitating that of the object image Hn as the target image of imitation extracted from the picked-up scene image 12gn and set as such is determined in the corresponding-animation image acquiring process (step SB) as described with reference to FIGS. 17-21, it is then determined whether a compose mode for the specified image is an add/compose mode or otherwise a replace/compose mode (step S8).

If it is determined that the compose mode for the specified image is the "add/compose mode" and the "1-1: random space-area character image add mode" (step S8 to S9, "1-1"), a "cat" character image 12/⑩ which imitates a pose "banzai" of the object image H1 as the target of imitation obtained in the corresponding-animation image acquiring process (see FIG. 17) is added to and displayed at a random position in a space area other than in an area of the extracted object blocks M in the picked-up scene image 12g2', as shown in FIG. 10(D), for example (step S11a).

At this time, if the manual operation is performed to move the "cat" character image 12/⑩ from its present position where the "cat" character image is added in the picked-up scene image 12g2' to any specified different position (step S16 to S17), the "cat" character image is then added again to the different position and a resulting composite image is displayed (step S18).

Thereupon, data on the composite image is output from the image output unit 20 (step S19), recorded on a memory card 20A or a VTR (recorder) 20B or otherwise printed by an image printer 20C on demand.

If it is determined that the specified image compose mode is the "add/compose mode" and the "1-2: follower add mode" (step S8→S9, "1-2"), as shown, for example, in FIG. 9 a reversed "bear" character image 12e④R imitating a "walking" pose of the object image (target image) H in the picked-up scene image 12g1, obtained in the corresponding-animation image acquiring process (see FIG. 17), is added to and displayed at a position in the picked-up scene image 12g1' where the "bear" character image, so to speak, follows the object (target image) H, in other words, at the position of the object image (target image) H in a relevant one of the series of picked-up scene images 12g1 a certain time ago, as shown in FIG. 9(D) (step S11b).

At this time, if the added and displayed "bear" character image 12e④R is moved by a manual operation from its present position to any specified different position (step S16→S17), the "bear" character image is moved to the different position to thereby display a resulting composite image (step S18).

Thereupon, image data on this composite image is output from the image output unit 20 (step S19), and recorded on a memory card 20A or the VTR (recorder) 20B or otherwise printed out by the image printer 20C on demand.

If it is determined that the compose mode for the specified image is the "add/compose mode" and the "1-3: mirror-reversed character image add mode (step S8 to S9 "1-3"), as shown, for example, in FIG. 11 the "rabbit" character image 12d⑲ A (FIG. 11(C)) imitating a dancing pose of the object (target) image H in the picked-up scene image 12g3, obtained in the corresponding-animation image acquiring process (see FIG. 17), is mirror reversed, added to a position where the reversed "rabbit" character image links with the object (target) image H striking a dancing pose in the picked-up scene image 12g3', and a resulting composite image is displayed, as shown in FIG. 11(D) (step S11c).

When in this case a process for moving the mirror reversed "rabbit" character image 12d⑲ R displayed at the position in the picked-up scene image 12g3 in which the mirror reversed "rabbit" character image links with the object (target) image H from its present position to any specified different position is performed manually (step S16→S17), the mirror-reversed "rabbit" image 12d⑲ R is moved to the different position to thereby provide a resulting composite image, which is then displayed (step S18).

Thereupon, data on this composite image is outputted from the image output unit 20 (step S19), recorded on the memory card 20A or VTR (recorder) 20B or otherwise printed out by the image printer 20C on demand.

If it is determined that the specified image compose mode includes the "replace/compose mode" and the "2-1: object select/replace mode" (step SB8→S10, "2-1"), the specified object (target) image H1 as the target image of imitation specified in the picked-up scene image 12g5 acquired in the corresponding-animation image acquiring process (FIG. 17) is replaced with a "rabbit" character image 12d①) imitating the pose of the object image H1 (step SB18), and a resulting composite image is then displayed, as shown in FIG. 13(G).

In this case, three object images, that is, the object (target) image H1 and other two object images H2 and H3 are cut out from the picked-up scene image 12g5 to thereby provide a picked-up background image 12g5'. The "rabbit" character image 12d① similar in pose to the object image H1, the remaining two object images H2 and H3 cut out from the scene image 12g5 are then added to the respective proper positions in the picked-up background image 12g5' in decreasing order of the image pickup distances to the respective objects concerned sensed by the distance sensor 18 in the image pickup to thereby provide a resulting composite image.

Without producing the remaining background image 12g5', the "rabbit" character image 12d① similar in pose to the object (target) image H1 and the other two images H2 and H3 may be added to the their proper positions in the picked-up scene image 12g5 in decreasing order of the image pickup distances to the respective objects concerned sensed by the distance sensor 18 in the image pickup to thereby provide a resulting composite image.

When the process for moving the "rabbit" character image 12d① added in place of the target image H1 in the picked-up scene image 12g5" from its present position to any specified different position is performed (step S16→S17), the "rabbit" character image 12d① is moved to the specified different position in the picked-up scene image 12g5" to thereby provide a resulting composite image, which is then displayed (step S18).

Thereupon, data on the composite image is outputted from the image output unit 20 (step S19), recorded on the memory card 20A or VTR (recorder) 20B or otherwise printed by the image printer 20C, on demand.

If it is determined that the image compose mode includes the "replace/compose" mode and the "2-2: multiple image pickup/replace mode" (step S8→S10, "2-2"), the position of the object (target) image H1 in the first picked-up scene image 12g4 is stored, for example, as the one where the object image H1 is to be replaced with an imitating image, as shown in FIG. 12 (step S10→S13).

When a second scene image 12g4' is picked up (step S14), a "rabbit" character image 12d(20) imitating the pose of the object image H1 acquired in the corresponding-animation image acquiring process (FIG. 17) is added in the second-time picked-up scene image 12g4' to a position corresponding to the stored position of the object (target) image H1 in the first picked-up scene image 12g4 such that the "rabbit" character image 12d(20) links with the object image H1 and a resulting composite image 12g4" is then displayed (step S15).

When the process for moving the "rabbit" character image 12d(20) from its present position to any specified different position is performed manually in the second picked-up scene image 12dg4' (step S16→S17), the "rabbit" character 12d (20) is moved to the specified different position and a resulting composite image is displayed (step S18).

Thereupon, image data on this composite image is then outputted from the image output unit 20 (step S19), recorded on the memory card 20A or the video tape recorder 20B or otherwise printed out by the image printer 20C on demand.

As will be obvious from the above, according to the image processing function of the image output apparatus 10, when an object image is extracted from the scene image received through the image input unit 17, any particular type of character image similar in pose to the extracted object image is selected from among the character 1 "rabbit" pose image memory 12d, the character 2 "bear" pose image memory 12e and the character 3 "cat" pose image memory 12f, the selected particular type of character image replaces the object image in the picked-up scene image, or is added to the picked-up scene image to thereby provide a resulting composite image. That is, a very delightful scene image which uses the animation image imitating the pose of the target object as an added one or otherwise as one replacing the target object is easily created without creating a scene image to which a fixed animation image is simply added in the image pickup frame.

A function of the image output apparatus 10 that adjusts the size of a model image will be described next. In the function of adjusting the size of the model image, the posing model images coincident in size to the standard body-shaped object (target) images and stored in the model pose image memory 12b are adjusted in size to a non-standard body-shaped object (target) image and stored as size-adjusted model images in the size-adjusted model pose image memory 12c. In the corresponding-animation image acquiring process (part 2), a size-adjusted model image stored in the adjusted-model pose image memory 12c is used to evaluate a similarity in pose of the adjusted model image to an object image as the target image of imitation to thereby obtain a corresponding specified-character image bearing that pose similarity. This allows a character image similar in pose to an object image having any body shape to be obtained easily.

Figure 22:
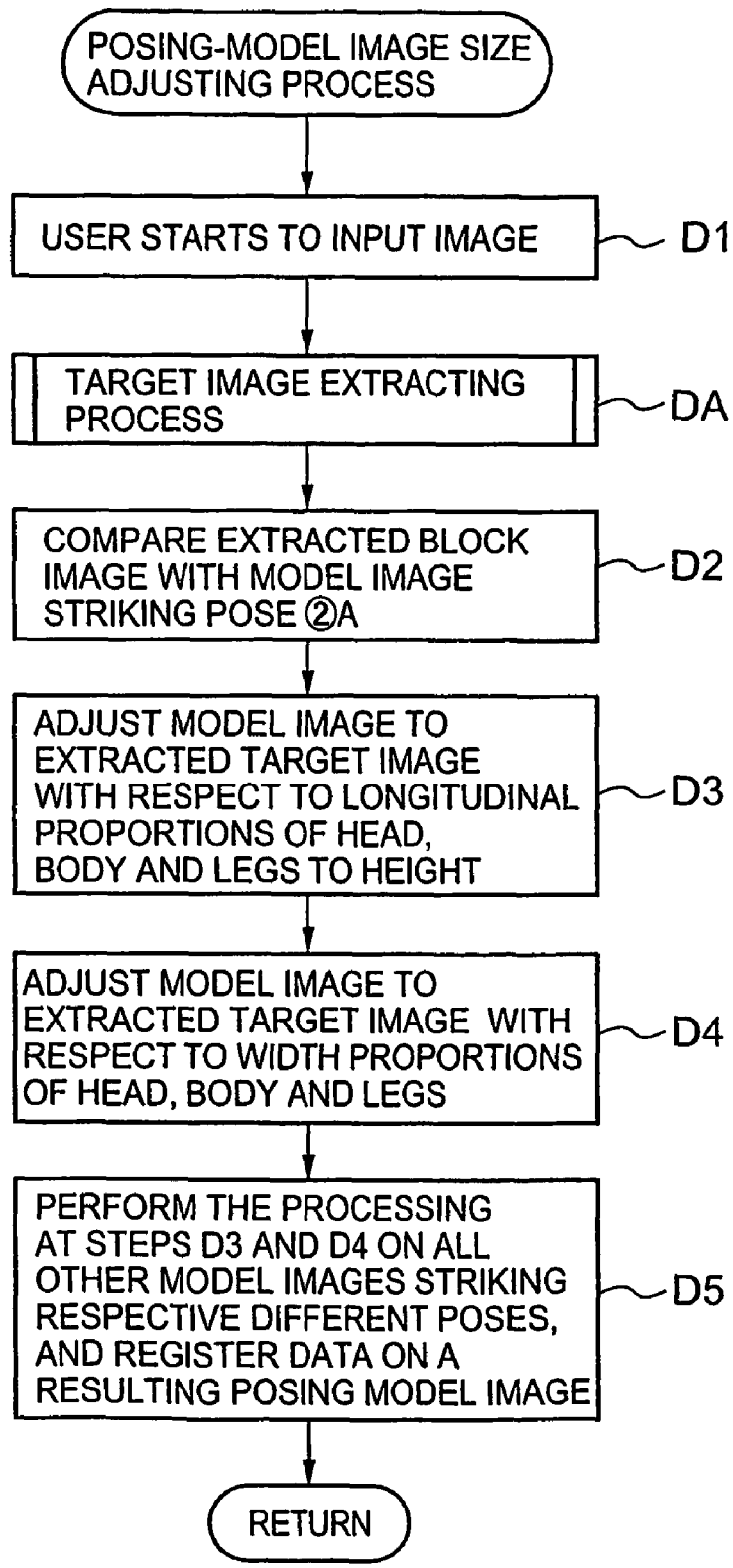
FIG. 22 is a flowchart showing a size adjusting process for a posing model by the image output apparatus 110.

FIG. 22 is a flowchart of a posing model size adjust process to be performed by the image output apparatus 10.

When a picked-up image representing a scene containing an object including, for example, a non-standard body-shaped full length figure of the user shown in FIG. 8(B) is inputted via the image input unit 17 (step D1), a image of the user as an object is extracted in the target image extracting process (method 1 or 2) of FIG. 16 (step DA) and compared to a model image 12b②A of a standard body-shaped full length stored in the model pose image memory 12b (step D2).

Then, the model image 12b②A is adjusted in size to the object image extracted from the picked-up scene image with respect to the longitudinal proportions of face, body and legs (step D3) and then with respect to the width proportions of face, body and legs (step D4).

Thereupon, all other posing model images stored in the model pose image memory 12b are adjusted in size to the size-adjusted model image 12b②A and then registered in the size-adjusted model pose image memory 12c (step D5).

As described above, a similarity in pose of any one of the size-adjusted model images stored in the size-adjusted model pose image memory 12c to an object image as the target image of imitation is evaluated and a character image bearing a similarity equal in pose to the object image is obtained such that character images similar in pose to object images having all kinds of body shapes can be easily obtained. A character image more similar in pose to the object image as the target object of imitation can be added to the picked-up scene image or replace the object image in the picked-up scene image to thereby provide a resulting composite image.

While in the embodiment a character image similar in pose to the object image extracted from the picked-up scene image is selectively obtained and its animation image is used as an added one or a replacement in the picked-up scene image to thereby output a resulting composite image, face images having various expressions and persons' images actually picked-up may be stored beforehand and used individually as an added one or a replacement imitating the pose of the object image extracted from the picked-up scene image in the picked-up scene image to thereby output a resulting composite image.

The present invention can be implemented well in a digital camera. If the present invention is implemented, especially in a digital camera with a liquid crystal display, an object image can be picked up so that a resulting composite image may be confirmed on the spot.

While in the embodiment the picked-up scene image as a still image has been illustrated, object images changing in time series relative to the background image of dynamic images inputted via the image input unit 17, for example, a digital video movie 17B may be sequentially extracted from the dynamic images. Character images similar in pose to the sequentially extracted object images, respectively, may be selectively acquired and added to the picked-up dynamic images or replace the object images in the respective dynamic images to thereby provide a resulting series of composite dynamic images.

The image processing function of the embodiment may be used to replace a character image as a target image of imitation specified and extracted from animation images, for example, used in a game with a prepared desired character image or a person's image picked up actually to thereby display a resulting composite image.

The respective processes performed by the image output apparatus 10 described in the embodiment, that is, any one of the image process shown in the flowcharts of FIGS. 14 and 15, the object image extracting process included in the image process shown in the flowchart of FIG. 16, the corresponding-animation image acquiring process included in the image process shown in the flowchart of FIG. 17, the process for evaluating the similarity in pose of a character (or model) image to the object image shown in the flowchart of FIG. 18 included in the corresponding-animation image acquiring process, and the posing model size-adjusting process shown in the flowchart of FIG. 22 can be stored and distributed as programs, which a computer can execute, on memory cards (ROM and RAM cards, etc.), magnetic discs (floppy discs, hard discs, etc.), optical discs (CD-ROMs, DVDs, etc.), or external recording mediums 13 such as semiconductor memories, etc. Various computer terminals having a communication function with a communication network (the Internet) N can read the programs stored in the external recording mediums 13 through the recording medium reader 14 into the memories 12 and control its operation in accordance with the read programs to thereby perform the image processing functions described in the embodiment and perform processes similar to the methods mentioned above.

Data included in the programs to perform the respective above-mentioned processes can be transmitted via the communication network (the Internet) N in the form of a program code. The program data can be taken from the computer terminals connected to the communication network (the Internet) N to thereby perform the above-mentioned image processing functions.

Second Embodiment

Figure 23:
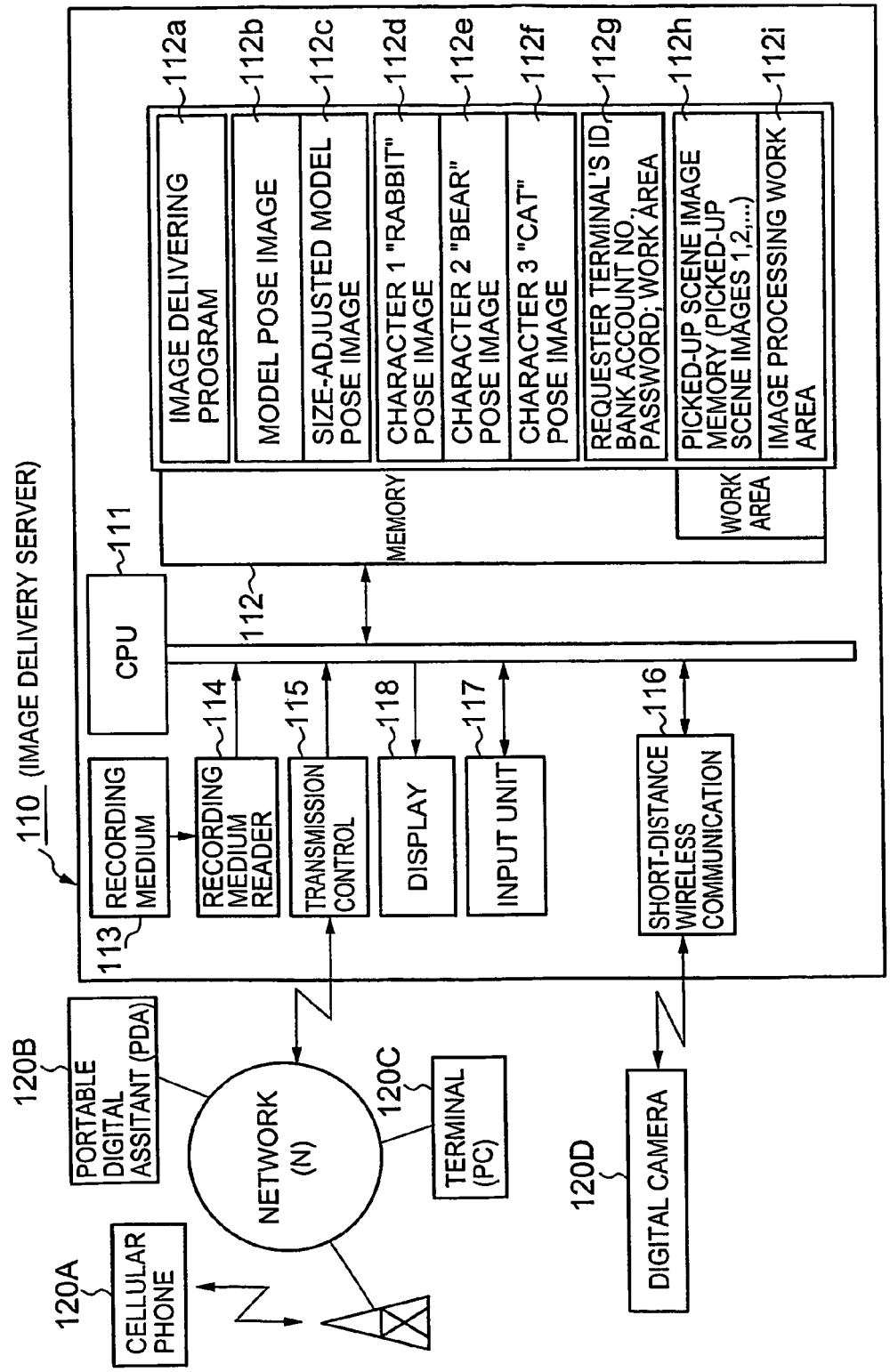
FIG. 23 is a block diagram showing a structure of an electronic circuit of an image delivery server 110 in an image delivery system according to a second embodiment of the present invention.

FIG. 23 is a block diagram indicative of the composition of an electronic circuit of an image delivery server 110 in an image delivery system of the invention.

Figure 24:
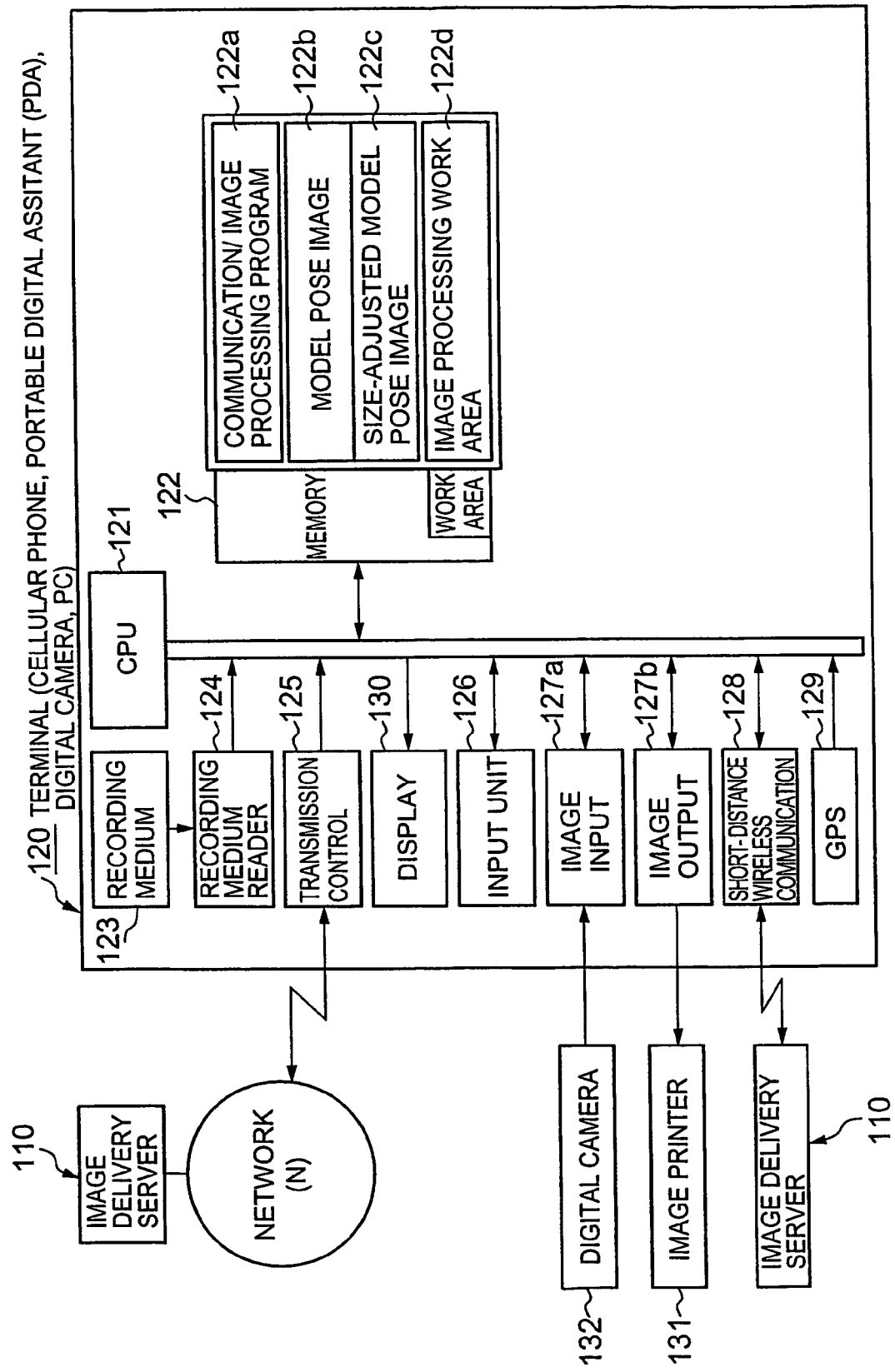
FIG. 24 is a block diagram showing the structure of an electronic circuit of a terminal 120 in the image delivery system according to the second embodiment.

FIG. 24 is a block diagram indicative of the composition of an electronic circuit of a terminal 120 in the image delivery system according to the second embodiment.

The image delivery system provides image creating/delivering services from the image delivery server 110 to various terminals 120 such as a portable telephone 120A, a personal digital assistant (PDA) 120B, a personal computer (PC) 120C, a digital camera 120D, etc., connected to a communication network such as the Internet or Bluetooth (R). The image delivery server 110 delivers to each of the terminals 120 an image corresponding to a target image in an image picked up by the terminal 120 (120A-120D) (for example, a character image corresponding to a person image in a picked-up scene image).

In FIG. 23, the image delivery server 110 includes a computer that reads programs recorded on various recording mediums or programs received externally with the computer operation being controlled by the read programs. The computer includes a CPU (Central Processing Unit) 111 in its electronic circuit.

The CUP 111 controls the respective elements of the circuit in accordance with a server control program beforehand stored in a memory 112, a server control program read into the memory 112 via a recording medium reader 114 from an external recording medium 113 such as a CD-ROM or a server control program read into the memory 112 via an electric transmission controller 115 from another Web server (in this case, a program server) on the Internet N. The server control program stored in the memory 112 is started up by a communication signal from each terminal 120 (120A-120C) on the Internet N connected via the transmission controller 115, a communication signal from the digital camera 120D connected via a short-distance wireless communication unit 116 or an input signal produced by an operator from an input unit 117 including keys or a touch panel.

The CPU 111 is connected to the memory 112, recording medium reader 114, transmission controller 115, short-distance wireless communication unit 116, and input unit 117 as well as a display unit 118 including an LCD or a CRT.

In addition to the system program in charge of the entire operation of the image delivery server 110, a communication program for data transmission with the respective terminals 120 (120A-120C) on the Internet. N via the transmission controller 115, and a short-distance communication program for data communication with digital cameras 120D in a communication range of the short-distance wireless communication unit 16 via the communication unit 16, the memory 112 has stored an image delivery program 112a to produce an image corresponding to an object image in the picked-up image obtained from a respective one of the terminals 120 (120A-120D) communication connected via the transmission controller 115 and the short-distance wireless communication unit 116, add the corresponding image to the picked-up image and deliver a resulting image to the terminal.

The memory 112 has prepared a model pose image memory 112b, a size-adjusted model pose image memory 112c, a character 1 "rabbit" pose image memory 112d, a character 2 "bear" pose image memory 112e, a character 3 "cat" pose image memory 112f, and a requester-terminal information memory 112g as well as in its work area a picked-up scene image memory 112h and an image processing work area 112i.

The character "rabbit", "bear" and "cat" images striking respective poses stored in the characters "rabbit", "bear" and "cat" pose image memories 112d, 112e and 112f, respectively, of the image delivery server 110 are identical to those illustrated in FIGS. 2-4 of the first embodiment, and FIGS. 2-4 are also used to describe the second embodiment.

Each of the various posing images of the characters stored in the memories 112d, 112e and 112f is used as an imitating image similar in pose to an object (target) image in a picked-up scene image inputted at a request of a respective one of the external terminals 120 (120A-120D) communication connected to the image delivery server 110. Each posing character image is stored with its corresponding pose No.

FIGS. 5-7 relate to the first embodiment and are also used to illustrate the second embodiment here. FIGS. 5-7 show model images striking the respective poses stored in the model pose image memory 112b of the image delivery server 110.

Each of the various posing model images stored in the memory 112b is used to obtain a model image similar in pose to an object (target) image in a picked-up scene image inputted at a request of a respective one of the external terminals 120 (120A-120D) communication connected to image delivery server 110 with the different poses being stored with corresponding pose numbers. In addition, three different variations of model images A, B and C are stored for each pose number.

The character images stored in each of the character 1 "rabbit" pose image memory 112d, the character 2 "bear" pose image memory 112e, and the character 3 "cat" pose image memory 112f are the ones striking poses corresponding to all the pose Nos. (Nos. 1A, 1B, 1C, 2A, 2B, 2C, . . . , na, nb, nc) stored in the model pose image memory 112b.

A size-adjusted model image of pose No. 2A to be stored in a size-adjusted model pose image memory 112c is obtained by vertically and horizontally adjusting the size of a standard body-shaped model image of a full length figure striking a pose shown by a pose No. 2A in FIG. 4 to a nonstandard body-shaped object (target) image. All other standard body-shaped model images striking respective poses are size adjusted in accordance with a vertical-horizontal ratio of the size-adjusted model image with pose No. 2A and stored in the size-adjusted model pose image memory 112c.

A size-adjusted model image to be stored in the size-adjusted-model pose image memory 112c is obtained as follows. A standard body-shaped posing model image of a full-length shown by pose No. 2A in FIG. 8(A) is adjusted in size (lengthwise and widthwise) to a nonstandard body-shaped object image shown in FIG. 8(B) to become a size-adjusted image corresponding to pose No. 2A. In accordance with a size-adjust ratio (balance) of the size-adjusted model image for pose No. 2A, all other standard body-shaped model images for the other poses are size adjusted to the non-standard body-shaped ones, and then stored in the size-adjusted-model pose image memory 12c.

A requesters terminal information memory 112g has registered IDs, bank account numbers, and passwords of the terminals 120 (120A-120D), as their individual mail-order business information about image delivery members who have requested the image delivery server 110 to register them as such.

The picked-up scene image memory 112h temporarily stores, in units of a picked-up scene image, picked-up scene image data inputted from the respective external terminals 120 (120A-120D) communication connected to the image delivery server 110.

The image processing work area 112i temporarily stores image data processed in accordance with the image delivery program 112a depending upon the image processing.

In FIG. 24, each terminal 120 includes a computer that reads a program recorded on each type of recording medium or an externally received program with the computer operation being controlled by the program. Its electronic circuit includes a CPU (Central Processing Unit) 121.

CUP 121 controls operation of the respective circuit elements in accordance with a terminal control program read beforehand into the memory 122, a terminal control program read into the memory 122 via a recording medium reader 124 from an external recording medium 123 such as a CD-ROM or a ROM card, or a terminal control program read into the memory 122 via an electric transmission controller 125 from a Web server (in this case, program server) on the Internet N.

The terminal control program stored in the memory 122 is started up by an input signal produced by a user's operation on an input unit 126 including keys or a touch panel, an image signal inputted by a digital camera 132 through an image input unit 127a, a communication signal with each Web server such as an image delivery server 110 on the Internet N connected via the transmission controller 125 to the terminal 120, a communication signal with the image delivery server 110 connected via a short-distance wireless communication unit 128 to the terminal 120, or a present-position detection signal indicative of the present position of the moving terminal 120 from a GPS (Global Positioning System) 129.

The CPU 121 is connected to the memory 122, recording medium reader 124, transmission controller 125, input unit 126, image input unit 127a, short-distance wireless communication unit 128, and GPS 129 as well as a display unit 130 of LCD and an image printer 131 through an image output unit 127b.

The image input unit 127a receives picked-up scene image data from an externally connected or built-in digital camera 132. For example, if the terminal 120 includes a portable telephone 120A, a personal digital assistant (PDA) 120B or a digital camera 120D, the image input unit 127 receives the picked-up scene image data from the built-in digital camera 132. If the terminal 120 includes a personal computer (PC) 120C, the image input unit 127 receives the picked-up scene image data from the externally connected digital camera 132.

The image output unit 127b outputs image data processed and delivered by the image delivery server 110 based upon the picked-up scene 25 image inputted by the image input unit 127a at a request of the terminal. The outputted image data is then delivered to and printed by the image printer 131.

In addition to the system program in charge of control of the whole operation of the terminal 120 (120A-120D), a communication program for data communication with each Web server such as the image delivery server 110 on the Internet N via the transmission controller 125, and a short-distance communication program for data communication with the image delivery server 110 present in a communication range of the short-distance wireless communication unit 128 via the wireless communication unit 128, the memory 122 has stored a communication/image processing program 122a for requesting the image delivery server 110 to perform image processing based upon the picked-up scene image inputted from the image input unit 127a, for displaying image data delivered by the image delivery server 110, and for performing a printing process through the image output unit 127b.

The terminal 120 (120A-120D) includes in the memory 122 a model pose image memory 122b and a size-adjusted-model pose image memory 122c similar in specification to those memories 112b and 112c included in the memory 112 of the image delivery server 110 of the second embodiment.

The memory 122 includes an image processing work area 122d that temporarily stores image data processed in accordance with the communication/image processing program 122a depending upon its processing.

Operation of the image delivery system of the second embodiment will be outlined next.

FIG. 11 relates to the first embodiment and is also applied to describe the second embodiment. FIG. 11 illustrates addition of a mirror-reversed character image "rabbit" in a picked-up scene image when the terminal 120 has specified a mirror-reversed character image add mode and requested for image delivery from the image delivery server 110.

As shown in FIG. 11(A), the terminal 120 picks up a scene image 12g3 containing an object image (target image) H striking a pose, for example, beforehand conscious of dancing with a partner, and requests the image delivery server 110 to create a composite image in which a mirror-reversed character image dances with the target image by specifying a mirror-reversed character image add mode, and deliver it to the terminal 120.

Then, as shown in FIG. 11(B), in the image delivery server 110 the object (target) image H is extracted from the picked-up scene image 12g3 sent by the terminal 120. When a "rabbit" character image is specified as, an added one, a "rabbit" character image with pose No. 19 ("dance") similar in pose to the object (target) image H is read out from the character 1 "rabbit" pose image memory 112d, as shown in FIG. 11(C). Thereupon, this "rabbit" character image is mirror reversed and added in the picked-up scene image 12g3' to a position symmetrical to the position of the object (target) image in respect to a vertical center line, and where the mirror-reversed "rabbit" image links with the object (target) H for dancing purposes, as shown in FIG. 11(D). This produces a composite image which is then delivered to the requester's terminal 120 and displayed or printed out there.

That is, the image delivery server 110 mirror reverses the "rabbit" character image imitating the dancing pose of the object (target) image H in the scene image 12h1 picked up by the terminal 120, and adds the mirror-reversed "rabbit" character image as a dance partner to a position in the picked-up scene image 12h1 where the mirror-reversed "rabbit" character image links with the object (target) image striking the dancing pose for dancing purposes. A resulting composite image is then sent to the terminal 120.

Figure 25:
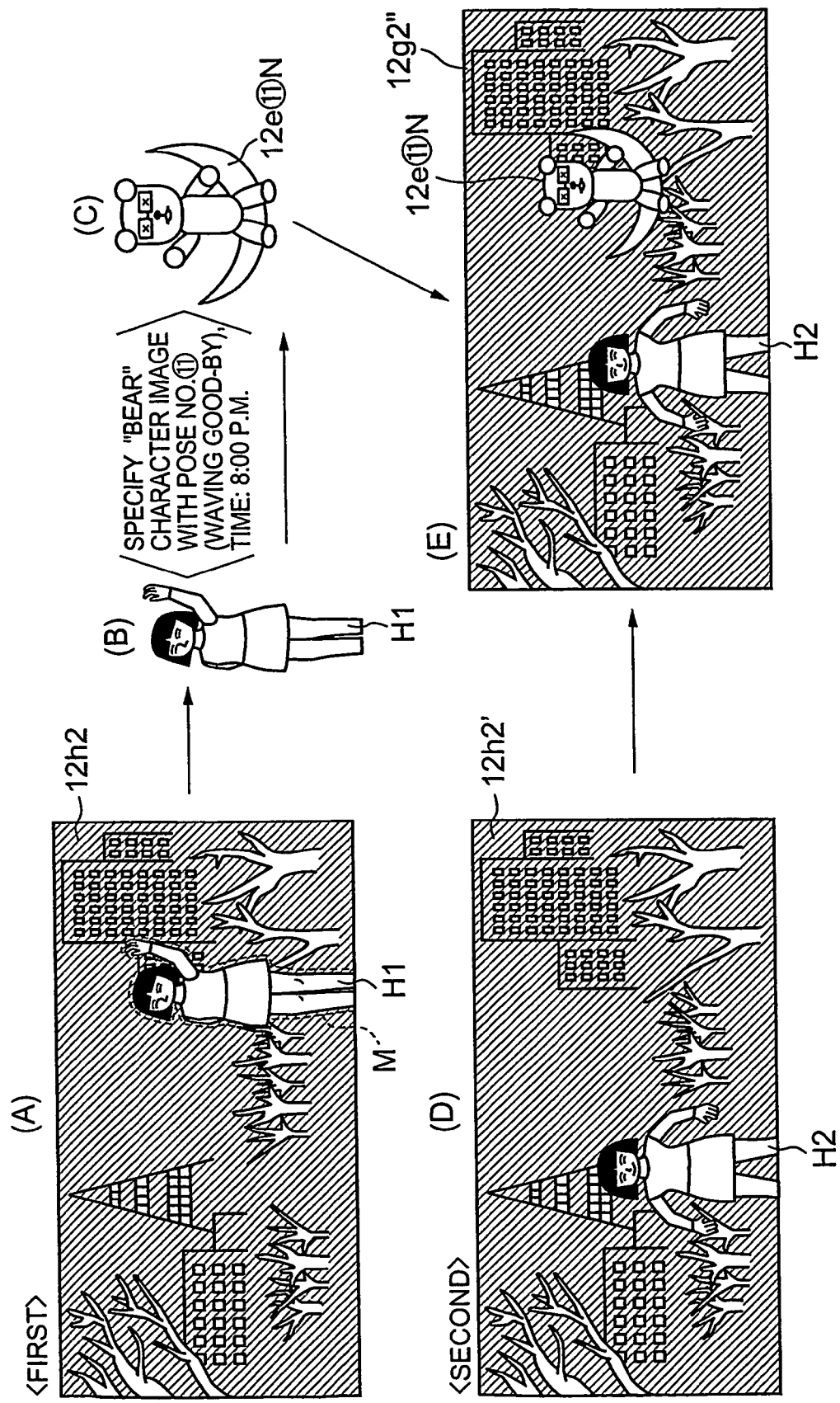
FIG. 25 is a diagram showing replacement of a target image with another and addition of a "bear" character image by the image delivery server 110 at a request from the terminal device 120 of the image delivery system when a multiple-pickup replace mode is specified, according to the second embodiment.

FIG. 25 illustrates replacement of an object image with a "bear" character image, which will be performed by the image delivery server 110 when the terminal 120 of the image delivery system has requested image creation and delivery from the server and specified a multiple image pickup/replace mode.

When the user at the terminal 120 desires to create a scene image in which the object image and a "bear" character image wave good-by to each other, the user picks up a scene image containing the object (target) image H1 striking the same "good-by" pose as the character image is desired to strike, as shown in FIG. 25(A), sends the picked-up scene image to the image delivery server 110, and requests the image delivery server 10 to create a composite scene image based upon the picked up scene image 12h2 by specifying the multiple image pickup/compose mode and deliver the composite scene image to the terminal.

As shown in FIG. 25(B), the image delivery server 110 extracts the image (target image) H1 from the first picked-up image 12h2 sent by the user. When a "bear" character image is specified as being a replacing one by the user, a "bear" character image (striking a pose No. 11 "Good-by") similar in pose to the object (target) image H1 is read out from the character 2 "bear" pose image memory 112e. In this case, when the present time is sensed, for example, as "08:00 p.m." or it is determined that it is now at night, the "bear" character image striking the pose "Good-by" is read out, for example, as a night character image 12e⑪N sitting on the moon.

Then, as shown in FIG. 25(D), when a second scene image 12h2' containing a target image H2 as a partner corresponding to the object image (target image) H1 in the first picked-up scene image 12h2 and striking another pose is picked up by the terminal 120, the read "bear" character image striking the pose No. 11 ("Good-by") for use at night is added to the second picked-up scene image 12h2', to thereby provide a resulting composite image shown as 12h2" in FIG. 25(E). The resulting composite image is then delivered to the requester's terminal 120 and displayed or printed out there.

That is, in the image delivery server 110 the character image imitating the good-by pose of the object (target) image H1 in the first scene image 12h2 picked up by the terminal 120 is added to a proper position relative to the position of the object (target) image H2 in a second scene image 12h2' picked up by the terminal 120 to thereby provide a resultant composite image, which is then delivered to the terminal 120.

While FIG. 13 was used for explanation of the object replacing process of the image output apparatus 110 of the first embodiment, it is also applied for explanation of a similar object replacing process of the image delivery server of the second embodiment.

FIG. 13 illustrates replacement of an object image with a "rabbit" character image by the image delivery server 100 when the terminal 120 requested image creation and delivery from the image delivery server and specified an object image select/replace mode.

As shown in FIG. 13(A), the terminal 120 picks up a scene image 12g5 containing, for example, three person (object) image H1-H3, sends the scene image along with notice of a specified replacing character image, for example, of "rabbit" to the image delivery server 110, and requests the image delivery server 110 to create a composite image based upon the picked-up scene image by specifying an object image select/replace mode, and then to deliver it to the terminal 120.

Thereupon, as shown in FIG. 13(B), the image delivery server 110 extracts from the picked-up scene image 12g5 sent by the terminal 120 an object (or target) image H1 specified as being replaced by the terminal 120. When a replacing "rabbit" character image is specified, a "rabbit" character image similar in pose (pose No. 1 "Say cheese" (close-up)) to the object (target) image H1 is read out from the character 1 "rabbit" pose image memory 112d, as shown in FIG. 13(C).

As shown in FIGS. 13(B), (D), (E) and (F), the specified object (target) image H1 and other object images H2 and H3 are cut out from the scene image 12g5 and the background image 12g5' remains.

Thereupon, as shown in FIG. 13(G), the "rabbit" character image similar in pose to the specified object image (target image) H1 read out from the character 1 "rabbit" pose image memory 112d and the other two object images H2 and H3 cut out from the scene image 12g5 are added to proper positions in the background image 12g5' in decreasing order of the image pickup distances to the respective objects concerned to thereby provide a resulting composite image 12g5". The composite image 12g5" is then delivered to the requester's terminal 120 and displayed or printed out there.

That is, in the image delivery server 110 the "rabbit" character image imitating the pose of the specified object (target) image H1 in the scene image 12g5 picked up by the terminal 120 replaces the object (target) image H1 in the scene image 12g5 picked up by the terminal 120, and a resulting composite image is delivered to the terminal 120.

In the image delivery system, the image process modes include a follower add mode and a space-area character image add mode whose illustrative descriptions using the drawings are omitted in the outline of the operation of the image delivery server, in addition to the reversed-character image add mode, multiple image pickup/replace mode and object image select/replace mode.

In the follower add mode, when the terminal 120 picks up a scene image 12hn containing an object (target) image H walking or striking a walking pose and requests the image delivery server 100 to create a composite scene image based upon the scene image 12hn by specifying the follower add mode and a character image as the follower imitating the pose of the object image H and to deliver the composite scene image to the terminal 120, the image delivery server 110 adds the specified character image in the scene image 12hn to a position where the specified character image as the follower follows the object (target) image H to thereby deliver a resulting composite image to the terminal 120.

When the terminal 120 picks up a scene image 12hn containing any object (target) image H, sends this scene image 12hn and a specified character image imitating the pose of the specified object (target) image H to the image delivery server 110, and requests the delivery server 110 to create a composite scene image based upon the scene image and the specified character image H in the picked-up scene image 12hn by specifying the space-area character image add mode and to deliver the composite image to the terminal, the image delivery server 110 adds the specified character image to a random position in a space area of the scene image 12hn to thereby deliver a resulting composite image to the terminal 120.

The details of the image processing and delivering operation by the image delivery server 110 and the terminal 20 will be described next.

Figure 26:
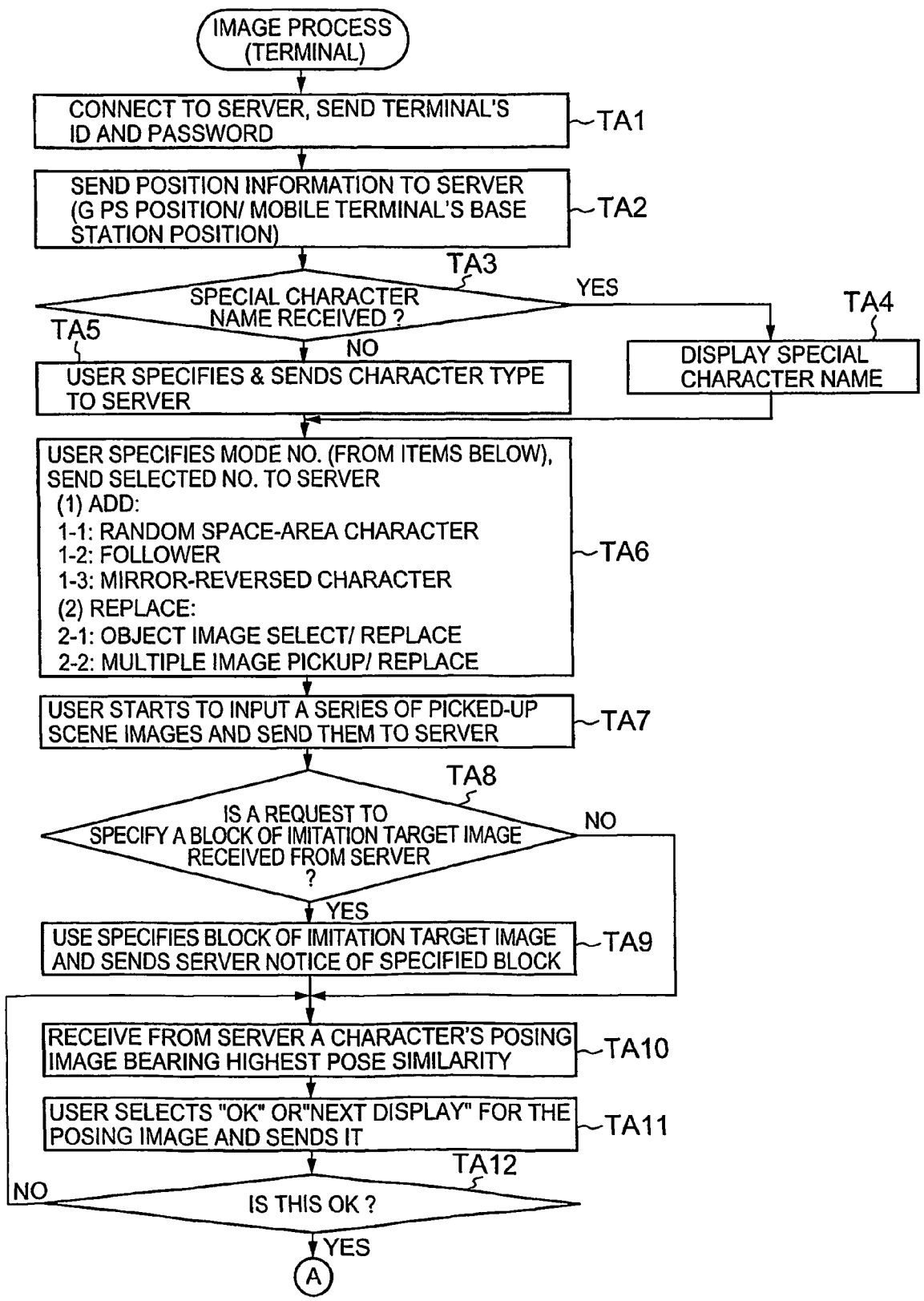
FIG. 26 is a flowchart showing an image process (part 1) by the terminal 120 of the image delivery system according to the second embodiment.

FIG. 26 is a flowchart of an image process (part 1) to be performed by the terminal 120.

Figure 27:
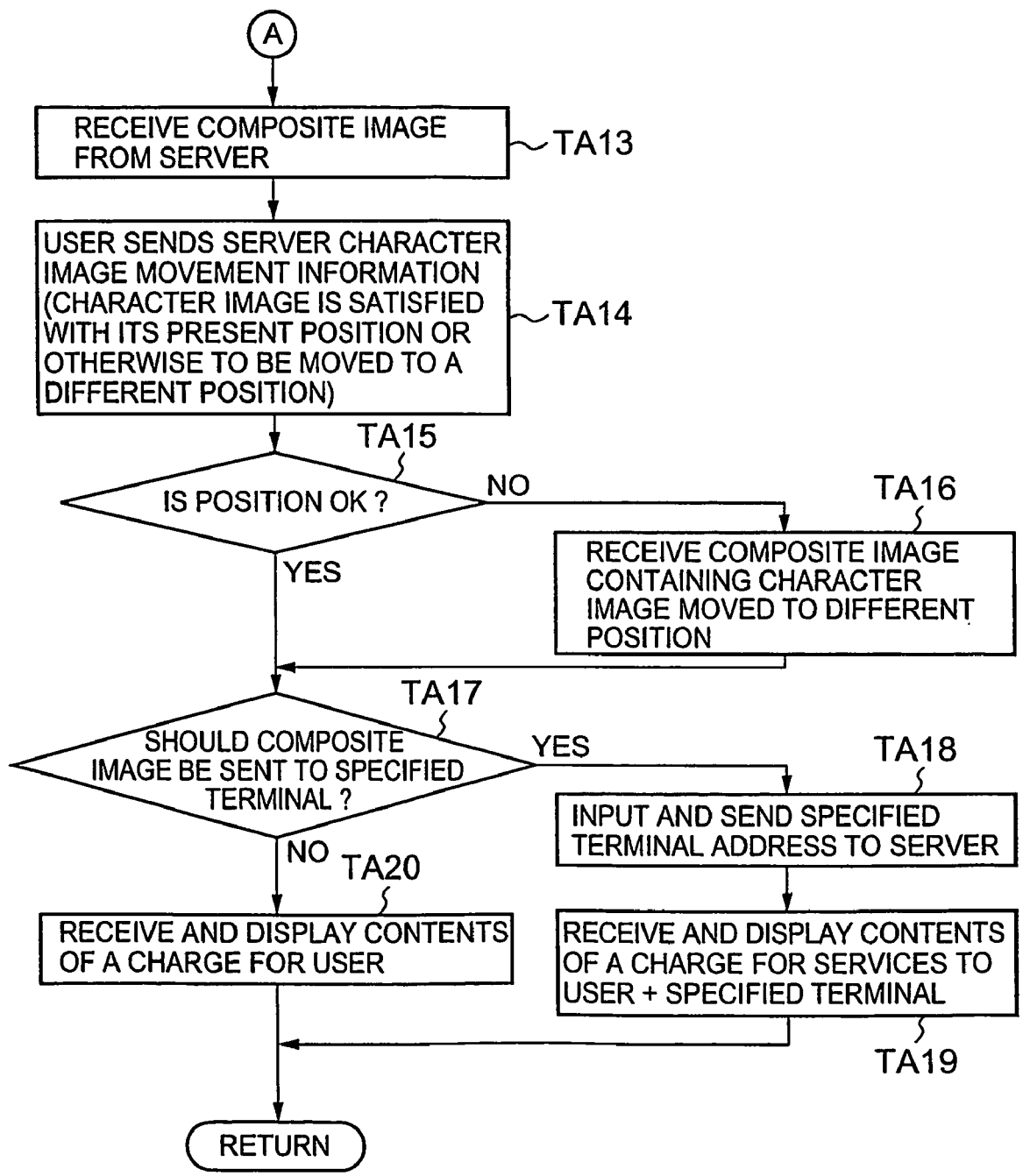
FIG. 27 is a flowchart showing an image process (part 2) continued from the image process (part 1) of FIG. 26 by the terminal 120 of the image delivery system.

FIG. 27 is a flowchart of an image process (part 2) continued from the image process (part 1) of FIG. 26.

Figure 28:
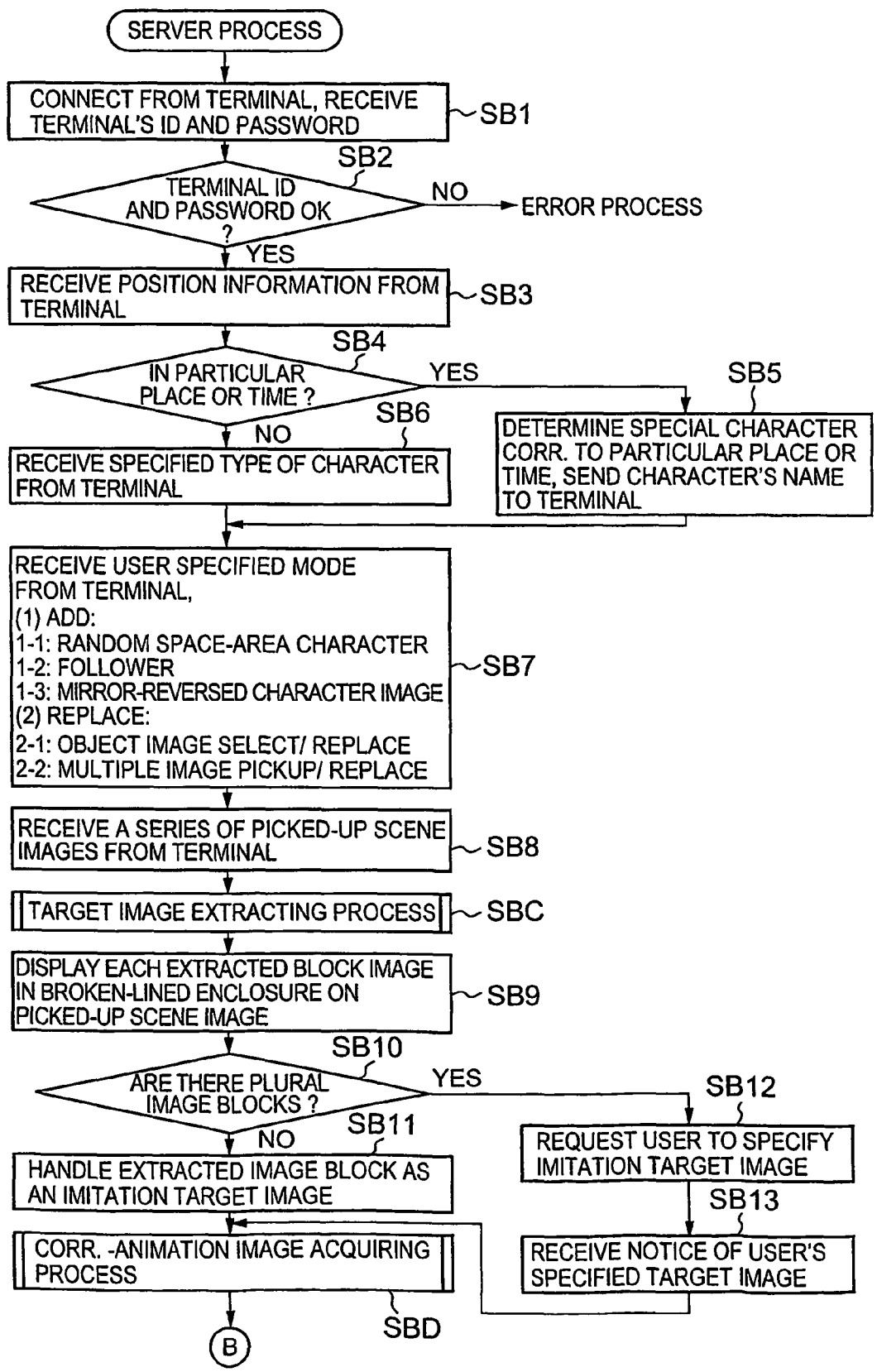
FIG. 28 is a flowchart showing a server process (part 1) by the image delivery server 10 of the image delivery system according to the second embodiment.

FIG. 28 is a flowchart of a server process (part 1) to be performed by the image delivery server 110.

Figure 29:
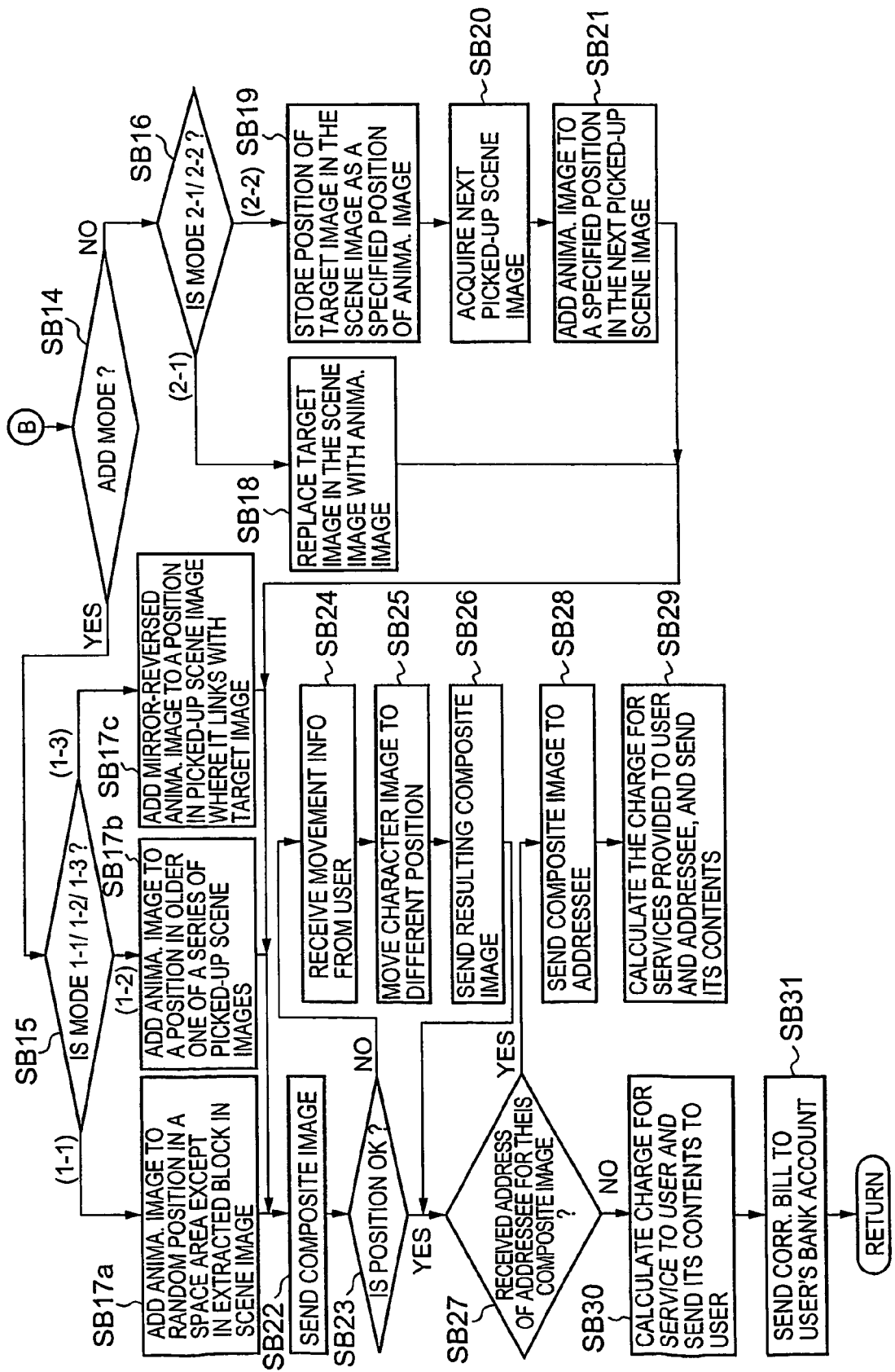
FIG. 29 is a flowchart showing a server process (part 2) continued from the server process (part 1) of FIG. 28 by the image delivery server 10 according to the second embodiment.

FIG. 29 is a flowchart of a server process (part 2) continued from the server process (part 1) of FIG. 28.

First, the terminal 120 (120A, 120B or 120C) responds to the manipulation of its input unit 126 to connect via the transmission controller 125 or short-distance wireless communication unit 128 to the image delivery server 110 on the Internet N or in a short-distance wireless communication range and to send the user's ID and password thereof to the image delivery server 110 (step TA1).

When the image delivery server 110 receives the ID and password from the terminal 120 (120A, 120B or 120C) via the transmission unit 115 through the Internet N or from the terminal (digital camera) 120D via the short-distance wireless communication unit 116 (step SB1), it determines whether or not the terminal is a full member depending on whether the terminal ID and password can find their matches among the members' ones registered in the requester terminal information memory 112g of the memory 112 (step SB2).

When it determines that the ID and password of the terminal 120 can not find their matches among the registered members' IDs and passwords and that the terminal is not a full member, the connection of the terminal 120 to the image delivery server 110 is interrupted and an error process is performed (step SB2, "No.").

When the connection of the terminal 120 to the image delivery server 110 is not interrupted over a predetermined time after the terminal 120 has sent its ID and password to the image delivery server 110 (step TA1), data representing the present position of the terminal 120 (in the case of the portable telephone 120A, data representing the position of its base station concerned) sensed by GPS 129 is sent from the terminal 120 to the image delivery server 110 (step TA2).

When the image delivery server 110 receives from the terminal 120 data representing the present position of the terminal (step SB3), it determines whether the terminal 120 is at present in a predetermined particular place (for example, a souvenir picture pickup place in a theme park or tourist spot) or whether the present time is in a specified time zone (for example, at night) (step SB4).

If the image delivery server 110 determines that the terminal 120 is at present in the predetermined particular place or that the present time is in the specified time zone (step SB4), a particular character corresponding to the particular place (for example, in the case of a theme park, a popular character there) or a particular character corresponding to the specified time zone (for example, in the case of at night, a "bear" character sitting on a horned moon) is determined as the specified character corresponding to the target object and the name of this character is then sent to the terminal 120 (step SB5).

When the image delivery server 110 determines that the terminal 120 under connection is not in the predetermined place, or that the present time is not in the specified time zone (step SB4), the image delivery server 110 waits for reception of the type of a specified character from the terminal 120 (step SB6).

If the terminal 120 receives the name of the particular character determined and sent by the image delivery server 110 because the terminal 120 is in the particular place or the present time is in the specified time zone (step TA3), the particular character name is delivered to and displayed by the display unit 130 (step TA4).

When the terminal 120 does not receive the name of the particular character from the image delivery server 110 because the terminal 120 is not in the particular place or the present time is not in the specified time zone (step TA3), the user of the terminal 120 manipulates the input unit 126 to thereby specify the type of a character ("rabbit", "bear" or "cat") image to be used as an added one, or a replacement, in the picked-up scene image and sends the specified type of a character image to the image delivery server 110 (step TA5).

Then, the terminal 120 selects the add or replace/compose mode from among the "1-1: random space-area character image add mode", "1-2: follower add mode", "1-3: mirror-reversed character image add mode, "2-1: object image select/replace mode" and "2-2: multiple image pickup/replace mode", and then sends a mode No. representing the selected mode to the image delivery server 110 (step TA6).

The digital camera 132 then starts to input a series of picked-up scene images through the image input unit 127a to the terminal 120, which then sends the series of picked-up scene images to the image delivery server 110 (step TA7).

Figure 30:
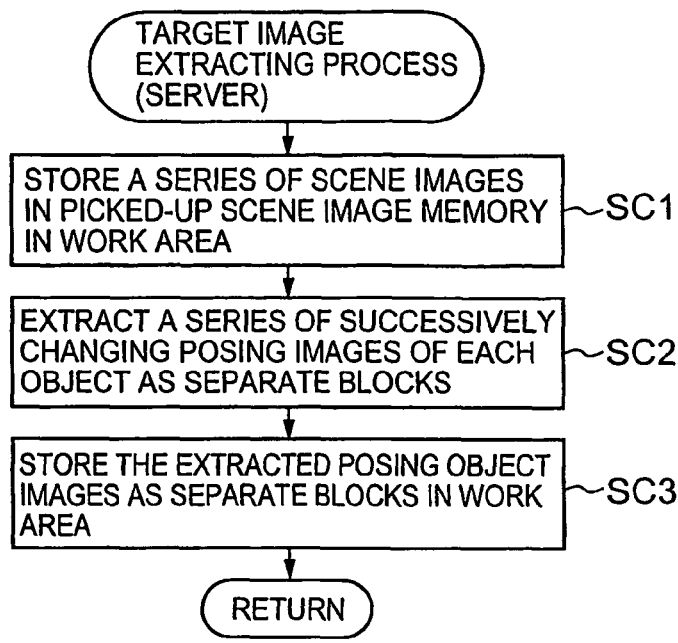
FIG. 30 is a flowchart showing a target image extraction process included in the server process in the image delivery server 10 according to the second embodiment.

When the image delivery server 110 receives the mode No. representing the selected mode from the terminal 120 (step SB7) and the series of picked-up scene images from the terminal 120 (step SB8), it performs a process for extracting the target image of FIG. 30 included in the server process (step SBC).

In this target image extracting process, the series of picked-up scene images 12hn received from the terminal 120 at predetermined timings are stored in the pickup scene memory 112h of the work area (step SC1).

Thereupon, a series of successive posing object images Hn indicating the series of successively changing acts of each object are extracted from the series of picked-up scene images 12hn stored in the picked-up scene image memory 112h (step SC2) and stored in the image processing work area 12i (step SC3).

That is, when the respective object images Hn contained in the picked-up scene image 12hn are extracted as separate blocks from the picked-up scene image 12hn and stored in the image processing work area 12i (step SBC), a picked-up scene image 12hn which contains the respective extracted character images Hn in broken-lined enclosures M is displayed on the display unit 118, for example, as shown in FIG. 11(A), 12(A) or 13(A) (step SB9).

Thereupon, it is determined whether there are a plurality of blocks of object image Hn in the picked-up scene image 12hn displayed on the display unit 118 (step SB10).

If the image delivery server 110 determines that there are no plurality of blocks of object image Hn in the picked-up scene image 12hn, a single object image Hn extracted from the picked-up scene image 12hn is set as a target image of imitation (step SB10→SB11)

When the image delivery server 110 determines that there are a plurality of blocks of object image Hn in the picked-up scene image 12hn, the image delivery server 110 sends the terminal 120 a request that the user specify an object image block to be imitated (step SB10→SB12).

When the terminal 120 receives this request from the server 110 and displays it (step TA8), the user manipulates the input device 126 to specify a target image of imitation from among the plurality of blocks of object image Hn and gives notice of the specified image to the image delivery server 110 (step TA9).

Then, the image delivery server 110 receives this notice from the terminal (step SB13).

The image delivery server 110 then extracts the specified object image Hn from the picked-up scene image 12hn received from the terminal 120 and sets it as a target image of imitation. Then, the image delivery server 110 shifts its process to a corresponding-animation image acquiring process included in the server process of FIG. 31 (step SBD).

In this corresponding-animation image acquiring process, the image delivery server 110 first evaluates a similarity in pose of each of the model images striking different poses stored in the model pose image memory 112b to the object image Hn extracted from the picked-up scene image 12hn and set as the target image of imitation (step SDC). The image delivery server 110 then sends the terminal 120 a specified character image A corresponding to a pose No. of the model image bearing the highest pose similarity to the object image (step SD1).

When the terminal 120 receives that specified character image A from the image delivery system 110 and displays it (step TA10), the user determines whether the displayed specified posing character image is "OK" or "next display" (display of a next candidate) should be clicked and then sends notice of this determination to the image delivery server 110 (step TA11).

When the image delivery server 110 receives the notice of the selection from the terminal 120 and determines that the terminal 120 has selected "the displayed specified posing character image is OK based upon the present evaluated similarity", the image delivery server 110 registers the specified character image (identified by its pose No.) as an animation image corresponding to the target image of imitation (step SD2→SD3).

When the image delivery server 110 receives the notice of the selection from the terminal 120 and determines that the "next display" for the posing image of the received specified character is selected based upon the present similarity evaluation, the image delivery server 110 sends the terminal 120 another specified character image A corresponding to a pose No. of a model image bearing a second highest pose similarity. This is repeated each time the user's selection of the "next display" is received from the terminal 120 as long as there are posing character images corresponding to the posing model images (step SD2→SD4).

When the terminal 120 receives a posing character image corresponding to a model image bearing a desired pose similarity received from the image delivery server 110 and displays the posing character image, and the user manipulates the input unit 126 to send "OK" for the displayed character image to the image delivery server 110 (steps TA10-TA12), the image delivery server 110 registers the OK'd character image (identified by its pose No.) as an animation image corresponding to the target image of imitation (step SD2→SD3).

As described above, in the corresponding-animation image acquiring process by the image delivery server 110, a similarity in pose of a model image representing each pose of a basic model of a person to the object image Hn as the target image of imitation extracted from the picked-up scene image 12*hn* by the terminal 120 is evaluated, and a specified character image to be used as an added one or replacement imitating the pose of the object image Hn is determined.

In this case, compared with the case in which a similarity in pose of each of the various posing images of a specified character to the object image Hn as the target image of imitation is directly evaluated to thereby determine a character image to be used as an added one or as a replacement, the corresponding-animation image acquiring process in which a similarity in pose of each model image to the object image Hn as the target image of imitation is evaluated and a character image to be used as an added one or a replacement is determined from the pose No. of the selected model image is more advantageous in that the use of a human-figure model makes it easy to obtain a higher similarity in pose to the object image and hence a character image bearing a higher pose similarity (imitation).

While the similarity evaluating process of FIG. 18 has been performed by the image output apparatus of the first embodiment, a similar similarity evaluating process is performed by the image delivery server in the second embodiment. Thus, in the second embodiment the similarity evaluating process will be described by applying FIG. 18.

FIG. 18 is a flowchart of a process for evaluating a similarity in pose of an animation image to a target image of imitation in the corresponding-animation image acquiring process included in the server process to be performed by the image delivery server 110 of the image delivery system.

Figure 32:
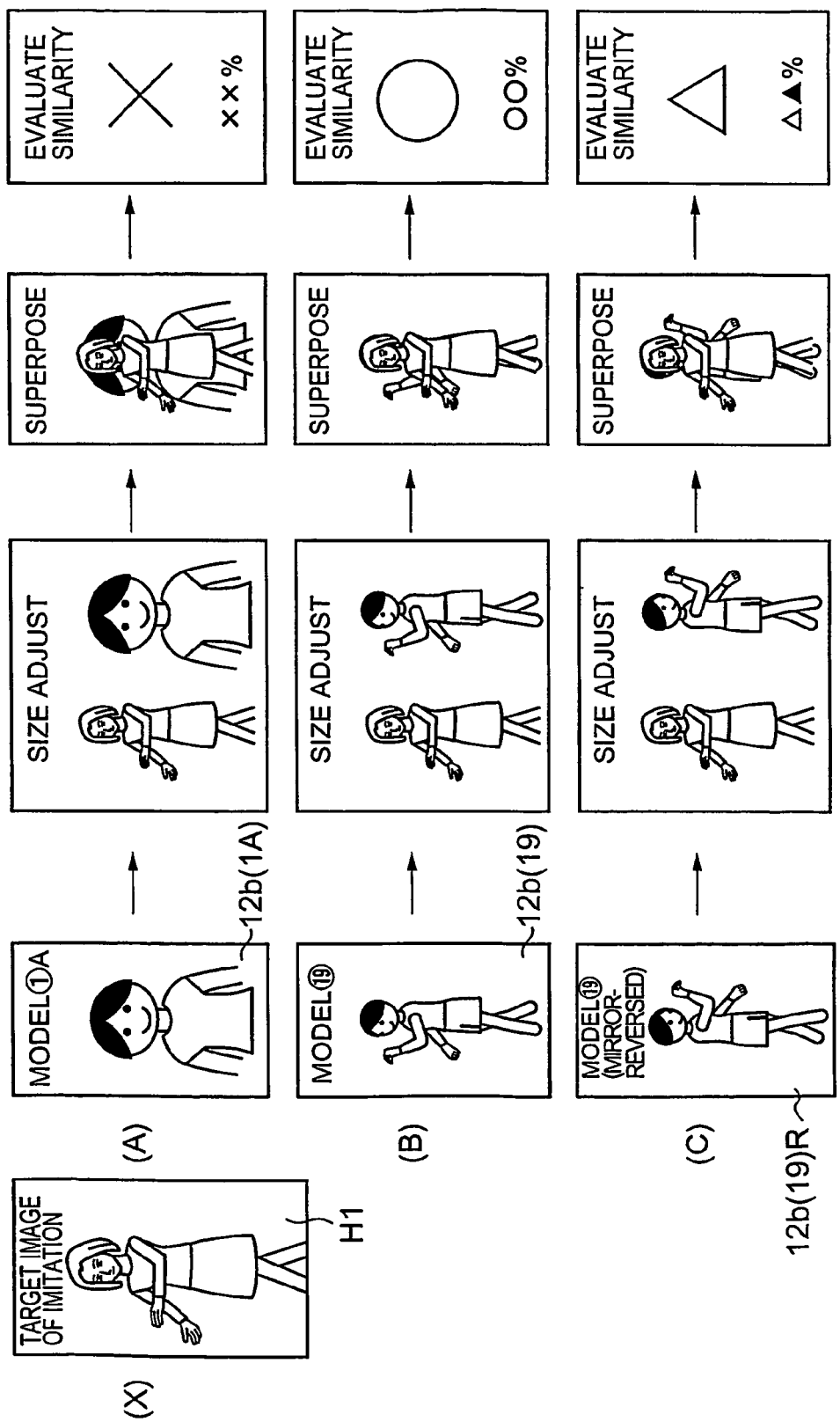
FIG. 32 is a diagram showing evaluation of a similarity in pose of a model image to a target image, which will be performed in a pose similarity evaluation process included in the corresponding-animation image acquiring process of the image delivery system 10 according to the second embodiment.

FIG. 32 illustrates examples of evaluating a similarity in pose of a model character image to a target image of imitation in the corresponding animation image acquiring process to be performed by the image delivery server 110.

As shown in FIG. 32(A), a model image, for example, with a first pose No. is read out (step C1) and adjusted in size to the target image of imitation H1 of FIG. 32(X) (step C2).

Then, the target image H1 and the size-adjusted model image are superposed on each other, and a similarity in pose (%) between them is evaluated and stored as the similarity in pose of the model image to the target image H1 (step C3).

It is then determined whether the model image is asymmetrical (step C4). When it is determined that the model image is not asymmetrical, for example, as shown by 12*b*(1)A in FIG. 32(A) (step C4, "No."), a next pose No. model image is read out (step C8→C9) and a similarity in pose of this model image to the target image of imitation H1 is evaluated. As long as a further next model image is not asymmetrical, such similarity evaluating process is repeated (steps C2-C4).

If it is determined that a model image under similarity evaluation is asymmetrical for example, as shown by a pose No. 19 model image 12*b*19 of FIG. 32(B), the model image is mirror reversed (step C4→C5). Then, as shown in FIG. 32(C), 1 the mirror-reversed model image 12*b*(19)R is adjusted in size (lengthwise and widthwise) to the target image of imitation (step C6).

Then, the target image H1 and the mirror-reversed model image 12*b*(19) R are superimposed over each other. A similarity in pose (%) between these images is evaluated and stored as the similarity in pose of the mirror-reversed model image to the target image H1 (step C7).

Then, as long as there are still model image with respective pose Nos. (step C8), they are sequentially read out (step C9), and a similarity in pose of a respective one of the model images to the target image of imitation is evaluated repeatedly (step C2-C7).

In this example, when, for example as shown in FIG. 32, the similarity in pose of the model image to the object (target) image H1 is evaluated, the model image 12*b*(19) with pose No. 19 is evaluated as bearing the highest similarity in pose to the target image H1.

Figure 31:
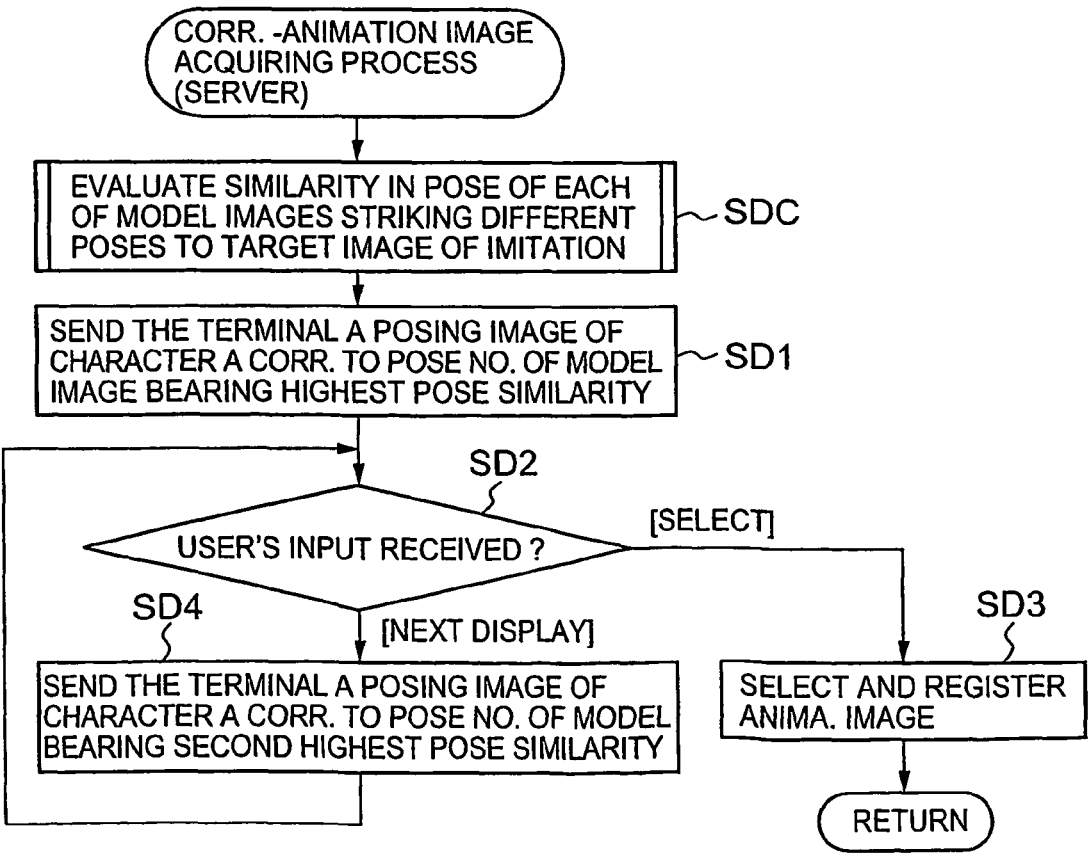
FIG. 31 is a flowchart showing a corresponding-animation image acquiring process included in the server process in the image delivery server 10 according to the second embodiment.

As described above, when a specified character image imitating the object image Hn is determined as the target image of imitation extracted from the picked-up scene image 12*hn* in the corresponding-animation image acquiring process (step SBD) described with respect to FIGS. 31, 18 and 32, it is determined whether the image compose mode specified by and received from the terminal 120 is the "add/compose mode" or otherwise the "replace/compose mode" (step SB14).

If the image compose mode specified by the terminal 120 is the "add/compose mode" and the "1-1: random space-area character image add mode" (step SB14→SB15, "1-1"), the specified character image imitating the pose of the target image H1 as the target image of imitation acquired in the corresponding-animation image acquiring process (FIG. 31) is added in the picked-up scene image 12*hn* to a random position in its space-area except in a place from which the object image block is extracted, for example, as in FIG. 10 (step SB17*a*). A resulting composite image is then sent to the terminal 120 (step SB22).

The terminal 120 then receives the composite image from the image delivery server 110 and displays it (step TA13). When the user at the terminal 120 performs a process for moving the character image from its resent position to any specified different position in the composite picked-up scene image 12*hn*, information on its movement is then sent to the image delivery server 110 (step TA14).

When the image delivery server 110 receives this information from the terminal 120 (step SB23→SB24), the image delivery server 110 moves the character image to the different position based upon the information in the space-area of the picked-up scene image 12*hn* (step SB25) and then sends a resulting composite image to the terminal 120 (step SB26).

Thereupon, the terminal 120 receives and displays this composite image from the image delivery server 110 (step TA15→TA16).

That is, the image delivery server 110 sends the terminal 120 data on the composite image in which the specified character image imitating the pose of the specified object image H1 and created in the random space-area character image add mode is added to a random position in the space area of the picked-up scene image 12*hn*.

When the image delivery server 110 determines that the image compose mode specified by the terminal 120 is the "add/compose mode" and the "1-2: follower add mode" (step SB14→SB15, "1-2"), it adds a specified character image imitating a waling pose of the object image (target image) in the picked-up scene image 12*hn* acquired in the corresponding-animation image acquiring process (FIG. 31) at a position in the picked-up scene image 12*hn* where the specified character image follows the walking object image (target image) H at a given distance from this object image, or at a position in the picked-up scene images 12*hn* where the object (target) image assumed a certain time ago, as in FIG. 9 (step SB17*b*).

This image delivery server 110 then sends a resulting composite image to the terminal 120 (step SB22).

When the terminal 120 receives the composite image from the image delivery server 110 and displays it there (step TA13), and the user of the terminal 120 manually performs a process for moving the specified character image as the follower in the composite image from its present position to any specified different position, information on its movement is sent to the image delivery server 110 (step TA14).

When the image delivery server 110 receives this information from the terminal 120 (step SB23→SB24), the image delivery server 110 again adds the specified character image as the follower to the different position in the picked-up scene image 12hn (step SB25) and sends a resulting composite image to the terminal 120 (step SB26).

Then, the terminal 120 receives this composite image from the image delivery server 110 and displays it (step TA15→TA16).

That is, the image delivery server 110 sends the terminal 120 data on a composite image in which the specified character image imitating the pose of the specified object image H and created in the follower add mode is added to the follower's position after the object image H.

When the image delivery server 110 determines that the image compose mode specified by the terminal 120 includes the "add/compose mode" and the "1-3: mirror-reversed character image add mode" (step SB14→SB15, "1-3"), the image delivery server 110 mirror reverses a "rabbit" character image 12d⑲ imitating the dancing pose of an object image (target image) H in the scene image 12g3, adds to a position in the scene image 12g3 where the mirror-reversed "rabbit" character image links with the target image H (step SB17c), and then sends a resulting composite scene image 12g3' to the terminal 120 (step SB22).

When the terminal 120 receives the composite image 12g3' from the scene image delivery server 110 and displays it (step TA13), and the user manually performs a process for moving the reversed "rabbit" character image 12d⑲ R (R means reversal) in the picked-up scene image 12g3' from its present position to any specified different position, information on its movement is delivered to the image delivery server 110 (step TA14).

When the image delivery server 110 receives the movement information from the terminal 120 (step SB23→SB24), the image delivery server 110 again adds the mirror-reversed "rabbit" character image to the different position based upon the movement information in the scene image 12g3' (step SB25), and a resulting composite scene image is then sent to the terminal 120 (step SB26).

Then, the terminal 120 receives this composite scene image from the image delivery server 110 and displays it (step TA15→TA16).

That is, the image delivery server 110 sends the terminal 120 data on a scene image 12g3 in which the mirror-reversed "rabbit" character image imitating the pose of the dancing object image H and created in the mirror-reversed character image add mode is added to the position where the mirror-reversed "rabbit" character image links with the object image H, for example, as in FIG. 11(D).

If the image delivery server 110 determines that the image compose mode specified by the terminal 120 includes the "replace/compose mode" and the "2-1: object image select/replace mode" (step SB14→SB16, "2-1"), the image delivery server 110 replaces the specified object image (target image) H1 with a "rabbit" character image 12d① imitating the pose of the object image H1 as the target image of imitation specified in the picked-up scene image 12g5 acquired in the corresponding-animation image acquiring process (FIG. 31) (step SB18), and then sends a resulting composite image to the terminal 120, for example, as in FIG. 13 (step SB22).

In this case, three object images, that is, the target object image H1 specified in the picked-up scene image 12g5, and other two object images H2 and H3 are cut out from the picked-up scene image 12g5, and a picked-up background image 12g5' is produced. The "rabbit" character image 12d① similar in pose to the specified target object image H1, the remaining two object images H2 and H3 cut out from the scene image 12g5 are then added to the respective relevant positions in the picked-up background image 12g5' in decreasing order of the sensed image pickup distances to the respective objects concerned to thereby provide a resulting composite image.

Without producing the remaining background image 12g5', the "rabbit" character image 12d① similar in pose to the target image H1 and the other two images H2 and H3 may be added to the their relevant positions in the picked-up scene image 12g5 in decreasing order of the sensed image pickup distances to the respective objects concerned.

When the terminal 120 receives the composite image from the image delivery server 110 and displays it (step TA13), and manually performs the process for moving the "rabbit" character image 12d① added in place of the target image H1 in the picked-up scene image 12g5" from its present position to any specified different position, information on its movement is then sent to the image delivery server 110 (step TA14).

When the image delivery server 110 receives this information (step SB23→SB24), it reads the "rabbit" character image 12d① to the different position based upon the movement information in the picked-up scene image 12g5" in place of the target character image H1 (step SB25), and sends a resulting composite image to the terminal 120 (step SB26).

Thereupon, the terminal 120 receives this composite image from the image delivery server 110 and displays it (step TA15→TA16).

That is, the image delivery server 110 sends the terminal 120 data on a composite image created in the object image select/replace mode and in which the object image H1 is replaced with the "rabbit" character image imitating the pose "Say cheese" of the object image H1, as in FIG. 13(G).

If the image delivery server 110 determines that the image compose mode specified by the terminal 120 includes the "replace/compose" mode and the "2-2: the multiple image pick-up/replace mode" (step SB14→SB16, "2-2"), the position of the target object image H1 in a first picked-up scene image 12h2 is stored as the position where the imitating image replaces the target object image H1, for example, as shown in FIG. 25. (step SB16→SB19).

When the image delivery server 110 acquires a second picked-up scene image 12h2' (step SB20), it adds a "bear" character image 12e⑪ N (in this case, a special "night bear" character image) imitating the pose of the object image H1 acquired in the corresponding-animation image acquiring process (FIG. 31) to a position in the second picked-up scene image 12h2' corresponding to the stored position of the object image (target image) H1 in the first picked-up scene image 12h2 such that the "bear" character image 12e⑪ N waves good-by to the object image H2 (step SB21) and a resulting composite image 12h2" is then sent to the terminal 120 (step SB22).

When the terminal 120 receives and displays the composite image 12h2" from the image delivery server 110 (step TA13) and manually performs the process for moving the "night bear" character image 12e⑪ n in the composite image 12h2" from its present position to any specified different position in the composite image 12h2", information on its movement is sent to the image delivery server 110 (step TA14).

When the image delivery server 110 receives this information (step SB23→SB24), it reads the "bear" character image 12e⑪ N' to the different position in the second picked-up scene image 12h2' based upon the received movement information (step SB25), and a resulting composite image is then sent to the terminal 120 (step SB26).

Then, the terminal 120 receives this composite image from the image delivery server 110 and displays it (step TA15→TA16).

That is, the image delivery server 110 sends the terminal 120 the composite image 12h2" created in the multiple image pickup/replace mode in which the "bear" character image (particular "night" character image) imitating the "Good-by waving" pose of the object image H1 in the first picked-up scene image 12h2 is combined with the object image H2 in the second picked-up scene image 12h2'. A resulting composite image is then delivered to the terminal 120.

The terminal 120 receives and displays this composite image. When the user of the terminal 120 desires to send the composite image displayed on the terminal 120 to a specified different terminal, the user inputs an address of the different terminal via the input unit 126 and then sends the composite image to the image delivery server 110 (step TA17→TA18).

When the image delivery server 110 receives the address of the different terminal from the terminal 120 (step SB27), the image delivery server 110 sends the composite image to the different terminal of that address (step SB28), calculates a charge for the composite image-creating and sending services provided this time to the requester user and the specified different terminal and sends the requester terminal 120 the contents of the charge (step SB29).

The requester terminal 120 then receives the contents of the charge from the image delivery server 110 and displays it on the display 130 (step TA19).

When the terminal 120 inputs and sends no address of the specified different terminal (step TA17→No), the image delivery server 110 calculates a charge for only the composite image creating and delivering services provided to the requester terminal this time and sends the requesting terminal 120 the contents of the charge (step S27→SB30).

Thereupon, the requester terminal 120 receives and displays the contents of the charge from the image delivery server 110 and displays it on the display 30 (step TA20).

The image delivery server 110 sends a corresponding bill to a bank account of the requester terminal registered in the requester terminal information memory 112g (step SB 31).

Therefore, according to the image delivering function of the image delivery system of the second embodiment, when the scene image picked-up by the terminal 120 is sent to the image delivery server 110, the image delivery server 110 extracts an object image from the received scene image, acquires any specified type of character image similar in pose to the extracted object image from among the character 1 "rabbit" pose image memory 12d, the character 2 "bear" pose image memory 12e, and the character 3 "cat" pose image memory 12f, replaces the object image in the picked-up scene image with the acquired specified type of character image in the picked-up scene image or adds the required character image to the scene image to thereby provide a resulting composite image, and sends this composite image to the terminal 120. Thus, a very delightful composite scene image in which an animation image imitating the pose of the target object in the original scene image is used as an added one or otherwise as one replacing the target object is created and delivered to the terminal without creating and delivering a scene image to which a fixed animation image is simply added in the image pickup frame.

By using the image delivery server 110 in the image delivery system of the second embodiment, various services are provided which include delivery of a mail with a composite scene image including an added or replacing character image imitating the pose of an object image in the picked-up scene image, pay composition and delivery of a composite scene image in which a character image imitating the pose of a target image in a picked-up original scene image is used as an added or replacing one in the original scene image to a respective one of image-pickup type mobile terminals 120B, 120C, 120D such as a cellular phone terminal 120A with a digital camera, pay or free creation and delivery of a composite scene image in which a particular character image imitating the pose of the object image in a picked-up scene image is added to, or otherwise replaces the object image, for publicizing the particular character on a particular home page, and pay creation and delivery of a picked-up scene image in which a popular character image imitating the pose of an object image in a picked-up scene image is added to a digital camera terminal 120D connected via a short-distance wireless communication unit 116 only in a specified place such as an amusement spot.

As described above, in the image delivery system of the second embodiment, an image picked up by the terminal 120 is sent to the image delivery server 110. In the image delivery server 110, an object image is extracted from the picked-up scene image, a character image is acquired which is similar in pose to the extracted object image, the character image is added to the scene image or replaces the object image in the scene image. A resulting composite image is then delivered to the terminal 120 and a bill for this service is sent to the terminal 120. In contract, as will be described in the next third embodiment, the terminal 120 extracts an object image from the picked-up scene image, determines a pose No. of a model image similar in pose to the extracted object image, and requests the image delivery server 110 to deliver a specified character image with the determined pose No. The image delivery server 110 only delivers to the terminal 120 the character image with the determined pose No., which was requested by the terminal 120, and bills the terminal for this service. The terminal 120 further adds the delivered character image to the scene image or otherwise replaces an object image in the scene image with the delivered character image to thereby provide a resulting composite image.

Third Embodiment

The electronic circuits of the image delivery server 110 and terminals 120 (120A-120D) of the image delivery system as the third embodiment of the present invention are substantially similar to those of the second embodiment described with reference to FIGS. 23 and 24, excluding the following points:

In the image delivering system of the third embodiment, the model image memory 112b and the size-adjusted model pose image memory 112c are not provided in the image delivery server 110, but in the terminal 120.

Figure 33:
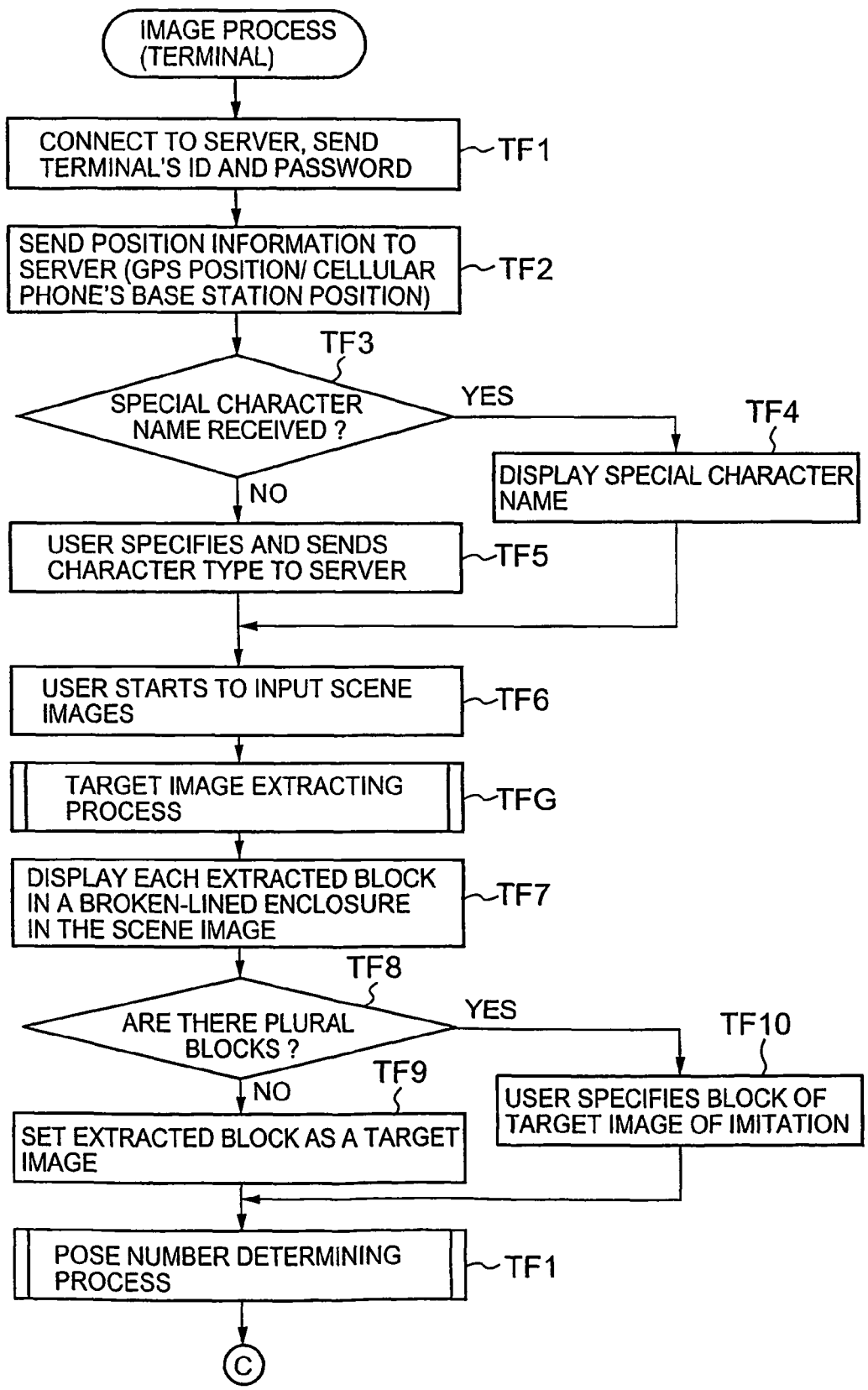
FIG. 33 is a flowchart showing an image process (part 1) by a terminal 120 of an image delivery system according to a third embodiment.

FIG. 33 is a flowchart of an image process (part 1) to be performed by the terminal 120 in the image delivery system of the third embodiment.

Figure 34:
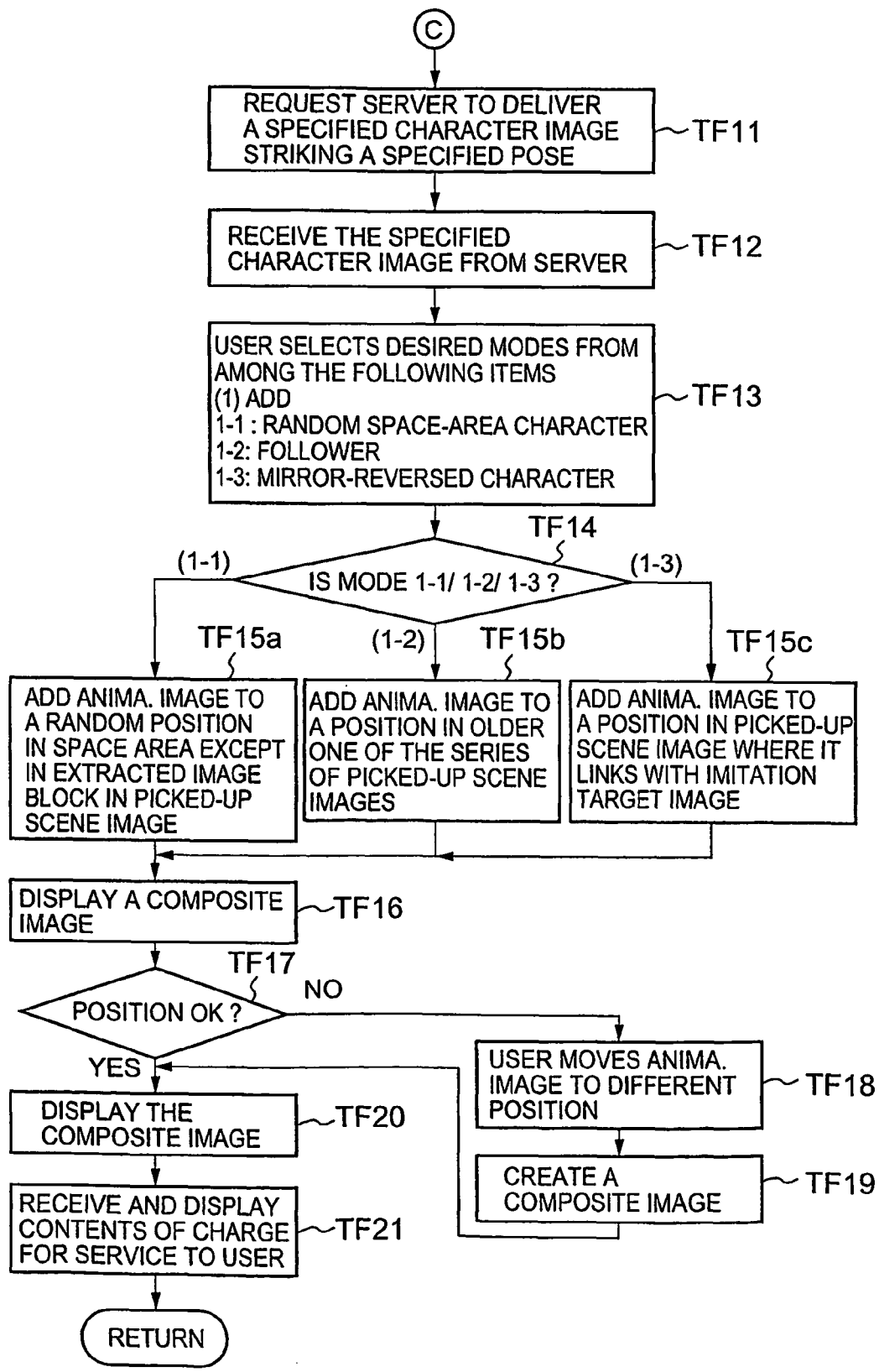
FIG. 34 is a flowchart showing an image process (part 2) continued from the image process (part 1) of FIG. 33 by the terminal device 120 of the image delivery system.

FIG. 34 is a flowchart of an image process (part 2) continued from the image process (part 1) of FIG. 33.

Figure 35:
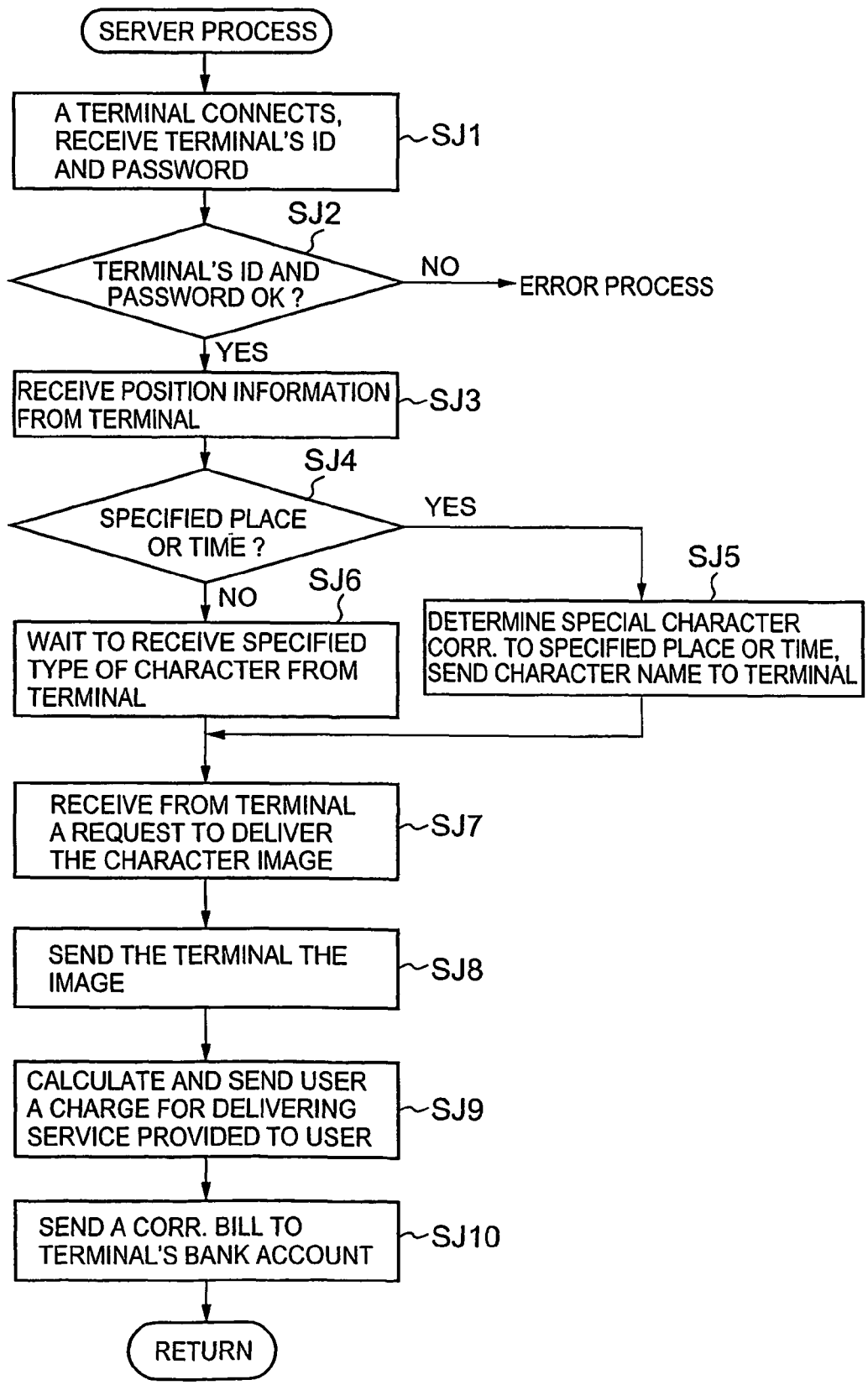
FIG. 35 is a flowchart showing a server process by the image delivery server 110 of the image delivery system according to the third embodiment.

FIG. 35 is a flowchart of a server process to be performed by the image delivery server 110 of the third embodiment.

First, the terminal 120 (120A, 120B or 120C) responds to the manipulation of the input unit 126 to connect via the transmission controller 125 or short-distance wireless communication unit 128 to the image delivery server 110 on the Internet N or in a short-distance wireless communication range and then to send the user's ID and password to the image delivery server 110 (step TF1).

When the image delivery server 110 receives the ID and password from the terminal 120 (120A, 120B or 120C) via the transmission unit 115 through the Internet N or the terminal (digital camera) 120D via the short-distance wireless communication unit 116 (step SJ1), it determines whether the terminal 120 is a full member or not depending on whether the terminal ID and password can find their matches among the registered IDs and passwords of the member terminals in the requester terminal information memory 112g of the memory 112 (step SJ2).

When it is determined that the ID and password of the terminal 120 can not find their matches among the registered IDs and passwords of the member terminals and that the terminal is not a full member, the connection of the terminal 120 to the image delivery server 110 is interrupted and an error process is performed (step SJ2, "No.").

When the connection of the terminal 120 to the image delivery server 110 is not interrupted over a predetermined time after the terminal 120 has sent its ID and password to the image delivery server 110 (step TF1), data representing the present position of the terminal 120 (in the case of the cellular phone 120A, data representing the position of its base station concerned) sensed by GPS 129 is sent from the terminal 120 to the image delivery server 110 (step TF2).

When the image delivery server 110 receives from the terminal 120 data representing its present position (step SJ3), it determines whether the terminal 120 is at present in a predetermined particular place (for example, a souvenir picture pickup place in a theme park or tourist spot) or whether the present time is in a specified time zone (for example, at night) (step SJ4).

If the image delivery server 110 determines that the terminal 120 under connection is at present in the predetermined particular place or that the present time is in the specified time zone (step SJ4), a special character corresponding to the particular place (for example, in the case of a theme park, a popular character there) or a special character corresponding to the specified time zone (for example, in the case of at night, a "bear" character sitting on the sickle moon) is determined as the special character corresponding to the target object, and the name of this character is then sent to the terminal 120 (step SJ5).

When the image delivery server 110 determines that the terminal 120 under connection is not in the predetermined place, or that the present time is not in the specified time zone (step SJ4), the image delivery server 110 waits for reception of a specified type of character from the terminal 120 (step SJ6).

If the terminal 120 receives the name of the special character determined and sent by the image delivery server 110 because the terminal 120 is in the particular place or the present time is in the specified time zone (step TF3), the special character name is delivered to and displayed by the display unit 130 (step TF4).

When the terminal 120 does not receive the name of the special character from the image delivery server 110 because the terminal 120 is not in the particular place or the present time is not in the specified time zone (step TF3), the user of the terminal 120 manipulates the input unit 126 to thereby specify the type of a character ("rabbit", "bear" or "cat") to be used as an added one or a replacement in the picked-up scene image and sends the specified type of a character to the image delivery server 110 (step TF5).

Figure 36:
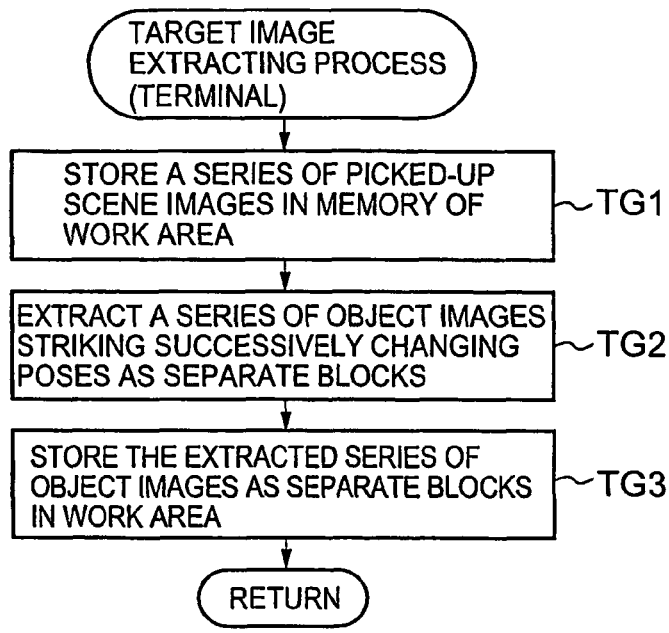
FIG. 36 is a flowchart showing a target image extracting process included in the image process in the terminal 120 of the image delivery system according to the third embodiment.

Thereupon, the picked-up scene images start to be input from the digital camera 132 via the image input unit 127a to the terminal 120 (step TF6), and the process proceeds to the target image extracting process (TFG) of FIG. 36 included in the image process by the terminal 120.

In this target image extracting process, the series of picked-up scene images inputted through the image input unit 127a into the terminal 120 at predetermined timings are stored in the work area 122d of the memory 122 (step TG1).

Thereupon, a series of successive object images Hn indicating the respective acts of each object are extracted as separate blocks from the series of picked-up scene images stored in the image processing work area 122d (step TG2) and stored as the respective blocks in the work area 122d (step TG3).

That is, when the respective object images Hn contained in the picked-up scene image are extracted as separate blocks from the picked-up scene images and stored in the image processing work area 122d (step TFG), a picked-up scene image which contains the respective extracted character images Hn in their broken-lined enclosures M is displayed on the display unit 130, for example, as in FIG. 11(A), 12(A) or 13(A) (step TF7).

Thereupon, it is then determined whether there are a plurality of blocks of object image Hn in the picked-up scene image displayed on the display unit 130 (step TF8).

If it is determined that there are no plurality of blocks of object image Hn, a single object image Hn extracted from the picked-up scene image is set as a target image of imitation (step TF8→TF9)

If it is determined that there are a plurality of blocks of object image Hn, an object image Hn is specified as a target image of imitation from among those blocks of object image Hn by the user's manipulation of the input unit 126 (step TF8→TF10)

Figure 37:
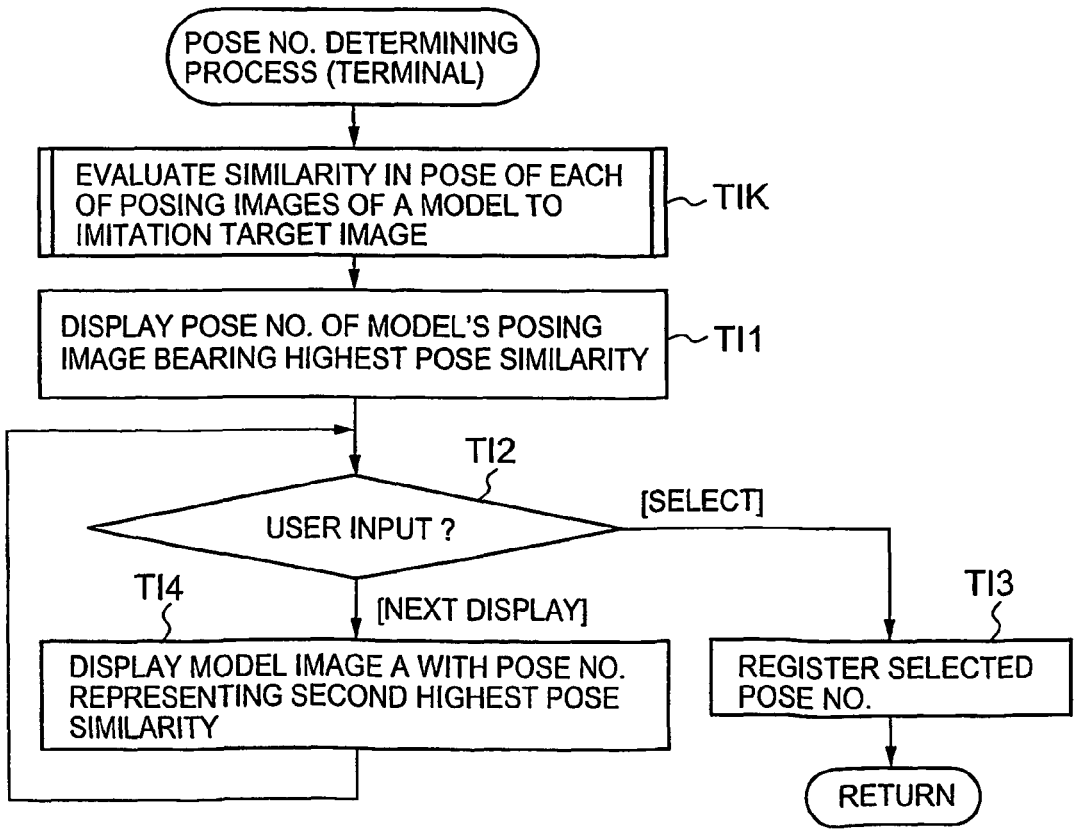
FIG. 37 is a flowchart showing a pose number determining process included in the image process in the terminal 120 of the image delivery system according to the third embodiment.

When the object image Hn is extracted from the picked-up scene image and specified as the target image of imitation Hn, the process proceeds to a pose No. determining process of FIG. 37 (step TFI).

In this pose No. determining process, a similarity in pose of each of the differently posing model images stored in the model pose image memory 122b to the object image Hn extracted from the picked-up scene image and set as the target image of imitation is evaluated (step TIK), and a posing model image bearing the highest pose similarity is displayed on the display unit 130 (step TI1).

When this displayed model image is selected by the user at the input unit 126, the pose No. of this selected model image is registered as the one corresponding to the target image of imitation (step TI2→TI3).

When the "next display" is clicked by the user's manipulation on the input unit 126 in a state where a model image corresponding to the pose No. representing the highest similarity in pose to the target image of imitation is displayed, a model image with a pose No. representing a second highest similarity in pose to the target image is displayed. As long as there are still a plurality of model images having different similarities, a model image bearing a next lower pose similarity is displayed each time the "next display" is clicked. (step TI2→TI4).

When a model image with a pose No. representing a desired pose similarity is displayed and selected by the user's manipulation on the input unit 126, the pose No. of this model image is registered as that corresponding to the target image of imitation (step TI2→TI3).

As described above, in the pose No. determining process, the pose similarity of each model image (striking a respective pose) representing a basic model of a person to the object image Hn as the target image of imitation extracted from the picked-up scene image is evaluated, and the pose No. of a model image imitating the pose of the object image Hn is determined based upon the evaluation of the similarity.

Figure 38:
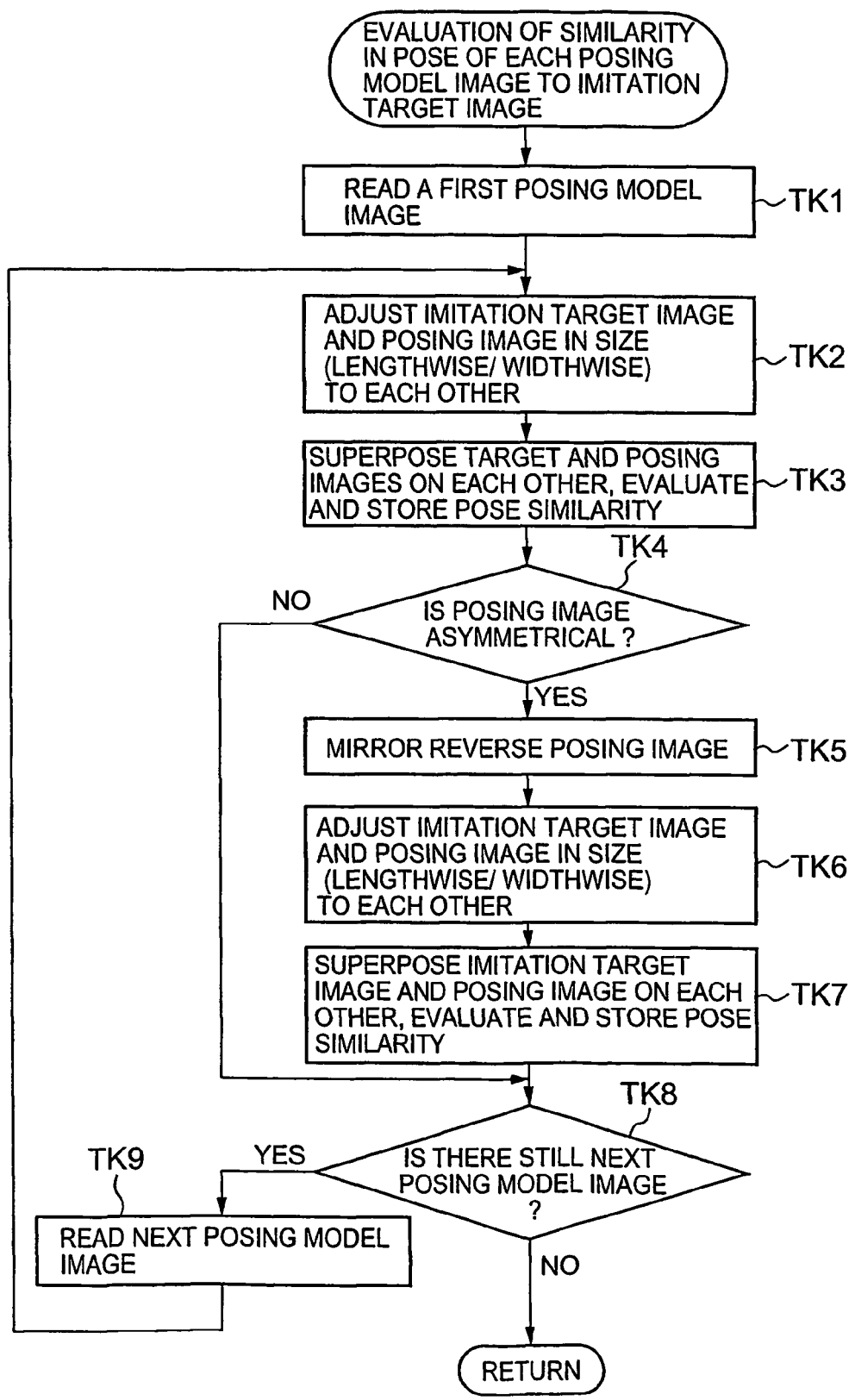
FIG. 38 is a flowchart showing evaluation of a similarity in pose of a model image to a target image of imitation in the pose number determining process included in the image process in the terminal 120 of the image delivery system according to the third embodiment.

FIG. 38 is a flowchart of evaluating a similarity in pose of a model image to the target image of imitation in the pose No. determining process included in the image process to be performed by the terminal 120 in the image delivering system of the third embodiment.

For example, as shown in FIG. 32(A), a model image with a first pose No. is read out (step TK1) and adjusted in size to the target image of imitation H1 of FIG. 32(X) (step TK2).

Then, the target image H1 and the size-adjusted model image are superposed on each other, and a similarity in pose (%) between them is evaluated and stored as the similarity in pose of the model image to the target image H1 (step TK3).

It is then determined whether the model image with the pose No. of interest is asymmetrical (step TK4). When it is determined that the model image is not asymmetrical, for example, as shown by 12*b*A(1) in FIG. 32(A) (step TK4, "No."), a next pose No. model image is read out (step TK8→TK9) and a similarity in pose of this model image to the target image of imitation H1 is evaluated likewise. As long as a further next model image is not asymmetrical, such similarity evaluating process is repeated (steps TK2-TK4).

If it is determined that the model image of similarity evaluation is asymmetrical, for example, as shown by a pose No. 19 model image 12*b*19 of FIG. 32(B), the model image is mirror reversed (step TK4→TK5). Then, as shown in FIG. 32(C), 1 the mirror-reversed model image 12*b*(19)R is adjusted in size (lengthwise and widthwise) to the target image of imitation (step TK6).

Then, the target image H1 and the mirror-reversed model image 12*b*(19)R are superposed on each other. A similarity in pose between these images (%) is evaluated and stored as the pose similarity of the mirror-reversed model image to the target image H1 (step TK7).

Then, as long as there are further model image of different pose Nos. (step TK8), they are sequentially read out (step TK9), and a similarity in pose of a respective one of the model images to the target image of imitation is repeatedly evaluated (step TK2-TK7).

In this example, when for example, as shown in FIG. 32, the similarity in pose of the model image to the object (target) image H1 is evaluated, the model image 12*b*(19) with pose No. 19 is evaluated as bearing the highest similarity in pose to the target image H1.

As described above, when a pose No. of a model image imitating the pose of the object image Hn as the target image of imitation extracted from the picked-up scene image is determined in the pose No. determining process (step TFI) described with respect to FIGS. 37, 38 and 32, a request for delivery of a specified character image striking a pose for the determined pose No. is then sent to the image delivery server 110 (step TF11).

When the image delivery server 110 receives the request for delivery of a character image from the terminal 120 (step SJ7), the image delivery server 110 selectively reads a character image with the determined pose No. from an appropriate one of the character 1 "rabbit" pose image memory 112*d*, the character 2 "bear" pose image memory 112*e*, and the character 3 "cat" pose image memory 112*f* included in the memory 112 and delivers the read character image to the requester terminal 120 (step SJ8).

Thereupon, the image delivery server 110 calculates the charge for the delivery service provided to the requester user and sends notice of the contents of the charge to the requester terminal 120 (step SJ9), and a corresponding bill is sent to a bank account of the requester terminal registered in the requester terminal information memory 112*g* (step SJ10).

When the requester terminal 120 receives the character image with the determined pose No. from the image delivery server 110 (step TF12), either the add/compose mode that adds the received character image to the picked-up scene image or the replace/compose mode that replaces the target image H in the picked-up scene image with the received character image is selected from among the "1-1: random space-area character image add mode", "1-2: follower add mode", "1-3: mirror-reversed character image add mode", "2-1: object image select/replace mode" or "2-2: multiple image pickup/replace mode" (step TF13).

In the flowchart of the image process performed by the terminal 120 in FIGS. 33 and 34, routines corresponding to the replace/compose mode "2-1: object image select/replace mode" and "2-2: multiple image pickup/replace mode" are omitted. The omitted routines include the same process as are expressed by the steps SB16, SB18-SB21 of FIGS. 28 and 29 and are selectively performed along with the process of steps TF14 and TF15*a*-TF15*c* in the add/compose mode which will be described later.

Therefore, only the process to be performed when the add/compose mode is selected will be described herein and the process to be performed when the replace/compose mode is selected will be omitted.

If it is determined in step TF13 that the specified-image compose mode is the "add/compose mode" and the "1-1: random space-area character image add mode" (step F14, "1-1"), the specified character image imitating the pose of the target image Hn as the target image of imitation delivered by the image delivery server 110 is added in the picked-up scene image 12*hn* to a random position in its space-area except in the place from which the object image block is extracted. A resulting composite image is then displayed (steps TF15*a*, TF16).

Then, when the process for moving the character image in the composite image from its present position to any specified different position is performed in the composite image (step TF17→step TF18), the character image is moved to the different position in the composite image, and another resulting composite image is then displayed (TF19-TF20).

When it is determined that the specified-image compose mode includes the "add/compose mode" and the "1-2: follower add mode" (step TF14, "1-2"), a specified character image delivered by the image delivery server 110 and imitating a walking pose of the object image (target image) in the picked-up scene image is added to a position in the latest scene image corresponding to the position on a relevant one of the series of picked-up scene images 12*hn* where the walking object image (target image) H assumed a certain time ago to thereby provide a resulting composite image, as in FIG. 9(D) (steps TH15*b*, TF16).

When the process for moving the specified character image as the follower in the composite image from its present position to any specified different position in the composite image is performed manually (step TF17 to TF18), the specified character image is moved to the different position in the composite image and another resulting composite image is then displayed (steps TF19, TF20).

When it is determined that the specified-image compose mode includes the "add/compose mode" and the "1-3: reversed-character image add mode" (step F14, "1-3"), a "rabbit" character image 12d⑲ imitating the dancing pose of an object image (target image) H in the scene image 12g3 is mirror reversed, the mirror-reversed "rabbit" character image is added at a position in the scene image 12g3 where the mirror reversed "rabbit" character image links with the target image H for dancing purposes, and then a resulting composite image 12g3' is displayed, as shown in FIG. 11(D) (step TF15c→TF16).

When the process for moving the reversed "rabbit" character image 12d⑲ R in the composite image 12g3' from its present position to any specified different position is manually performed (step TF17 to step TF18), the mirror reversed "rabbit" character image is moved to the different position in the composite image 12g3', and another resulting composite image is then displayed (steps TF19, TF20).

Then, the terminal 120 receives notice of the contents of the charge for the use of the server service by the user from the image delivery server 110 and displays it on the display unit 130 (step TF21).

Therefore, according to the image delivering function of the image delivery system of the third embodiment, when the terminal 120 picks up an image of a scene containing objects, an object image is extracted from the picked-up scene image. A pose No. is determined from a model image similar in pose to the extracted object image. The terminal 120 requests delivery of a posing character image with the determined pose No. and a specified type of the character image from the image delivery server 110. Thereupon, the image delivery server 110 reads a character image with the specified pose No. and type from an appropriate one of the character 1 "rabbit" pose image memory 112d, the character 2 "bear" pose image memory 112e, and the character 3 "cat" pose image memory 112f, and delivers the read character image to the terminal 120, which replaces the object image in the picked up scene image with the received character image similar in pose to the object or adds the received character image to the scene image, and displays a resulting composite image. That is, the user at the terminal 120 does not simply add a fixed animation image to the pickup frame for delighting purposes, but acquires an animation image similar in pose to the object image in the scene image from the image delivery server 110 and replaces the object image in the picked-up scene image with the animation image or adds the animation image to the picked-up scene image to thereby produce a very delightful composite image containing the animation image.

The image delivery server 110 in the image delivery system of the third embodiment is capable of providing image-pickup type mobile terminals 120B, 120C, 120D such as a cellular phone terminal 120A, which includes a digital camera, with pay delivery of a character image imitating a pose of an object image in each picked-up scene image, pay or free delivery of a particular character image imitating a pose of an object image in a picked-up scene image for publicizing the particular character on a particular home page, and pay delivery of a popular character image imitating a pose of an object image in a picked-up scene image to a digital camera terminal 120D via a short-distance wireless communication unit 116 only in a specified place such as an amusement spot, etc.

While in the respective embodiments a character image similar in pose to the object image extracted from the picked-up scene image is selectively obtained and used as an added one or a replacement in the picked-up scene image to thereby provide a resulting composite image, face images having various expressions and person images actually picked-up may be stored beforehand and used as an added one or a replacement imitating a pose of an object image extracted from the picked-up scene image to thereby output a resulting composite image.

In the respective above embodiments the picked-up scene image as a still image has been illustrated. On the other hand, when the picked-up scene images include a series of animation images inputted, object images changing in time series relative to the background image of the series of dynamic images inputted may be sequentially extracted from the series of animation images. Character images (FIG. 39) similar in pose to the sequentially extracted object images may then be selectively acquired, delivered, or added to the picked-up dynamic images or replace the object images in the respective animation images to thereby provide a series of resulting composite animation images, which will be then delivered.

FIG. 39 illustrates animation character images striking various poses stored in the character "rabbit" animation pose image memory 112dM in the image delivery server 110.

By utilizing the image processing function of the image delivery server 110 or terminal 120 in the respective embodiments, a prepared desired character image similar in pose to a target image of imitation that includes an appearing character specified and extracted, for example, from an animation image in a game, or otherwise an actually picked-up person image may be acquired and delivered to the requester terminal or replace the character appearing in the animation image to thereby deliver a resulting composite image to the requester terminal.

As will be described in a next fourth embodiment, object images striking various poses picked up by the user, or character images striking various poses appearing in a game downloaded from game servers (game HP) on the Internet N may be recorded in memories similar to the character 1 "rabbit" pose image memory 112d, the character 2 "bear" pose image memory 112e, and the character 3 "cat" pose image memory 112f of the memory 112 in the image delivery server 110. When a character image similar in pose to the object image extracted from the picked-up scene mage in the second or third embodiment is acquired from the image delivery server 110, it may be selected from among the originally registered "rabbit", "bear" and "cat" character images, and the person images and game character images registered by the user.

Fourth Embodiment

Figure 40:
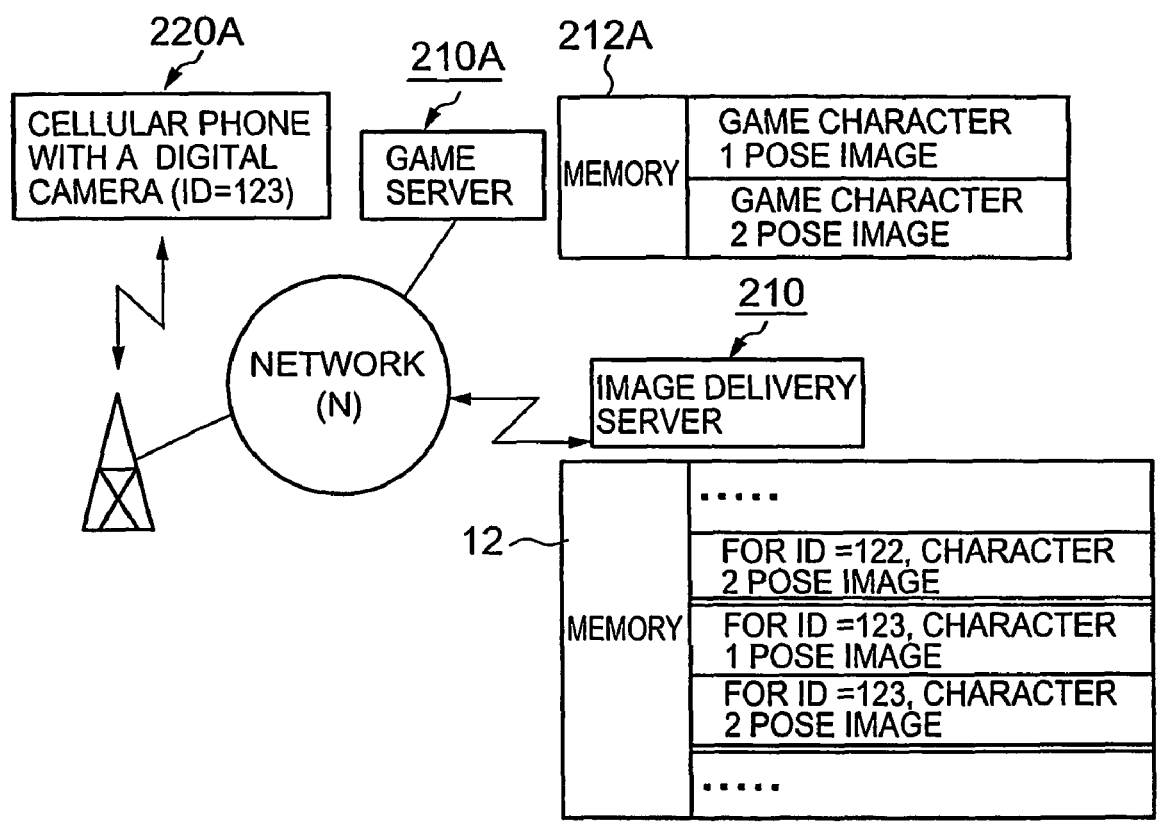
FIG. 40 is a block diagram showing a general structure of the image delivery system according to a fourth embodiment.

FIG. 40 is a block diagram indicative of a whole composition of an image delivery system in the fourth embodiment.

This embodiment handles the user's pickup of object images striking various poses, using a cellular phone 220A with a digital camera, and registration of the object images as the user's original character images in a memory 212 of an image delivery server 210, or otherwise registration of game characters striking various poses downloaded from a memory 212A of a game server 210A as the user's original characters in the memory 212 of the delivery server 210.

Figure 41B:
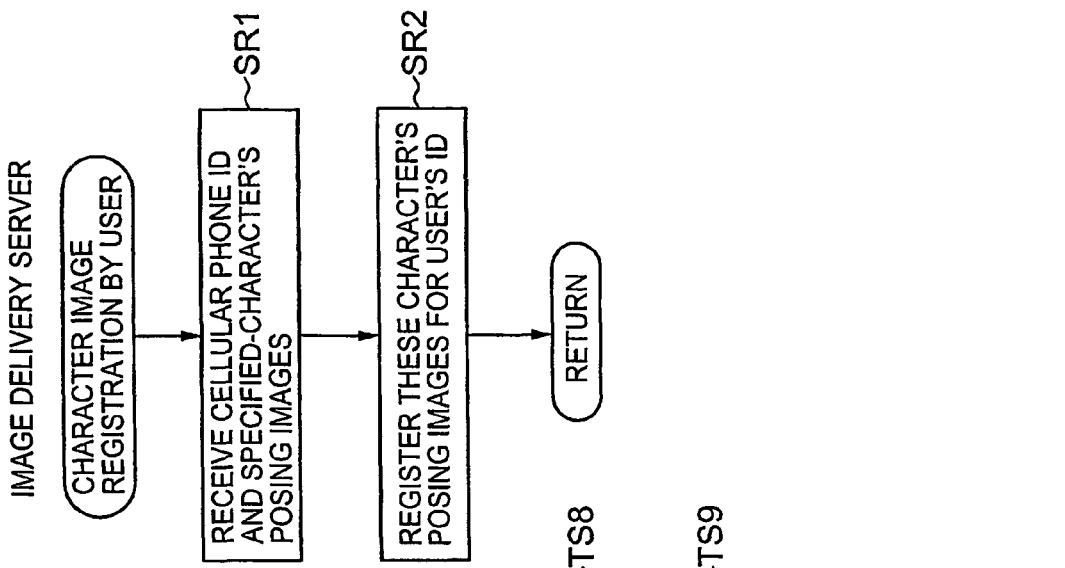
FIG. 41(B) is a flowchart showing the process to be performed on the image delivery server 210 side.
Figure 41A:
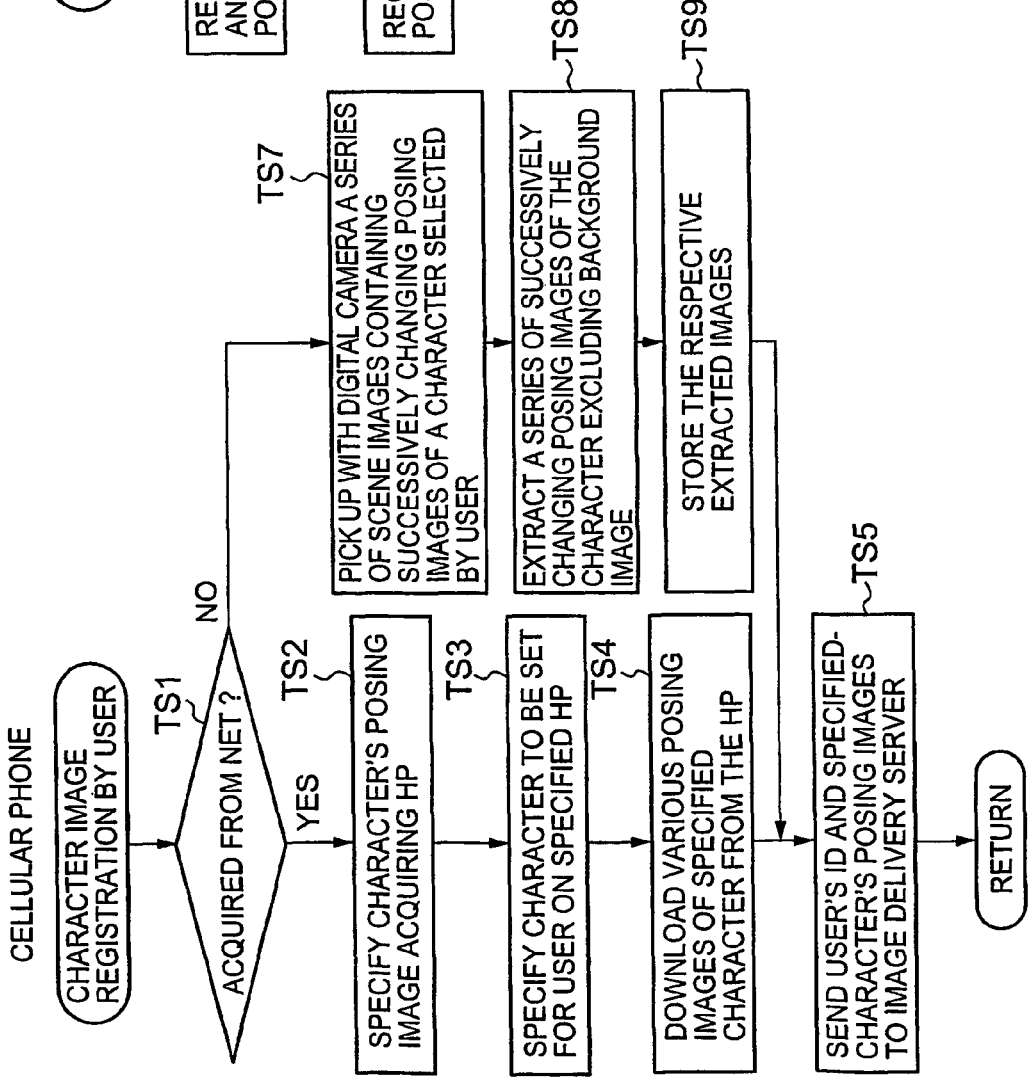
FIG. 41(A) is a flowchart showing the process to be performed on a portable telephone 200A side.

FIGS. 41(A) and 41(B) are flowcharts of the user's original character image registering processes to be performed in the cellular phone 220A and the image delivery server 210, respectively, of the image delivery system in the fourth embodiment.

First, when the user's original character images are downloaded by and registered on the cellular phone 220A with the digital camera from the game server 210A on the Internet N, a homepage (HP) of the game server 210A from which the character images are acquired is specified, and connected to the cellular phone 220A (step TS1→TS2).

When the user specifies a game character to be set as his or her original character image on the homepage (HP) of the game server 210A (step TS3), the various posing images of a specified game character stored in the memory 212A of the game server 210A are downloaded (step TS4).

Thereupon, the user ID (=123) of the cellular phone 220A and the respective posing character images downloaded from the game server 210A are delivered to the image delivery server 210 (step TS5).

When the user picks up and registers the user's original character images using the cellular phone 220A without downloading similar character images from the Internet N, the digital camera 232 picks up a scene image containing object images striking their respective poses (step TS1→TS7).

Thereupon, the cellular phone 220A extracts the character images as object images excluding the background image in the picked-up scene image (step TS8) and stores them as corresponding-character images taking respective poses (step TS9).

Then, the cellular phone 220A then sends its terminal user's ID (=123) and the stored corresponding-images striking the respective poses to the image delivery server 210 (step TS5).

When the image delivery server 210 receives the terminal user's ID and the character images striking their respective poses from the cellular phone 220A (step SR1), it registers the character images as the ones striking respective poses for the user's ID, apart from the respective "rabbit", "bear" and "cat" character images (112*d*-112*f*), for example, of FIG. 23 in the memory 212 (step SR2).

When the image delivery server 210 selects and deliver a character image similar in pose to the object image extracted from the picked-up scene image in the second or third embodiment, the image delivery server 210 can select a character image from the registered "rabbit", "bear" and "cat" character images, and the character images picked up and registered by the user, and the game characters.

The various processes performed by the image delivery system described with reference to the respective embodiments, that is, the image process shown by the flowchart of FIGS. 26 and 27 performed by the terminal 120 of the image delivery system of the second embodiment, the server process performed by the image delivery server 110 shown by the flowcharts of FIGS. 28 and 29 in the image delivery system of the second embodiment, the object image extracting process included in the server process in the second embodiment shown by the flowchart of FIG. 30, the corresponding-animation image acquiring process included in the server process of the second embodiment shown by the flowchart of FIG. 31, the process of evaluating the similarity in pose of the character/model image to the target image of imitation included in the corresponding-animation image acquiring process in the second embodiment shown by the flowchart of FIG. 18, the image process performed by the terminal 120 in the image delivery system of the third embodiment shown by the flowcharts of FIGS. 33 and 34, the server process of the image delivery server 110 in the image delivery system of the third embodiment shown by the flowchart of FIG. 35, the target image extracting process included in the image process of the third embodiment shown by the flowchart of FIG. 36, the pose number determining process included in the image process of the third embodiment shown by the flowchart of FIG. 37, the process of evaluating the similarity in pose of the model pose image to the target image of imitation included in the pose number determining process in the third embodiment shown by the flowchart of FIG. 38, the user's character image registering process performed in the cellular phone 220A in the image delivery system of the fourth embodiment shown by the flowchart of FIG. 41, and the user's character image registering process performed by the image delivery server 210 may be stored and distributed as computer-executable programs on memory cards (ROM cards, RAM cards, etc.), magnetic discs (floppy discs, hard discs, etc.), optical discs (CD-ROMs, DVDs, etc.), and external recording mediums such as semiconductor memories 113 (123, 213, 223). Various computer terminals having communication functions with the communication networks (the Internet) N can read the programs stored on the external recording mediums 113 (123, 213, 223) into the memories 112 (122, 212, 222) using the recording medium readers 114 (124, 214, 224). Thus, operation of the computers may be controlled by the these programs to perform the image delivering function described with reference to the respective embodiments to thereby perform the processes similar to those mentioned above.

The program data to realize the respective processes can be transmitted through the communication network (the Internet) N in the form of a program code. The program data can be taken from the computer terminals connected to the communication network (the Internet) N to realize the image delivering function.

The present invention is not limited to the ones implemented by the respective embodiments. Various changes and modification could be easily made by those skilled in the art without departing from the spirit and scope of the invention.

The invention claimed is:

1. A composite image output apparatus comprising:
    a picked-up image acquiring unit which acquires a picked-up scene image containing a plurality of objects;
    a target image extracting unit which extracts a target image representing one arbitrary object from the picked-up scene image acquired by the picked-up image acquiring unit;
    a character image obtaining unit which obtains a character image having a pose corresponding to the target image extracted by the target image extracting unit; and
    an image outputting unit which outputs a composite image in which the obtained character image having the pose corresponding to the extracted target image is placed at a position determined based on a position of the extracted target image in the picked-up scene image acquired by the picked-up image acquiring unit so as to replace the extracted target image with the obtained character image having the corresponding pose;
    wherein the target image extracting unit comprises:
        a distance measuring unit which measures a distance to each of the objects; and
        a unit which extracts respective images of the objects based on the distances measured by the distance measuring unit; and
    wherein the image outputting unit superposes the character image and the extracted image of another object in decreasing order of the distances measured by the distance measuring unit.

2. The composite image output apparatus according to claim 1, wherein the character image obtaining unit comprises:
    character image storage means for storing a plurality of character images;

similarity evaluating means for evaluating a similarity of the target image extracted by the target image extracting unit to the character images stored in the character image storage means; and means for obtaining from the character image storage means a character image similar to the target image based on the evaluation by the similarity evaluating means.

3. The composite image output apparatus according to claim 1, wherein the character image obtaining unit comprises:

character image storage means for storing model images and a plurality of character images corresponding thereto;

similarity evaluating means for evaluating a similarity of the target image extracted by the target image extracting unit to the model images stored in the character image storage means; and means for obtaining from the character image storage means a character image similar to the target image based on the evaluation by the similarity evaluating means.

4. The composite image output apparatus according to claim 1, wherein the character image obtaining unit comprises:

character image storage means for storing a plurality of groups of character images;

type specifying means for specifying a type of one of the groups of character images stored in the character image storage means;

similarity evaluating means for evaluating a similarity of the target image extracted by the target image extracting unit to the character images of the group whose type is specified by the type specifying means; and means for obtaining from the character image storage means a character image similar to the target image based on the evaluation by the similarity evaluating means.

5. The composite image output apparatus according to claim 1, wherein the image outputting unit forms the composite image such that the character image obtained by the character image obtaining unit is placed over the picked-up scene image extracted by the picked-up image acquiring unit at a position that is within boundaries of the picked-up scene image and that is different from a position of the target image extracted by the target image extracting unit.

6. The composite image output apparatus according to claim 1, further comprising movement specifying means for specifying movement, from a current position to an arbitrary different position, of the character image in the composite image outputted by the image outputting unit;

wherein the image outputting unit comprises means for moving the character image to the different position in the composite image and outputting the composite image with the moved character image.

7. The composite image output apparatus according to claim 1, wherein the image outputting unit places the character image obtaining unit at a position of the target image, which is extracted from picked-up scene images by the target image extracting unit, in a latest picked-up scene image among a series of plural picked-up scene images acquired by the picked-up image acquiring unit.

8. The composite image output apparatus according to claim 1, wherein the image outputting unit comprises a unit which mirror-reverses the character image obtained by the character image obtaining unit and forms the composite image such that the mirror-reversed character image is placed over the target image in the picked-up scene image acquired by the picked-up image acquiring unit.

9. The composite image output apparatus according to claim 1, wherein the target image extracting unit further comprises:

a target image specifier which specifies one of the extracted images of the objects as the target image.

10. The composite image output apparatus according to claim 1, wherein the target image is extracted from a first picked-up scene image acquired by the picked-up image acquiring unit, and in the composite image the character image is combined with a second picked-up scene image acquired by the picked-up image acquiring unit.

11. The composite image output apparatus according to claim 1, wherein the picked-up image acquiring unit comprises image capturing means for capturing a scene image.

12. The composite image output apparatus according to claim 1, wherein the picked-up image acquiring unit picks up the picked-up scene image based on a video image.

13. The composite image output apparatus according to claim 1, wherein the picked-up image acquiring unit picks up the picked-up scene image from a video player.

14. The composite image output apparatus according to claim 1, wherein the picked-up scene image comprises an animation image.

15. The composite image output apparatus according to claim 1, wherein the character image obtaining unit comprises:

character image storage means for storing a plurality of model images and character images such that the model images correspond to the character images;

type specifying means for specifying a type of character images stored in the character image storage means;

similarity evaluating means for evaluating a similarity of the target image extracted by the target image extracting unit to the model images stored in the character image storage means; and means for obtaining from the character image storage means a character image of a type specified by the type specifying means and corresponding to a model image that is similar to the target image according to the evaluation by the similarity evaluating means.

16. The composite image output apparatus according to claim 15, further comprising:

model size adjusting means for adjusting a height and a width of the plurality of model images stored in the character image storage means to a height and a width of the target image extracted by the target image extracting unit;

wherein the similarity evaluating means evaluates the similarity of the target image extracted by the target image extracting unit to the model images whose height and width have been adjusted by the model size adjusting means.

17. A computer-readable recording medium storing a program that is executable by a computer to cause the computer to function as units comprising:

a picked-up image acquiring unit which acquires a picked-up scene image containing a plurality of objects;

a target image extracting unit which extracts a target image representing one arbitrary object from the picked-up scene image acquired by the picked-up image acquiring unit;

a character image obtaining unit which obtains a character image having a pose corresponding to the target image extracted by the target image extracting unit; and an image outputting unit which outputs a composite image in which the obtained character image having the pose corresponding to the extracted target image is placed at a position determined based on a position of the extracted target image in the picked-up scene image acquired by the picked-up image acquiring unit so as to replace the extracted target image with the obtained character image having the corresponding pose;

wherein the target image extracting unit comprises:

a distance measuring unit which measures a distance to each of the objects; and a unit which extracts respective images of the objects based on the distances measured by the distance measuring unit; and wherein the image outputting unit superposes the character image and the extracted image of another object in decreasing order of the distances measured by the distance measuring unit.

\* \* \* \* \*